US00RE46538E

(19) United States
(12) Reissued Patent
Deryugin et al.

(10) Patent Number: US RE46,538 E
(45) Date of Reissued Patent: Sep. 5, 2017

(54) METHOD AND APPARATUS FOR EXTENDED MANAGEMENT OF STATE AND INTERACTION OF A REMOTE KNOWLEDGE WORKER FROM A CONTACT CENTER

(71) Applicant: Genesys Telecommunications Laboratories, Inc., Daly City, CA (US)

(72) Inventors: Vladimir Neil Deryugin, Pleasant Hill, CA (US); Patrick Giacomini, San Francisco, CA (US); Petr Makagon, San Francisco, CA (US); Andriy Ryabchun, Mill Valley, CA (US); Nikolay Anisimov, Concord, CA (US)

(73) Assignee: GENESYS TELECOMMUNICATIONS LABORATORIES, INC., Daly City, CA (US)

(21) Appl. No.: 14/578,145

(22) Filed: Dec. 19, 2014

Related U.S. Patent Documents

Reissue of:
(64) Patent No.: 7,565,428
Issued: Jul. 21, 2009
Appl. No.: 11/926,913
Filed: Oct. 29, 2007

U.S. Applications:
(63) Continuation of application No. 11/070,898, filed on Mar. 1, 2005, now Pat. No. 7,373,405, which is a
(Continued)

(51) Int. Cl.
*G06Q 10/06* (2012.01)

(52) U.S. Cl.
CPC ..... *G06Q 10/06* (2013.01)

(58) Field of Classification Search
CPC ..... G06Q 10/06; H04L 29/06
(Continued)

(56) References Cited

U.S. PATENT DOCUMENTS 3,914,559 A 10/1975 Knollman
4,048,452 A 9/1977 Oehring et al.
(Continued)

FOREIGN PATENT DOCUMENTS

AT 270486 7/2004
AT 281039 11/2004
(Continued)

OTHER PUBLICATIONS

T-Server for Alcatel A4400/OXE, Genesys 2009, pp. 213-216.*
(Continued)

*Primary Examiner* — Fred Ferris, III
(74) *Attorney, Agent, or Firm* — Lewis Roca Rothgerber Christie LLP

(57) ABSTRACT

A network system for managing remote agents of a communication center includes a primary server connected to the network the primary server controlling at least one routing point; one or more secondary servers distributed on the network and accessible to the remote agents, the secondary server or servers having data access to agent computing platforms and communication peripherals; and, a software suite distributed in part to the secondary server or servers and distributed in part to one or more agents computing platforms and peripherals, the software suite including protocol for reporting agent status data. The system monitors agents computing platforms and peripherals for activity state through the one or more secondary servers whereupon the one or more secondary servers exchange control messaging and event related data using ISCC protocols with the primary server over the network for intelligent routing purposes.

10 Claims, 18 Drawing Sheets

Related U.S. Application Data continuation of application No. 10/269,124, filed on Oct. 10, 2002, now Pat. No. 6,985,943.

(58) Field of Classification Search
USPC ..... 709/224, 246, 265.06; 379/242, 265.06, 379/246
See application file for complete search history.

(56) References Cited

U.S. PATENT DOCUMENTS 4,056,683 A 11/1977 Suehiro
4,290,141 A 9/1981 Anderson et al.
4,320,256 A 3/1982 Freeman
4,345,315 A 8/1982 Cadotte et al.
4,355,207 A 10/1982 Curtin
4,355,372 A 10/1982 Johnson et al.
4,400,587 A 8/1983 Taylor et al.
4,439,636 A 3/1984 Newkirk et al.
4,451,700 A 5/1984 Kempner et al.
4,489,438 A 12/1984 Hughes
4,512,011 A 4/1985 Turner
4,517,410 A 5/1985 Williams et al.
4,521,643 A 6/1985 Dupuis et al.
4,523,055 A 6/1985 Hohl et al.
4,528,643 A 7/1985 Freeny, Jr.
4,539,435 A 9/1985 Eckmann
4,555,903 A 12/1985 Heaton
4,558,180 A 12/1985 Scordo
4,559,415 A 12/1985 Bernard et al.
4,566,030 A 1/1986 Nickerson et al.
4,567,323 A 1/1986 Lottes et al.
4,577,062 A 3/1986 Hilleary et al.
4,577,067 A 3/1986 Levy et al.
4,578,700 A 3/1986 Roberts et al.
4,580,012 A 4/1986 Matthews et al.
4,584,602 A 4/1986 Nakagawa
4,587,379 A 5/1986 Masuda
4,598,367 A 7/1986 DeFrancesco et al.
4,603,232 A 7/1986 Kurland et al.
4,611,094 A 9/1986 Asmuth et al.
4,625,276 A 11/1986 Benton et al.
4,630,200 A 12/1986 Ohmae et al.
4,630,201 A 12/1986 White
4,634,809 A 1/1987 Paulsson et al.
4,649,563 A 3/1987 Riskin
4,654,482 A 3/1987 DeAngelis
4,667,287 A 5/1987 Allen et al.
4,674,044 A 6/1987 Kalmus et al.
4,679,189 A 7/1987 Olson et al.
4,696,029 A 9/1987 Cohen
4,697,282 A 9/1987 Winter et al.
4,737,983 A 4/1988 Frauenthal et al.
4,756,020 A 7/1988 Fodale
4,757,267 A 7/1988 Riskin
4,763,191 A 8/1988 Gordon et al.
4,763,317 A 8/1988 Lehman et al.
4,763,353 A 8/1988 Canale et al.
4,771,425 A 9/1988 Baran et al.
4,785,408 A 11/1988 Britton et al.
4,788,715 A 11/1988 Lee
4,811,382 A 3/1989 Sleevi
4,812,843 A 3/1989 Champion, III et al.
4,829,563 A 5/1989 Crockett et al.
4,831,518 A 5/1989 Yu et al.
4,852,001 A 7/1989 Tsushima et al.
4,866,756 A 9/1989 Crane et al.
4,881,261 A 11/1989 Oliphant et al.
4,893,328 A 1/1990 Peacock
4,896,345 A 1/1990 Thorne
4,897,866 A 1/1990 Majmudar et al.
4,908,850 A 3/1990 Masson et al.
4,924,488 A 5/1990 Kosich
4,943,995 A 7/1990 Daudelin et al.
4,944,038 A 7/1990 Hardy et al.
4,953,204 A 8/1990 Cuschleg, Jr. et al.
4,972,461 A 11/1990 Brown et al.
4,994,985 A 2/1991 Cree et al.
5,001,710 A 3/1991 Gawrys et al.
5,008,930 A 4/1991 Gawrys et al.
5,017,917 A 5/1991 Fisher et al.
5,020,095 A 5/1991 Morganstein et al.
5,036,535 A 7/1991 Gechter et al.
5,058,152 A 10/1991 Solomon et al.
5,062,103 A 10/1991 Davidson et al.
5,073,890 A 12/1991 Danielsen
5,095,504 A 3/1992 Nishikawa et al.
5,117,225 A 5/1992 Wang
5,136,633 A 8/1992 Tejada et al.
5,155,761 A 10/1992 Hammond
5,164,983 A 11/1992 Brown et al.
5,168,515 A 12/1992 Gechter et al.
5,175,800 A 12/1992 Galis et al.
5,179,589 A 1/1993 Syu
5,181,236 A 1/1993 LaVallee et al.
5,181,239 A 1/1993 Jolissaint
5,185,782 A 2/1993 Srinivasan
5,202,828 A 4/1993 Vertelney et al.
5,206,903 A 4/1993 Kohler et al.
5,208,745 A 5/1993 Quentin et al.
5,212,727 A 5/1993 Ramkumar
5,214,688 A 5/1993 Szlam et al.
5,231,670 A 7/1993 Goldhor et al.
5,247,569 A 9/1993 Cave
5,249,223 A 9/1993 Vanacore
5,253,288 A 10/1993 Frey et al.
5,256,863 A 10/1993 Ferguson et al.
5,261,096 A 11/1993 Howarth
5,271,058 A 12/1993 Andrews et al.
5,274,635 A 12/1993 Rahman et al.
5,274,700 A 12/1993 Gechter et al.
5,274,782 A 12/1993 Chalasani et al.
5,278,898 A 1/1994 Cambray et al.
5,278,977 A 1/1994 Spencer et al.
5,280,625 A 1/1994 Howarter et al.
5,283,638 A 2/1994 Engberg et al.
5,283,856 A 2/1994 Gross et al.
5,285,494 A 2/1994 Sprecher et al.
5,288,147 A 2/1994 Schaefer et al.
5,291,550 A 3/1994 Levy et al.
5,291,551 A 3/1994 Conn et al.
5,291,552 A 3/1994 Kerrigan et al.
5,299,259 A 3/1994 Otto
5,299,260 A 3/1994 Shaio
5,301,320 A 4/1994 McAtee et al.
5,309,505 A 5/1994 Szlam et al.
5,311,574 A 5/1994 Livanos
5,311,583 A 5/1994 Friedes et al.
5,315,709 A 5/1994 Alston, Jr. et al.
5,327,486 A 7/1994 Wolff et al.
5,329,583 A 7/1994 Jurgensen et al.
5,333,266 A 7/1994 Boaz et al.
5,335,268 A 8/1994 Kelly, Jr. et al.
5,335,269 A 8/1994 Steinlicht
5,343,477 A 8/1994 Yamada
5,343,518 A 8/1994 Kneipp
5,355,474 A 10/1994 Thuraisngham et al.
5,359,649 A 10/1994 Rosu et al.
5,363,507 A 11/1994 Nakayama et al.
5,367,329 A 11/1994 Nakagaki et al.
5,369,695 A 11/1994 Chakravarti et al.
5,384,766 A 1/1995 Yamato et al.
5,384,771 A 1/1995 Isidoro et al.
5,384,829 A 1/1995 Heileman, Jr. et al.
5,384,841 A 1/1995 Adams et al.
5,392,277 A 2/1995 Bernstein
5,392,328 A 2/1995 Schmidt et al.
5,392,345 A 2/1995 Otto
5,392,400 A 2/1995 Berkowitz et al.
5,402,474 A 3/1995 Miller et al.
5,414,762 A 5/1995 Flisik et al.
5,422,813 A 6/1995 Schuchman et al.
5,425,091 A 6/1995 Josephs
5,425,093 A 6/1995 Trefzger
5,426,594 A 6/1995 Wright et al.

(56) References Cited

U.S. PATENT DOCUMENTS 5,428,608 A 6/1995 Freeman et al.
5,436,965 A 7/1995 Grossman et al.
5,436,967 A 7/1995 Hanson
5,440,719 A 8/1995 Hanes et al.
5,444,767 A 8/1995 Goetcheus et al.
5,444,774 A 8/1995 Friedes
5,444,823 A 8/1995 Nguyen
5,450,482 A 9/1995 Chen et al.
5,450,483 A 9/1995 Williams
5,452,350 A 9/1995 Reynolds et al.
5,455,903 A 10/1995 Jolissaint et al.
5,459,780 A 10/1995 Sand
5,463,685 A 10/1995 Gaechter et al.
5,465,286 A 11/1995 Clare et al.
5,467,391 A 11/1995 Donaghue, Jr. et al.
5,469,504 A 11/1995 Blaha
5,473,680 A 12/1995 Porter
5,475,813 A 12/1995 Cieslak et al.
5,479,487 A 12/1995 Hammond
5,481,616 A 1/1996 Freadman
5,488,648 A 1/1996 Womble
5,491,783 A 2/1996 Douglas et al.
5,493,564 A 2/1996 Mullan
5,495,522 A 2/1996 Allen et al.
5,495,523 A 2/1996 Stent et al.
5,496,392 A 3/1996 Sims et al.
5,497,317 A 3/1996 Hawkins et al.
5,497,371 A 3/1996 Ellis et al.
5,497,373 A 3/1996 Hulen et al.
5,500,889 A 3/1996 Baker et al.
5,500,891 A 3/1996 Harrington et al.
5,506,898 A 4/1996 Costantini et al.
5,509,062 A 4/1996 Carlsen
5,510,829 A 4/1996 Sugiyama et al.
5,511,117 A 4/1996 Zazzera
5,517,620 A 5/1996 Hashimoto et al.
5,519,773 A 5/1996 Dumas et al.
5,524,047 A 6/1996 Brown et al.
5,524,147 A 6/1996 Bean
5,526,353 A 6/1996 Henley et al.
5,528,678 A 6/1996 Kaplan
5,530,740 A 6/1996 Irribarren et al.
5,530,744 A 6/1996 Charalambous et al.
5,533,103 A 7/1996 Peavey et al.
5,533,107 A 7/1996 Irwin et al.
5,533,108 A 7/1996 Harris et al.
5,533,110 A 7/1996 Pinard et al.
5,533,115 A 7/1996 Hollenbach et al.
5,535,211 A 7/1996 Yano
5,535,256 A 7/1996 Maloney et al.
5,535,323 A 7/1996 Miller et al.
5,537,470 A 7/1996 Lee
5,537,630 A 7/1996 Berry et al.
5,539,811 A 7/1996 Nakamura et al.
5,544,220 A 8/1996 Trefzger
5,546,452 A 8/1996 Andrews et al.
5,550,816 A 8/1996 Hardwick et al.
5,553,133 A 9/1996 Perkins
5,555,299 A 9/1996 Maloney et al.
5,555,426 A 9/1996 Johnson et al.
5,557,667 A 9/1996 Bruno et al.
5,559,868 A 9/1996 Blonder
5,559,877 A 9/1996 Ash et al.
5,559,878 A 9/1996 Keys et al.
5,561,711 A 10/1996 Muller
5,561,841 A 10/1996 Markus
5,563,805 A 10/1996 Arbuckle et al.
5,563,937 A 10/1996 Bruno et al.
5,566,294 A 10/1996 Kojima et al.
5,570,419 A 10/1996 Cave et al.
5,570,420 A 10/1996 Bress et al.
5,572,579 A 11/1996 Orriss et al.
5,572,643 A 11/1996 Judson
5,577,100 A 11/1996 McGregor et al.
5,577,105 A 11/1996 Baum et al.
5,583,862 A 12/1996 Callon
5,583,922 A 12/1996 Davis et al.
5,590,188 A 12/1996 Crockett
5,592,542 A 1/1997 Honda et al.
5,592,543 A 1/1997 Smith et al.
5,594,791 A 1/1997 Szlam et al.
5,598,532 A 1/1997 Liron
5,604,737 A 2/1997 Iwami et al.
5,606,602 A 2/1997 Johnson et al.
5,608,778 A 3/1997 Partridge, III
5,608,786 A 3/1997 Gordon
5,610,910 A 3/1997 Focsaneanu et al.
5,617,570 A 4/1997 Russell et al.
5,619,183 A 4/1997 Ziegra et al.
5,619,557 A 4/1997 Van Berkum
5,619,648 A 4/1997 Canale et al.
5,621,789 A 4/1997 McCalmont et al.
5,621,790 A 4/1997 Grossman et al.
5,623,600 A 4/1997 Ji et al.
5,624,265 A 4/1997 Redford et al.
5,625,404 A 4/1997 Grady et al.
5,625,676 A 4/1997 Greco et al.
5,625,682 A 4/1997 Gray et al.
5,627,764 A 5/1997 Schutzman et al.
5,627,884 A 5/1997 Williams et al.
5,630,127 A 5/1997 Moore et al.
5,632,011 A 5/1997 Landfield et al.
5,633,920 A 5/1997 Kikinis et al.
5,633,924 A 5/1997 Kaish et al.
5,635,918 A 6/1997 Tett
5,640,445 A 6/1997 David
5,642,411 A 6/1997 Theis
5,642,477 A 6/1997 de Carmo et al.
5,642,511 A 6/1997 Chow et al.
5,644,720 A 7/1997 Boll et al.
5,646,981 A 7/1997 Klein
5,649,105 A 7/1997 Aldred et al.
5,652,785 A 7/1997 Richardson, Jr. et al.
5,652,789 A 7/1997 Miner et al.
5,652,791 A 7/1997 Sunderman et al.
5,654,961 A 8/1997 Araujo et al.
5,655,015 A 8/1997 Walsh et al.
5,657,383 A 8/1997 Gerber et al.
5,659,542 A 8/1997 Bell et al.
5,659,604 A 8/1997 Beckmann
5,659,746 A 8/1997 Bankert et al.
5,673,304 A 9/1997 Connor et al.
5,673,311 A 9/1997 Andruska et al.
5,673,322 A 9/1997 Pepe et al.
5,675,637 A 10/1997 Szlam et al.
5,684,870 A 11/1997 Maloney et al.
5,689,229 A 11/1997 Chaco et al.
5,692,033 A 11/1997 Farris
5,696,809 A 12/1997 Voit
5,696,811 A 12/1997 Maloney et al.
5,701,400 A 12/1997 Amado
5,703,943 A 12/1997 Otto
5,706,453 A 1/1998 Cheng et al.
5,708,702 A 1/1998 De Paul et al.
5,712,901 A 1/1998 Meermans
5,715,306 A 2/1998 Sunderman et al.
5,715,307 A 2/1998 Zazzera
5,715,432 A 2/1998 Xu et al.
5,717,747 A 2/1998 Boyle, III et al.
5,721,770 A 2/1998 Kohler
5,724,412 A 3/1998 Srinivasan
5,724,418 A 3/1998 Brady
5,726,984 A 3/1998 Kubler et al.
5,727,159 A 3/1998 Kikinis
5,729,594 A 3/1998 Klingman
5,732,078 A 3/1998 Arango
5,734,981 A 3/1998 Kennedy, III et al.
5,737,495 A 4/1998 Adams et al.
5,737,595 A 4/1998 Cohen et al.
5,737,691 A 4/1998 Wang et al.
5,737,726 A 4/1998 Cameron et al.
5,737,727 A 4/1998 Lehmann et al.
5,740,238 A 4/1998 Flockhart et al.
5,740,240 A 4/1998 Jolissaint

(56) References Cited

U.S. PATENT DOCUMENTS 5,742,668 A 4/1998 Pepe et al.
5,742,670 A 4/1998 Bennett
5,742,675 A 4/1998 Kilander et al.
5,742,905 A 4/1998 Pepe et al.
5,745,687 A 4/1998 Randell
5,745,878 A 4/1998 Hashimoto et al.
5,748,884 A 5/1998 Royce et al.
5,748,907 A 5/1998 Crane
5,751,706 A 5/1998 Land et al.
5,751,707 A 5/1998 Voit et al.
5,751,795 A 5/1998 Hassler et al.
5,752,059 A 5/1998 Holleran et al.
5,752,244 A 5/1998 Rose et al.
5,752,246 A 5/1998 Rogers et al.
5,754,111 A 5/1998 Garcia
5,754,636 A 5/1998 Bayless et al.
5,754,639 A 5/1998 Flockhart et al.
5,754,655 A 5/1998 Hughes et al.
5,757,904 A 5/1998 Anderson
5,760,823 A 6/1998 Brunson et al.
5,761,289 A 6/1998 Keshav
5,764,736 A 6/1998 Shachar et al.
5,764,898 A 6/1998 Tsuji et al.
5,765,033 A 6/1998 Miloslavsky
5,768,360 A 6/1998 Reynolds et al.
5,768,527 A 6/1998 Zhu et al.
5,774,583 A 6/1998 Sasaki et al.
5,778,060 A 7/1998 Otto
5,778,178 A 7/1998 Arunachalam
5,778,377 A 7/1998 Marlin et al.
5,784,438 A 7/1998 Martinez
5,784,451 A 7/1998 Smith, Jr.
5,784,452 A 7/1998 Carney
5,787,160 A 7/1998 Chaney et al.
5,787,163 A 7/1998 Taylor et al.
5,790,635 A 8/1998 Dezonno
5,790,650 A 8/1998 Dunn et al.
5,790,789 A 8/1998 Suarez
5,790,798 A 8/1998 Beckett, II et al.
5,793,857 A 8/1998 Barnes et al.
5,793,861 A 8/1998 Haigh
5,794,039 A 8/1998 Guck
5,796,398 A 8/1998 Zimmer
5,796,729 A 8/1998 Greaney et al.
5,796,791 A 8/1998 Polcyn
5,796,813 A 8/1998 Sonnenberg
5,799,067 A 8/1998 Kikinis et al.
5,799,297 A 8/1998 Goodridge et al.
5,802,163 A 9/1998 Miloslavsky
5,802,253 A 9/1998 Gross et al.
5,802,283 A 9/1998 Grady et al.
5,802,314 A 9/1998 Tullis et al.
5,802,316 A 9/1998 Ito et al.
5,802,493 A 9/1998 Sheflott et al.
5,802,526 A 9/1998 Fawcett et al.
5,805,587 A 9/1998 Norris et al.
5,806,061 A 9/1998 Chaudhuri et al.
5,809,128 A 9/1998 McMullin
5,809,282 A 9/1998 Cooper et al.
5,809,512 A 9/1998 Kato
5,812,795 A 9/1998 Horovitz et al.
5,813,014 A 9/1998 Gustman
5,815,566 A 9/1998 Ramot et al.
5,818,935 A 10/1998 Maa
5,822,306 A 10/1998 Catchpole
5,822,400 A 10/1998 Smith
5,822,404 A 10/1998 Cave
5,822,526 A 10/1998 Waskiewicz
5,825,775 A 10/1998 Chin et al.
5,825,862 A 10/1998 Voit et al.
5,825,869 A 10/1998 Brooks et al.
5,825,870 A 10/1998 Miloslavsky
5,826,040 A 10/1998 Fargher et al.
5,826,269 A 10/1998 Hussey
5,828,747 A 10/1998 Fisher et al.
5,828,839 A 10/1998 Moncreiff
5,831,611 A 11/1998 Kennedy et al.
5,832,196 A 11/1998 Croslin et al.
5,835,090 A 11/1998 Clark et al.
5,835,570 A 11/1998 Wattenbarger
5,835,583 A 11/1998 Hetz et al.
5,838,682 A 11/1998 Dekelbaum et al.
5,838,768 A 11/1998 Sumar et al.
5,838,773 A 11/1998 Eisner et al.
5,838,774 A 11/1998 Weisser, Jr.
5,841,854 A 11/1998 Schumacher et al.
5,842,131 A 11/1998 Yamane
5,844,980 A 12/1998 Patel et al.
5,844,982 A 12/1998 Knitl
5,847,484 A 12/1998 Kuyama et al.
5,848,131 A 12/1998 Shaffer et al.
5,848,143 A 12/1998 Andrews et al.
5,850,433 A 12/1998 Rondeau
5,852,814 A 12/1998 Allen
5,857,184 A 1/1999 Lynch
5,862,134 A 1/1999 Deng
5,862,211 A 1/1999 Roush
5,862,223 A 1/1999 Walker et al.
5,864,616 A 1/1999 Hartmeier
5,864,848 A 1/1999 Horvitz et al.
5,867,484 A 2/1999 Shaunfield
5,867,494 A 2/1999 Krishnaswamy et al.
5,867,495 A 2/1999 Elliott et al.
5,867,559 A 2/1999 Jorgensen et al.
5,867,562 A 2/1999 Scherer
5,867,822 A 2/1999 Sankar
5,870,464 A 2/1999 Brewster et al.
5,870,549 A 2/1999 Bobo, II
5,872,841 A 2/1999 King et al.
5,872,926 A 2/1999 Levac et al.
5,873,032 A 2/1999 Cox et al.
5,873,040 A 2/1999 Dunn et al.
5,873,076 A 2/1999 Barr et al.
5,878,126 A 3/1999 Velamuri et al.
5,878,130 A 3/1999 Andrews et al.
5,878,230 A 3/1999 Weber et al.
5,881,146 A 3/1999 Hamilton
5,883,891 A 3/1999 Williams et al.
5,884,032 A 3/1999 Bateman et al.
5,884,262 A 3/1999 Wise et al.
5,887,173 A 3/1999 Ogawa et al.
5,889,474 A 3/1999 LaDue
5,889,774 A 3/1999 Mirashrafi et al.
5,889,799 A 3/1999 Grossman et al.
5,889,863 A 3/1999 Weber
5,892,764 A 4/1999 Riemann et al.
5,892,822 A 4/1999 Gottlieb et al.
5,893,912 A 4/1999 Freund et al.
5,894,512 A 4/1999 Zenner
5,896,444 A 4/1999 Perlman et al.
5,897,635 A 4/1999 Torres et al.
5,901,138 A 5/1999 Bader et al.
5,901,203 A 5/1999 Morganstein et al.
5,901,209 A 5/1999 Tannenbaum et al.
5,903,631 A 5/1999 Smith et al.
5,903,877 A 5/1999 Berkowitz et al.
5,905,495 A 5/1999 Tanaka et al.
5,905,792 A 5/1999 Miloslavsky
5,905,793 A 5/1999 Flockhart et al.
5,905,863 A 5/1999 Knowles et al.
5,907,547 A 5/1999 Foladare et al.
5,911,134 A 6/1999 Castonguay et al.
5,911,776 A 6/1999 Guck
5,914,941 A 6/1999 Janky
5,915,001 A 6/1999 Uppaluru
5,915,008 A 6/1999 Dulman
5,915,011 A 6/1999 Miloslavsky
5,915,012 A 6/1999 Miloslavsky
5,916,302 A 6/1999 Dunn et al.
5,917,817 A 6/1999 Dunn et al.
5,917,898 A 6/1999 Bassa et al.
5,918,213 A 6/1999 Bernard et al.
5,920,621 A 7/1999 Gottlieb
5,920,719 A 7/1999 Sutton et al.

(56) References Cited

U.S. PATENT DOCUMENTS 5,920,865 A 7/1999 Ariga
5,923,745 A 7/1999 Hurd
5,923,879 A 7/1999 Sasmazel et al.
5,926,535 A 7/1999 Reynolds
5,926,538 A 7/1999 Deryugin et al.
5,926,539 A 7/1999 Shtivelman
5,933,492 A 8/1999 Turovski
5,937,051 A 8/1999 Hurd et al.
5,937,057 A 8/1999 Bell et al.
5,937,162 A 8/1999 Funk et al.
5,937,388 A 8/1999 Davis et al.
5,938,725 A 8/1999 Hara
5,940,075 A 8/1999 Mutschler, III et al.
5,940,478 A 8/1999 Vaudreuil et al.
5,940,479 A 8/1999 Guy et al.
5,940,488 A 8/1999 DeGrazia et al.
5,940,495 A 8/1999 Bondarenko et al.
5,940,496 A 8/1999 Gisby et al.
5,940,497 A 8/1999 Miloslavsky
5,940,598 A 8/1999 Strauss et al.
5,940,823 A 8/1999 Schreiber et al.
5,943,416 A 8/1999 Gisby
5,946,375 A 8/1999 Pattison et al.
5,946,386 A 8/1999 Rogers et al.
5,946,387 A 8/1999 Miloslavsky
5,946,388 A 8/1999 Walker et al.
5,948,054 A 9/1999 Nielsen
5,949,988 A 9/1999 Feisullin et al.
5,953,332 A 9/1999 Miloslavsky
5,953,405 A 9/1999 Miloslavsky
5,953,406 A 9/1999 LaRue et al.
5,956,482 A 9/1999 Agraharam et al.
5,956,729 A 9/1999 Goetz et al.
5,958,014 A 9/1999 Cave
5,958,016 A 9/1999 Chang et al.
5,958,064 A 9/1999 Judd et al.
5,959,982 A 9/1999 Federkins et al.
5,960,073 A 9/1999 Kikinis et al.
5,960,411 A 9/1999 Hartman et al.
5,963,632 A 10/1999 Miloslavsky
5,963,635 A 10/1999 Szlam et al.
5,966,427 A 10/1999 Shaffer et al.
5,966,695 A 10/1999 Melchione et al.
5,970,065 A 10/1999 Miloslavsky
5,970,134 A 10/1999 Highland et al.
5,974,135 A 10/1999 Breneman et al.
5,974,414 A 10/1999 Stanczak et al.
5,974,444 A 10/1999 Konrad
5,974,448 A 10/1999 Yamauchi et al.
RE36,416 E 11/1999 Szlam et al.
5,978,465 A 11/1999 Corduroy et al.
5,978,467 A 11/1999 Walker et al.
5,978,672 A 11/1999 Hartmaier et al.
5,978,836 A 11/1999 Ouchi
5,982,774 A 11/1999 Foladare et al.
5,982,870 A 11/1999 Pershan et al.
5,982,873 A 11/1999 Flockhart et al.
5,983,218 A 11/1999 Syeda-Mahmood
5,987,102 A 11/1999 Elliott et al.
5,987,117 A 11/1999 McNeil et al.
5,987,118 A 11/1999 Dickerman et al.
5,987,423 A 11/1999 Arnold et al.
5,987,446 A 11/1999 Corey et al.
5,991,365 A 11/1999 Pizano et al.
5,991,390 A 11/1999 Booton
5,991,391 A 11/1999 Miloslavsky
5,991,392 A 11/1999 Miloslavsky
5,991,393 A 11/1999 Kamen
5,991,394 A 11/1999 Dezonno et al.
5,991,395 A 11/1999 Miloslavsky
5,995,606 A 11/1999 Civanlar et al.
5,995,610 A 11/1999 Smidt et al.
5,995,614 A 11/1999 Miloslavsky
5,995,615 A 11/1999 Miloslavsky
5,996,000 A 11/1999 Shuster
5,999,525 A 12/1999 Krishnaswamy et al.
5,999,609 A 12/1999 Nishimura
5,999,965 A 12/1999 Kelly
6,002,396 A 12/1999 Davies
6,002,760 A 12/1999 Gisby
6,003,034 A 12/1999 Tuli
6,005,845 A 12/1999 Svennesson et al.
6,005,920 A 12/1999 Fuller et al.
6,005,931 A 12/1999 Neyman et al.
6,009,163 A 12/1999 Nabkel et al.
6,009,469 A 12/1999 Mattaway et al.
6,011,792 A 1/2000 Miloslavsky
6,011,844 A 1/2000 Uppaluru et al.
6,011,974 A 1/2000 Cedervall et al.
6,012,152 A 1/2000 Douik et al.
6,014,137 A 1/2000 Burns
6,014,138 A 1/2000 Cain et al.
6,014,379 A 1/2000 White et al.
6,014,437 A 1/2000 Acker et al.
6,014,647 A 1/2000 Nizzari et al.
6,014,711 A 1/2000 Brown
6,018,578 A 1/2000 Bondarenko et al.
6,018,579 A 1/2000 Petrunka
6,018,761 A 1/2000 Uomini
6,021,262 A 2/2000 Cote et al.
6,021,411 A 2/2000 Brophy et al.
6,021,428 A 2/2000 Miloslavsky
6,023,684 A 2/2000 Pearson
6,023,723 A 2/2000 McCormick et al.
6,026,087 A 2/2000 Mirashrafi et al.
6,026,375 A 2/2000 Hall et al.
6,028,917 A 2/2000 Creamer et al.
6,029,195 A 2/2000 Herz
6,038,293 A 3/2000 McNerney et al.
6,038,537 A 3/2000 Matsuoka
6,041,116 A 3/2000 Meyers
6,044,142 A 3/2000 Hammarstrom et al.
6,044,144 A 3/2000 Becker et al.
6,044,146 A 3/2000 Gisby et al.
6,044,368 A 3/2000 Powers
6,046,762 A 4/2000 Sonesh et al.
6,047,060 A 4/2000 Fedorov et al.
6,049,272 A 4/2000 Lee et al.
6,049,547 A 4/2000 Fisher et al.
6,049,779 A 4/2000 Berkson
6,052,514 A 4/2000 Gill et al.
6,055,307 A 4/2000 Behnke et al.
6,055,308 A 4/2000 Miloslavsky et al.
6,055,513 A 4/2000 Katz et al.
6,058,163 A 5/2000 Pattison et al.
6,058,389 A 5/2000 Chandra et al.
6,058,435 A 5/2000 Sassin et al.
6,061,054 A 5/2000 Jolly
6,064,667 A 5/2000 Gisby et al.
6,064,722 A 5/2000 Clise et al.
6,064,723 A 5/2000 Cohn et al.
6,064,730 A 5/2000 Ginsberg
6,064,973 A 5/2000 Smith et al.
6,067,357 A 5/2000 Kishinsky et al.
6,069,890 A 5/2000 White et al.
6,070,142 A 5/2000 McDonough et al.
6,070,144 A 5/2000 Ginsberg et al.
6,072,864 A 6/2000 Shtivelman et al.
6,073,013 A 6/2000 Agre et al.
6,073,105 A 6/2000 Sutcliffe et al.
6,073,109 A 6/2000 Flores et al.
6,073,124 A 6/2000 Krishnan et al.
6,075,783 A 6/2000 Voit
6,075,843 A 6/2000 Cave
6,076,101 A 6/2000 Kamakura et al.
6,076,105 A 6/2000 Wolff et al.
6,076,109 A * 6/2000 Kikinis ..... H04L 29/06 707/E17.121
6,078,581 A 6/2000 Shtivelman et al.
6,078,583 A 6/2000 Takahara et al.
6,081,591 A 6/2000 Skoog
6,081,592 A 6/2000 Battle
6,085,097 A 7/2000 Savery et al.
6,085,201 A 7/2000 Tso

(56) References Cited

U.S. PATENT DOCUMENTS 6,088,340 A 7/2000 Buchholz et al.
6,088,696 A 7/2000 Moon et al.
6,088,717 A 7/2000 Reed et al.
6,094,479 A 7/2000 Lindeberg et al.
6,094,673 A 7/2000 Dilip et al.
6,097,792 A 8/2000 Thornton
6,097,804 A 8/2000 Gilbert et al.
6,097,938 A 8/2000 Paxson
6,098,065 A 8/2000 Skillen et al.
6,101,473 A 8/2000 Scott et al.
6,104,711 A 8/2000 Voit
6,104,800 A 8/2000 Benson
6,104,801 A 8/2000 Miloslavsky
6,104,802 A 8/2000 Perlmutter
6,108,688 A 8/2000 Nielsen
6,108,704 A 8/2000 Hutton et al.
6,108,711 A 8/2000 Beck et al.
6,112,085 A 8/2000 Garner et al.
6,115,596 A 9/2000 Raith et al.
6,115,742 A 9/2000 Franklin et al.
6,118,865 A 9/2000 Gisby
6,119,155 A 9/2000 Rossmann et al.
6,119,167 A 9/2000 Boyle et al.
6,122,360 A 9/2000 Neyman et al.
6,122,364 A 9/2000 Petrunka et al.
6,122,365 A 9/2000 Yegoshin
6,122,632 A 9/2000 Botts et al.
6,125,113 A 9/2000 Farris et al.
6,125,126 A 9/2000 Hallenstål
6,128,379 A 10/2000 Smyk
6,128,482 A 10/2000 Nixon et al.
6,128,603 A 10/2000 Dent et al.
6,128,646 A 10/2000 Miloslavsky
6,130,933 A 10/2000 Miloslavsky
6,134,217 A 10/2000 Stiliadis et al.
6,134,235 A 10/2000 Goldman et al.
6,134,315 A 10/2000 Galvin
6,134,318 A 10/2000 O'Neil
6,134,530 A 10/2000 Bunting et al.
6,137,870 A 10/2000 Scherer
6,138,139 A 10/2000 Beck et al.
6,141,345 A 10/2000 Goeddel et al.
6,148,074 A 11/2000 Miloslavsky et al.
6,157,653 A 12/2000 Kline et al.
6,157,655 A 12/2000 Shtivelman
6,157,924 A 12/2000 Austin
6,166,735 A 12/2000 Dom et al.
6,167,255 A 12/2000 Kennedy, III et al.
6,167,395 A 12/2000 Beck et al.
6,167,404 A 12/2000 Morcos et al.
6,170,011 B1 1/2001 Macleod Beck et al.
6,173,052 B1 1/2001 Brady
6,173,316 B1 1/2001 De Boor et al.
6,175,562 B1 1/2001 Cave
6,175,563 B1 1/2001 Miloslavsky
6,175,564 B1 1/2001 Miloslavsky et al.
6,175,620 B1 1/2001 Rouge et al.
6,175,842 B1 1/2001 Kirk et al.
6,178,239 B1 1/2001 Kishinsky et al.
6,181,336 B1 1/2001 Chiu et al.
6,181,736 B1 1/2001 McLaughlin et al.
6,181,788 B1 1/2001 Miloslavsky
6,182,059 B1 1/2001 Angotti et al.
6,182,249 B1 1/2001 Wookey et al.
6,185,184 B1 2/2001 Mattaway et al.
6,185,287 B1 2/2001 Miloslavsky
6,185,291 B1 2/2001 Miloslavsky
6,185,292 B1 2/2001 Miloslavsky
6,185,427 B1 2/2001 Krasner et al.
6,185,535 B1 2/2001 Hedin et al.
6,188,688 B1 2/2001 Buskirk, Jr.
6,188,762 B1 * 2/2001 Shooster ..... H04M 3/5191 370/352
6,192,122 B1 2/2001 Flockhart et al.
6,192,250 B1 2/2001 Buskens et al.
6,192,338 B1 2/2001 Haszto et al.
6,195,357 B1 2/2001 Polcyn
6,198,738 B1 3/2001 Chang et al.
6,198,739 B1 3/2001 Neyman et al.
6,201,804 B1 3/2001 Kikinis
6,201,863 B1 3/2001 Miloslavsky
6,205,135 B1 3/2001 Chinni et al.
6,205,412 B1 3/2001 Barskiy et al.
6,212,178 B1 4/2001 Beck et al.
6,215,783 B1 4/2001 Neyman
6,219,045 B1 4/2001 Leahy et al.
6,219,413 B1 4/2001 Burg
6,222,919 B1 4/2001 Hollatz et al.
6,226,285 B1 5/2001 Kozdon et al.
6,229,524 B1 5/2001 Chernock et al.
6,229,888 B1 5/2001 Miloslavsky
6,230,197 B1 5/2001 Beck et al.
6,233,234 B1 5/2001 Curry et al.
6,233,616 B1 5/2001 Reid
6,236,857 B1 5/2001 Calabrese et al.
6,240,285 B1 5/2001 Blum et al.
6,243,092 B1 6/2001 Okita et al.
6,243,373 B1 6/2001 Turock
6,243,375 B1 6/2001 Speicher
6,243,379 B1 6/2001 Veerina et al.
6,243,713 B1 6/2001 Nelson et al.
6,249,807 B1 6/2001 Shaw et al.
6,253,129 B1 6/2001 Jenkins et al.
6,256,489 B1 7/2001 Lichter et al.
6,256,503 B1 7/2001 Stephens
6,259,692 B1 7/2001 Shtivelman et al.
6,259,774 B1 7/2001 Miloslavsky
6,259,786 B1 7/2001 Gisby
6,263,049 B1 7/2001 Kuhn
6,263,065 B1 7/2001 Durinovic-Johri et al.
6,263,066 B1 7/2001 Shtivelman et al.
6,263,359 B1 7/2001 Fong et al.
6,275,693 B1 8/2001 Lin et al.
6,278,976 B1 8/2001 Kochian
6,278,996 B1 8/2001 Richardson et al.
6,282,429 B1 8/2001 Baiyor et al.
6,282,565 B1 8/2001 Shaw et al.
6,285,316 B1 9/2001 Nir et al.
6,285,364 B1 9/2001 Giordano, III et al.
6,286,033 B1 9/2001 Kishinsky et al.
6,286,084 B1 9/2001 Wexler et al.
6,286,129 B1 9/2001 Agarwal et al.
6,289,094 B1 9/2001 Miloslavsky
6,292,181 B1 9/2001 Banerjee et al.
6,292,553 B1 9/2001 Fellingham et al.
6,295,353 B1 9/2001 Flockhart et al.
6,295,530 B1 9/2001 Ritchie et al.
6,298,041 B1 10/2001 Packer
6,301,480 B1 10/2001 Kennedy, III et al.
6,304,898 B1 10/2001 Shiigi
6,314,089 B1 11/2001 Szlam et al.
6,314,430 B1 11/2001 Chang
6,320,857 B1 11/2001 Tonnby et al.
6,320,951 B1 11/2001 Shtivelman et al.
6,324,276 B1 11/2001 Uppaluru et al.
6,330,323 B1 12/2001 Gottlieb et al.
6,330,426 B2 12/2001 Brown et al.
6,332,022 B1 12/2001 Martinez
6,332,154 B2 12/2001 Beck et al.
6,332,163 B1 12/2001 Bowman-Amuah
6,333,980 B1 12/2001 Hollatz et al.
6,335,927 B1 1/2002 Elliott et al.
6,337,904 B1 1/2002 Gisby
6,339,593 B1 1/2002 Kikinis
6,341,128 B1 1/2002 Svedberg
6,343,281 B1 1/2002 Kato
6,345,290 B2 2/2002 Okada et al.
6,345,300 B1 2/2002 Bakshi et al.
6,345,305 B1 2/2002 Beck et al.
6,346,952 B1 2/2002 Shtivelman
6,347,085 B2 2/2002 Kelly
6,353,608 B1 3/2002 Cullers et al.
6,353,667 B1 3/2002 Foster et al.
6,359,981 B1 3/2002 Neyman et al.

(56) References Cited

U.S. PATENT DOCUMENTS 6,362,838 B1 3/2002 Szlam et al.
6,363,411 B1 3/2002 Dugan et al.
6,366,575 B1 4/2002 Barkan et al.
6,366,586 B1 4/2002 Christie
6,366,651 B1 4/2002 Griffith et al.
6,366,656 B1 4/2002 Lee et al.
6,366,658 B1 4/2002 Bjornberg et al.
6,366,663 B1 4/2002 Bauer et al.
6,366,925 B1 4/2002 Meltzer et al.
6,370,238 B1 4/2002 Sansone et al.
6,370,508 B2 4/2002 Beck et al.
6,370,567 B1 4/2002 Ouchi
6,373,836 B1 4/2002 Deryugin et al.
6,373,937 B1 4/2002 Yegoshin
6,377,568 B1 4/2002 Kelly
6,377,583 B1 4/2002 Lyles et al.
6,377,944 B1 4/2002 Busey et al.
6,377,975 B1 4/2002 Florman
6,381,640 B1 4/2002 Beck et al.
6,385,191 B1 5/2002 Coffman et al.
6,385,202 B1 5/2002 Katseff et al.
6,385,646 B1 5/2002 Brown et al.
6,389,007 B1 5/2002 Shenkman et al.
6,389,133 B1 5/2002 Kamen
6,393,018 B2 5/2002 Miloslavsky
6,393,122 B1 5/2002 Belzile
6,393,278 B1 5/2002 Buchanan et al.
6,393,481 B1 5/2002 Deo et al.
6,396,834 B1 5/2002 Bonomi et al.
6,396,919 B1 5/2002 Shimada et al.
6,400,725 B1 6/2002 Ross
6,401,066 B1 6/2002 McIntosh
6,401,094 B1 6/2002 Stemp et al.
6,405,033 B1 6/2002 Kennedy, III et al.
6,407,996 B1 6/2002 Witchalls
6,407,999 B1 6/2002 Olkkonen et al.
6,408,064 B1 6/2002 Fedorov et al.
6,411,806 B1 6/2002 Garner et al.
6,418,146 B1 7/2002 Miloslavsky
6,418,199 B1 7/2002 Perrone
6,424,709 B1 7/2002 Doyle et al.
6,427,002 B2 7/2002 Campbell et al.
6,430,174 B1 8/2002 Jennings et al.
6,430,282 B1 8/2002 Bannister et al.
6,434,231 B2 8/2002 Neyman et al.
6,434,530 B1 8/2002 Sloane et al.
6,434,549 B1 8/2002 Linetsky et al.
6,442,242 B1 8/2002 McAllister et al.
6,442,247 B1 8/2002 Garcia
6,445,788 B1 9/2002 Torba
6,449,260 B1 9/2002 Sassin et al.
6,449,270 B1 9/2002 Miloslavsky
6,449,358 B1 9/2002 Anisimov et al.
6,449,646 B1 9/2002 Sikora et al.
6,452,609 B1 9/2002 Katinsky et al.
6,453,038 B1 9/2002 McFarlane et al.
6,453,341 B1 9/2002 Miloslavsky
6,456,615 B1 9/2002 Kikinis
6,456,619 B1 9/2002 Sassin et al.
6,459,697 B1 10/2002 Neyman
6,463,148 B1 10/2002 Brady
6,470,010 B1 10/2002 Szviatovszki et al.
6,470,080 B2 10/2002 Perlmutter
6,473,787 B2 10/2002 Miloslavsky
6,480,600 B1 11/2002 Neyman et al.
6,487,663 B1 11/2002 Jaisimha et al.
6,489,954 B1 12/2002 Powlette
6,490,350 B2 12/2002 McDuff et al.
6,493,353 B2 12/2002 Kelly et al.
6,493,433 B2 12/2002 Clabaugh et al.
6,493,447 B1 12/2002 Goss et al.
6,496,567 B1 12/2002 Bjornberg et al.
6,496,702 B1 12/2002 Lockhart
6,496,981 B1 12/2002 Wistendahl et al.
6,498,897 B1 12/2002 Nelson et al.
6,499,088 B1 12/2002 Wexler et al.
6,512,825 B1 1/2003 Lindholm et al.
6,515,996 B1 2/2003 Tonnby et al.
6,519,246 B1 2/2003 Strahs
6,519,617 B1 2/2003 Wanderski et al.
6,532,493 B1 3/2003 Aviani, Jr. et al.
6,535,492 B2 3/2003 Shtivelman
6,535,601 B1 3/2003 Flockhart et al.
6,536,043 B1 3/2003 Guedalia
6,539,419 B2 3/2003 Beck et al.
6,546,405 B2 4/2003 Gupta et al.
6,549,539 B1 4/2003 Neyman
6,553,114 B1 4/2003 Fisher et al.
6,554,183 B1 4/2003 Sticha et al.
6,560,328 B1 5/2003 Bondarenko et al.
6,560,329 B1 5/2003 Draginich et al.
6,560,607 B1 5/2003 Lassesen
6,563,788 B1 5/2003 Torba et al.
6,567,854 B1 5/2003 Olshansky et al.
6,581,105 B2 6/2003 Miloslavsky et al.
6,594,269 B1 7/2003 Polcyn
6,594,347 B1 7/2003 Calder et al.
6,597,685 B2 7/2003 Miloslavsky et al.
6,600,733 B2 7/2003 Deng
6,600,822 B2 7/2003 Kamen
6,603,762 B1 8/2003 Kikinis
6,603,854 B1 * 8/2003 Judkins ..... H04M 3/5183 379/265.06
6,611,498 B1 8/2003 Baker et al.
6,611,590 B1 8/2003 Lu et al.
6,614,780 B2 9/2003 Hakim et al.
6,614,781 B1 9/2003 Elliott et al.
6,625,139 B2 * 9/2003 Miloslavsky et al. ..... 370/352
6,628,666 B1 9/2003 Pickering et al.
6,631,399 B1 10/2003 Stanczak et al.
6,633,910 B1 10/2003 Rajan et al.
6,650,747 B1 11/2003 Bala et al.
6,651,085 B1 * 11/2003 Woods ..... 709/203
6,658,389 B1 12/2003 Alpdemir
6,661,882 B1 * 12/2003 Muir ..... H04M 3/493 379/127.01
6,665,395 B1 12/2003 Busey et al.
6,665,396 B1 12/2003 Khouri et al.
6,668,286 B2 12/2003 Bateman et al.
6,678,718 B1 1/2004 Khouri et al.
6,681,010 B1 1/2004 Anderson et al.
6,687,241 B1 * 2/2004 Goss ..... H04L 29/06 370/352
6,690,788 B1 2/2004 Bauer et al.
6,693,893 B1 2/2004 Ehlinger
6,704,394 B1 3/2004 Kambhatla et al.
6,704,409 B1 3/2004 Dilip et al.
6,704,410 B1 3/2004 McFarlane et al.
6,704,411 B1 * 3/2004 Nishidate ..... 379/265.09
6,707,903 B2 3/2004 Burok et al.
6,711,249 B2 3/2004 Weissman et al.
6,711,611 B2 3/2004 Hanhan
6,714,643 B1 3/2004 Gargeya et al.
6,718,032 B1 4/2004 Vrenjak et al.
6,718,366 B2 4/2004 Beck et al.
6,721,306 B1 4/2004 Farris et al.
6,731,626 B1 5/2004 Neyman
6,735,298 B2 5/2004 Neyman et al.
6,744,877 B1 6/2004 Edwards
6,744,878 B1 * 6/2004 Komissarchik et al. 379/265.03
6,748,211 B1 6/2004 Isaac et al.
6,751,210 B1 6/2004 Shaffer et al.
6,753,784 B1 6/2004 Sznaider et al.
6,754,181 B1 6/2004 Elliott et al.
6,760,322 B1 7/2004 Fukuda et al.
6,760,324 B1 7/2004 Scott et al.
6,760,428 B2 7/2004 Foster
6,760,727 B1 * 7/2004 Schroeder et al. ..... 707/10
6,763,104 B1 7/2004 Judkins et al.
6,763,369 B1 7/2004 Ytuarte et al.
6,771,765 B1 8/2004 Crowther et al.
6,778,527 B1 8/2004 Amin
6,785,375 B1 8/2004 Beddus et al.
6,785,710 B2 8/2004 Kikinis

(56) References Cited

U.S. PATENT DOCUMENTS 6,785,740 B1 8/2004 Yoneda et al.
6,788,779 B2 9/2004 Ostapchuck
6,798,771 B1 9/2004 Low et al.
6,801,520 B2 10/2004 Philonenko
6,801,928 B2 10/2004 Nuestro
6,804,346 B1 10/2004 Mewhinney
6,816,871 B2 11/2004 Lee
6,816,878 B1 11/2004 Zimmers et al.
6,823,197 B1 11/2004 Chen et al.
6,829,349 B1 12/2004 Neale et al.
6,845,154 B1 1/2005 Cave et al.
6,847,715 B1 1/2005 Swartz
6,847,825 B1 1/2005 Duvall et al.
6,850,602 B1 2/2005 Chou
6,850,614 B1 2/2005 Collins
6,859,529 B2 2/2005 Duncan et al.
6,865,267 B2 3/2005 Dezonno
6,868,391 B1 3/2005 Hultgren
6,874,119 B2 3/2005 Macleod Beck et al.
6,876,632 B1 4/2005 Takeda
6,879,586 B2 4/2005 Miloslavsky et al.
6,882,996 B2 4/2005 Preisig et al.
6,898,190 B2 5/2005 Shtivelman et al.
6,903,685 B1 6/2005 Arndt et al.
6,907,112 B1 6/2005 Guedalia et al.
6,907,455 B1 6/2005 Wolfe et al.
6,910,072 B2 6/2005 Macleod Beck et al.
6,912,272 B2 6/2005 Kirk et al.
6,922,411 B1 7/2005 Taylor
6,922,689 B2 7/2005 Shtivelman
6,925,161 B2 8/2005 Burg et al.
6,934,379 B2 8/2005 Falcon et al.
6,934,381 B1 8/2005 Klein et al.
6,944,272 B1 9/2005 Thomas
6,958,994 B2 10/2005 Zhakov et al.
6,965,870 B1 11/2005 Petras et al.
6,965,914 B2 11/2005 Dowling
6,970,844 B1 11/2005 Bierenbaum
6,977,740 B1 12/2005 Mandalia
6,981,020 B2 12/2005 Miloslavsky et al.
6,985,478 B2 1/2006 Pogossiants et al.
6,985,943 B2 1/2006 Deryugin et al.
6,987,977 B2 1/2006 Lockhart
6,996,603 B1 2/2006 Srinivasan
7,006,614 B2 2/2006 Feinberg et al.
7,020,264 B1 3/2006 Neyman et al.
7,031,442 B1 4/2006 Neyman et al.
7,036,128 B1 * 4/2006 Julia ..... G06F 9/465
707/E17.071
7,039,176 B2 5/2006 Borodow et al.
7,039,857 B2 5/2006 Beck et al.
7,076,048 B2 7/2006 Lee et al.
7,079,641 B2 7/2006 Ostapchuck
7,080,092 B2 7/2006 Upton
7,088,814 B1 8/2006 Shaffer et al.
7,092,509 B1 8/2006 Mears et al.
7,106,850 B2 9/2006 Campbell et al.
7,110,523 B2 9/2006 Gagle et al.
7,110,525 B1 * 9/2006 Heller ..... H04M 3/523
379/265.11
7,117,244 B2 10/2006 Florman et al.
7,120,700 B2 10/2006 Macleod Beck et al.
7,127,400 B2 10/2006 Koch
7,133,830 B1 11/2006 Hoban et al.
7,136,475 B1 11/2006 Rogers et al.
7,155,496 B2 12/2006 Froyd et al.
7,155,512 B2 12/2006 Lean et al.
7,159,224 B2 1/2007 Sharma et al.
7,167,924 B1 1/2007 Symonds et al.
7,184,747 B2 2/2007 Bogat
7,216,350 B2 5/2007 Martin et al.
7,221,377 B1 5/2007 Okita et al.
7,222,301 B2 5/2007 Makagon et al.
7,231,032 B2 6/2007 Nevman et al.
7,236,486 B2 6/2007 Baker et al.
7,236,584 B2 6/2007 Torba
7,242,760 B2 7/2007 Shires
7,245,641 B2 7/2007 Kim et al.
7,245,711 B2 7/2007 Margolis
7,246,009 B2 7/2007 Hamblen et al.
7,254,219 B1 8/2007 Hansen et al.
7,254,641 B2 8/2007 Broughton et al.
7,263,372 B2 8/2007 Lockhart
7,263,671 B2 8/2007 Hull et al.
7,269,263 B2 9/2007 Dedieu et al.
7,272,627 B2 9/2007 Petrovykh
7,277,424 B1 10/2007 Dowling
7,277,536 B2 10/2007 Ostapchuk
7,277,916 B2 10/2007 Nuestro
7,283,519 B2 10/2007 Girard
7,336,649 B1 2/2008 Huang
7,363,228 B2 4/2008 Wyss et al.
7,372,956 B1 5/2008 Kikinis et al.
7,373,405 B2 5/2008 Deryugin et al.
7,373,410 B2 5/2008 Monza et al.
7,376,227 B2 5/2008 Anisimov et al.
7,376,431 B2 5/2008 Niedermeyer
7,401,112 B1 7/2008 Matz et al.
7,415,009 B2 8/2008 Neyman
7,418,094 B2 8/2008 Golitsin et al.
7,428,303 B2 9/2008 Campbell et al.
7,434,204 B1 10/2008 Everingham et al.
7,457,279 B1 11/2008 Scott et al.
7,460,496 B2 12/2008 Miloslavsky et al.
7,496,640 B2 2/2009 Hanhan
7,535,479 B2 5/2009 Okita et al.
7,558,383 B2 7/2009 Shtivelman et al.
7,561,887 B2 7/2009 Lockhart
7,564,840 B2 7/2009 Elliott et al.
7,565,428 B2 7/2009 Deryugin et al.
7,609,829 B2 10/2009 Wang et al.
7,610,347 B2 10/2009 Petrovykh
7,619,996 B2 11/2009 Miloslavsky et al.
7,653,744 B2 1/2010 Kanefsky et al.
7,669,182 B2 2/2010 Garcia
7,672,998 B1 3/2010 Haskins et al.
7,706,520 B1 4/2010 Waterson et al.
7,715,332 B2 5/2010 Miloslavsky et al.
7,716,292 B2 5/2010 Kikinis
7,739,325 B1 6/2010 Okita et al.
7,764,231 B1 7/2010 Karr et al.
7,769,161 B1 8/2010 Hession et al.
7,779,067 B2 8/2010 Beck et al.
7,792,773 B2 9/2010 McCord et al.
7,808,977 B2 10/2010 Kikinis
7,823,167 B2 10/2010 Makagon et al.
7,853,717 B2 12/2010 Petrovykh
7,856,095 B2 12/2010 Brown
7,903,807 B2 3/2011 Neyman et al.
7,907,598 B2 3/2011 Anisimov et al.
7,929,978 B2 4/2011 Lockhart
7,957,401 B2 6/2011 Zalenski et al.
8,009,821 B1 8/2011 Apparao et al.
8,018,921 B2 9/2011 Pogossiants et al.
8,024,401 B1 9/2011 Gurbani et al.
8,031,698 B2 10/2011 Neyman
8,036,214 B2 10/2011 Elliott et al.
8,059,812 B1 11/2011 Bundy
8,068,598 B1 11/2011 Russi et al.
8,085,761 B2 12/2011 Elliott et al.
8,089,958 B2 1/2012 Elliott et al.
8,126,133 B1 2/2012 Everingham et al.
8,130,749 B2 3/2012 Kikinis
8,180,662 B2 5/2012 Minert et al.
8,180,666 B2 5/2012 Minert et al.
8,199,891 B2 6/2012 Brown et al.
8,209,207 B2 6/2012 Minert et al.
8,209,209 B2 6/2012 Minert et al.
8,223,948 B2 7/2012 Minert et al.
8,226,477 B1 7/2012 Machado et al.
8,254,404 B2 8/2012 Rabenko et al.
8,254,558 B2 8/2012 Minert et al.
8,270,421 B2 9/2012 Elliott et al.
8,275,111 B2 9/2012 Golitsin et al.

(56) References Cited

U.S. PATENT DOCUMENTS 8,345,856 B1 1/2013 Anisimov et al.
8,351,595 B2 1/2013 Peterson et al.
8,358,769 B2 1/2013 Neyman et al.
8,395,994 B2 3/2013 Stevenson et al.
8,396,205 B1 3/2013 Lowry et al.
8,411,844 B1 4/2013 Anisimov et al.
8,693,347 B2 4/2014 Elliott et al.
9,002,920 B2 4/2015 Deryugin et al.
RE45,583 E 6/2015 Lockhart
9,118,781 B1 8/2015 Kavulak et al.
9,241,258 B2 1/2016 Ku et al.
9,247,053 B1 1/2016 Bruce et al.
2001/0000458 A1 4/2001 Shtivelman et al.
2001/0001150 A1 5/2001 Miloslavsky
2001/0005382 A1 6/2001 Cave et al.
2001/0008555 A1 7/2001 Bae et al.
2001/0011366 A1 8/2001 Beck et al.
2001/0013041 A1 8/2001 Macleod Beck et al.
2001/0014604 A1 8/2001 Kingdon et al.
2001/0023430 A1 9/2001 Srinivasan
2001/0023448 A1 9/2001 Hanhan
2001/0024497 A1* 9/2001 Campbell ..... H04M 3/5125 379/265.09
2001/0025309 A1 9/2001 Macleod Beck et al.
2001/0028649 A1 10/2001 Pogossiants et al.
2001/0029519 A1 10/2001 Hallinan et al.
2001/0037316 A1 11/2001 Shiloh
2001/0038624 A1 11/2001 Greenberg et al.
2001/0040887 A1 11/2001 Shtivelman et al.
2001/0042095 A1 11/2001 Kim et al.
2001/0043586 A1 11/2001 Miloslavsky
2001/0043589 A1 11/2001 Kikinis
2001/0044676 A1 11/2001 Macleod Beck et al.
2001/0044828 A1 11/2001 Kikinis
2001/0047262 A1 11/2001 Kurganov et al.
2001/0054064 A1 12/2001 Kannan
2002/0001300 A1 1/2002 Miloslavsky et al.
2002/0012428 A1 1/2002 Neyman et al.
2002/0013150 A1 1/2002 McKenna et al.
2002/0019844 A1 2/2002 Kurowski et al.
2002/0019846 A1 2/2002 Miloslavsky et al.
2002/0025819 A1 2/2002 Cetusic et al.
2002/0035647 A1 3/2002 Brown et al.
2002/0037076 A1 3/2002 Perlmutter
2002/0041674 A1 4/2002 Kamen
2002/0054579 A1 5/2002 Miloslavsky
2002/0055853 A1 5/2002 Macleod Beck et al.
2002/0056000 A1 5/2002 Albert Coussement
2002/0057671 A1 5/2002 Kikinis
2002/0059164 A1 5/2002 Shtivelman
2002/0059374 A1 5/2002 Nuestro
2002/0060988 A1 5/2002 Shtivelman
2002/0062385 A1 5/2002 Dowling
2002/0064149 A1 5/2002 Elliott et al.
2002/0071529 A1 6/2002 Nelkenbaum
2002/0076031 A1 6/2002 Falcon et al.
2002/0078150 A1 6/2002 Thompson et al.
2002/0087648 A1 7/2002 Petrovykh
2002/0091527 A1 7/2002 Shiau
2002/0091726 A1 7/2002 Macleod Beck et al.
2002/0095462 A1* 7/2002 Beck et al. ..... 709/204
2002/0097708 A1 7/2002 Deng
2002/0099738 A1 7/2002 Grant
2002/0101866 A1 8/2002 Miloslavsky et al.
2002/0101880 A1 8/2002 Kim
2002/0103998 A1 8/2002 DeBruine
2002/0105957 A1 8/2002 Bondarenko et al.
2002/0114278 A1 8/2002 Coussement
2002/0114441 A1 8/2002 Coussement
2002/0120719 A1 8/2002 Lee et al.
2002/0123899 A1 9/2002 Hall et al.
2002/0126678 A1 9/2002 Kelly et al.
2002/0126828 A1 9/2002 Kamen
2002/0131399 A1 9/2002 Philonenko
2002/0136167 A1 9/2002 Steele et al.
2002/0150311 A1 10/2002 Lynn
2002/0169834 A1 11/2002 Miloslavsky et al.
2002/0174436 A1 11/2002 Wu et al.
2002/0176404 A1 11/2002 Girard
2003/0002479 A1 1/2003 Vortman et al.
2003/0002652 A1 1/2003 Neyman et al.
2003/0002654 A1 1/2003 Torba
2003/0007621 A1 1/2003 Graves et al.
2003/0009530 A1 1/2003 Philonenko et al.
2003/0018702 A1 1/2003 Broughton et al.
2003/0018729 A1 1/2003 Miloslavsky
2003/0021259 A1 1/2003 Miloslavsky et al.
2003/0021406 A1 1/2003 Ostapchuck
2003/0026414 A1 2/2003 Baker et al.
2003/0037113 A1* 2/2003 Petrovykh ..... 709/205
2003/0043832 A1 3/2003 Anisimov et al.
2003/0051037 A1 3/2003 Sundaram et al.
2003/0055884 A1 3/2003 Yuen et al.
2003/0058884 A1 3/2003 Kallner et al.
2003/0084128 A1 5/2003 Anderson et al.
2003/0084349 A1 5/2003 Friedrichs et al.
2003/0088421 A1 5/2003 Maes et al.
2003/0097457 A1 5/2003 Saran et al.
2003/0099343 A1 5/2003 Dezonno
2003/0115353 A1 6/2003 Deryugin et al.
2003/0125048 A1 7/2003 Lockhart
2003/0135592 A1 7/2003 Vetter et al.
2003/0161296 A1 8/2003 Butler et al.
2003/0161448 A1 8/2003 Parolkar et al.
2003/0179729 A1 9/2003 MacLeod Beck et al.
2003/0212558 A1 11/2003 Matula
2003/0216923 A1 11/2003 Gilmore et al.
2003/0219029 A1 11/2003 Pickett
2003/0220875 A1 11/2003 Lam et al.
2003/0229529 A1 12/2003 Mui et al.
2004/0006739 A1 1/2004 Mulligan
2004/0017797 A1 1/2004 Chen et al.
2004/0019638 A1 1/2004 Makagon et al.
2004/0030557 A1 2/2004 Culy et al.
2004/0047302 A1 3/2004 Dezonno et al.
2004/0054743 A1 3/2004 McPartlan et al.
2004/0064348 A1 4/2004 Humenansky et al.
2004/0081183 A1 4/2004 Monza et al.
2004/0083195 A1 4/2004 McCord et al.
2004/0083281 A1 4/2004 Makagon et al.
2004/0083479 A1 4/2004 Bondarenko et al.
2004/0083482 A1 4/2004 Makagon et al.
2004/0102977 A1 5/2004 Metzler et al.
2004/0107025 A1 6/2004 Ransom et al.
2004/0111269 A1 6/2004 Koch
2004/0120502 A1 6/2004 Strathmeyer et al.
2004/0169675 A1 9/2004 Beck et al.
2004/0179516 A1 9/2004 Neyman
2004/0181574 A1 9/2004 Hanhan
2004/0199580 A1 10/2004 Zhakov et al.
2004/0208134 A1 10/2004 Neyman et al.
2004/0208309 A1 10/2004 Miloslavsky
2004/0213400 A1 10/2004 Golitsin et al.
2004/0223490 A1 11/2004 Donovan et al.
2004/0264678 A1 12/2004 Ostapchuck
2004/0267892 A1 12/2004 Kikinis
2005/0013417 A1 1/2005 Zimmers et al.
2005/0033851 A1 2/2005 Kikinis
2005/0041678 A1 2/2005 Nuestro
2005/0128961 A1 6/2005 Miloslavsky et al.
2005/0147090 A1 7/2005 MacLeod Beck et al.
2005/0154792 A1 7/2005 Deryugin et al.
2005/0207559 A1 9/2005 Shtivelman et al.
2006/0029206 A1 2/2006 Anisimov et al.
2006/0034262 A1 2/2006 Pogossiants et al.
2006/0079250 A1 4/2006 Lockhart
2006/0080107 A1 4/2006 Hill et al.
2006/0095568 A1 5/2006 Makagon et al.
2006/0109976 A1 5/2006 Sundaram et al.
2006/0133594 A1 6/2006 Neyman et al.
2006/0153173 A1 7/2006 Beck et al.
2006/0209797 A1 9/2006 Anisimov et al.
2006/0210047 A1 9/2006 Neyman et al.
2006/0245421 A1 11/2006 Ostapchuk

(56) References Cited

U.S. PATENT DOCUMENTS

| | | | |
|---|---|---|---|
| 2007/0002744 | A1 | 1/2007 | Mewhinney et al. |
| 2007/0041525 | A1 | 2/2007 | Tingley et al. |
| 2007/0041567 | A1 | 2/2007 | Anisimov et al. |
| 2007/0071224 | A1 | 3/2007 | Shtivelman et al. |
| 2007/0110043 | A1 | 5/2007 | Girard |
| 2007/0127707 | A1 | 6/2007 | Koser et al. |
| 2007/0143301 | A1 | 6/2007 | Tran |
| 2007/0195940 | A1 | 8/2007 | Miloslavsky et al. |
| 2007/0213073 | A1 | 9/2007 | Lockhart |
| 2007/0274495 | A1 | 11/2007 | Youd et al. |
| 2008/0002822 | A1 | 1/2008 | Petrovykh |
| 2008/0013531 | A1 | 1/2008 | Elliott et al. |
| 2008/0025295 | A1 | 1/2008 | Elliott et al. |
| 2008/0034354 | A1 | 2/2008 | Brughton et al. |
| 2008/0043728 | A1 | 2/2008 | Miloslavsky et al. |
| 2008/0043955 | A1 | 2/2008 | Shtivelman et al. |
| 2008/0043975 | A1 | 2/2008 | Miloslavsky et al. |
| 2008/0043977 | A1 | 2/2008 | Neyman et al. |
| 2008/0046504 | A1 | 2/2008 | Deryugin et al. |
| 2008/0046531 | A1 | 2/2008 | Shtivelman et al. |
| 2008/0049731 | A1 | 2/2008 | Kikinis |
| 2008/0049737 | A1 | 2/2008 | Neyman |
| 2008/0049928 | A1 | 2/2008 | Miloslavsky et al. |
| 2008/0049929 | A1 | 2/2008 | Miloslavsky et al. |
| 2008/0062971 | A1 | 3/2008 | Kikinis |
| 2008/0130844 | A1 | 6/2008 | Hubbard et al. |
| 2008/0205378 | A1 | 8/2008 | Wyss et al. |
| 2008/0222240 | A1 | 9/2008 | Deryugin et al. |
| 2008/0285739 | A1 | 11/2008 | Golitsin et al. |
| 2009/0089136 | A1 | 4/2009 | Minert et al. |
| 2009/0089451 | A1 | 4/2009 | Petrovykh |
| 2009/0227267 | A1 | 9/2009 | Lockhart |
| 2009/0240346 | A1 | 9/2009 | Cadigan, Jr. et al. |
| 2010/0106710 | A1 | 4/2010 | Nishizawa et al. |
| 2010/0157979 | A1 | 6/2010 | Anisimov et al. |
| 2010/0198930 | A1 | 8/2010 | Kikinis |
| 2011/0099602 | A1 | 4/2011 | Apparao et al. |
| 2011/0110363 | A1 | 5/2011 | Anandani |
| 2011/0178946 | A1 | 7/2011 | Minert et al. |
| 2011/0179304 | A1 | 7/2011 | Peterson |
| 2011/0179398 | A1 | 7/2011 | Peterson |
| 2011/0182418 | A1 | 7/2011 | Anisimov et al. |
| 2012/0047266 | A1 | 2/2012 | Minert |
| 2012/0066016 | A1 | 3/2012 | Minert et al. |
| 2012/0177195 | A1 | 7/2012 | Elliott et al. |
| 2012/0195415 | A1 | 8/2012 | Wyss et al. |
| 2012/0250849 | A1 | 10/2012 | Liu et al. |
| 2013/0016115 | A1 | 1/2013 | Minert et al. |
| 2013/0070757 | A1 | 3/2013 | Elliott et al. |
| 2013/0129067 | A1 | 5/2013 | Neyman et al. |
| 2013/0230160 | A1 | 9/2013 | Neyman et al. |
| 2014/0376708 | A1 | 12/2014 | Deryugin et al. |
| 2014/0379936 | A1 | 12/2014 | Anisimov et al. |
| 2015/0201021 | A1 | 7/2015 | Beck et al. |
| 2015/0244870 | A1 | 8/2015 | Neyman et al. |

FOREIGN PATENT DOCUMENTS

| | | | |
|---|---|---|---|
| AT | 316736 | | 2/2006 |
| AT | 317621 | | 2/2006 |
| AT | 318048 | | 3/2006 |
| AT | 337678 | | 9/2006 |
| AT | 379921 | | 12/2007 |
| AT | 380434 | | 12/2007 |
| AT | 384398 | | 2/2008 |
| AT | 388578 | | 3/2008 |
| AT | 401736 | | 8/2008 |
| AT | 413059 | | 11/2008 |
| AT | 424090 | | 3/2009 |
| AT | 465451 | | 5/2010 |
| AT | 474415 | | 7/2010 |
| AU | 2604797 | | 10/1997 |
| AU | 718233 | B2 | 3/1998 |
| AU | 5274398 | | 3/1998 |
| AU | 6023598 | | 8/1998 |
| AU | 6034698 | | 8/1998 |
| AU | 6167398 | | 8/1998 |
| AU | 6319498 | | 8/1998 |
| AU | 6655298 | | 9/1998 |
| AU | 6655398 | | 9/1998 |
| AU | 7099298 | | 10/1998 |
| AU | 735134 | B2 | 3/1999 |
| AU | 736449 | B2 | 4/1999 |
| AU | 737483 | B2 | 4/1999 |
| AU | 743217 | B2 | 4/1999 |
| AU | 745404 | B2 | 4/1999 |
| AU | 748636 | B2 | 4/1999 |
| AU | 9225198 | | 4/1999 |
| AU | 9228098 | | 4/1999 |
| AU | 9381998 | | 4/1999 |
| AU | 9479298 | | 4/1999 |
| AU | 743880 | B2 | 5/1999 |
| AU | 1118899 | | 5/1999 |
| AU | 740090 | B2 | 6/1999 |
| AU | 743737 | B2 | 6/1999 |
| AU | 744340 | B2 | 6/1999 |
| AU | 1120099 | | 6/1999 |
| AU | 1276799 | | 6/1999 |
| AU | 1286299 | | 6/1999 |
| AU | 741437 | B2 | 8/1999 |
| AU | 758713 | B2 | 8/1999 |
| AU | 2595499 | | 8/1999 |
| AU | 2595599 | | 8/1999 |
| AU | 2667299 | | 8/1999 |
| AU | 2674899 | | 8/1999 |
| AU | 739979 | B2 | 9/1999 |
| AU | 2674799 | | 9/1999 |
| AU | 749023 | B2 | 12/1999 |
| AU | 4427299 | | 12/1999 |
| AU | 4819499 | | 12/1999 |
| AU | 746085 | B2 | 1/2000 |
| AU | 4426799 | | 1/2000 |
| AU | 750215 | B2 | 4/2000 |
| AU | 754238 | B2 | 4/2000 |
| AU | 755234 | B2 | 4/2000 |
| AU | 5807099 | | 4/2000 |
| AU | 5810599 | | 4/2000 |
| AU | 5813699 | | 4/2000 |
| AU | 748456 | B2 | 5/2000 |
| AU | 751143 | B2 | 5/2000 |
| AU | 751232 | B2 | 5/2000 |
| AU | 751269 | B2 | 5/2000 |
| AU | 751301 | B2 | 5/2000 |
| AU | 755138 | B2 | 5/2000 |
| AU | 1233800 | | 5/2000 |
| AU | 1327200 | | 5/2000 |
| AU | 1328200 | | 5/2000 |
| AU | 1328300 | | 5/2000 |
| AU | 1454700 | | 5/2000 |
| AU | 1717700 | | 5/2000 |
| AU | 1718600 | | 5/2000 |
| AU | 2045900 | | 6/2000 |
| AU | 748447 | B2 | 7/2000 |
| AU | 3113800 | | 7/2000 |
| AU | 2964900 | | 9/2000 |
| AU | 3470800 | | 9/2000 |
| AU | 4507700 | | 2/2001 |
| AU | 6798300 | | 4/2001 |
| AU | 1077201 | | 6/2001 |
| AU | 1077301 | | 6/2001 |
| AU | 8006800 | | 6/2001 |
| AU | 4732501 | | 10/2001 |
| AU | 5384201 | | 10/2001 |
| AU | 5724801 | | 11/2001 |
| AU | 756656 | B2 | 1/2003 |
| AU | 2003300117 | | 8/2004 |
| BR | 9913621 | A | 5/2001 |
| BR | 9913622 | A | 5/2001 |
| CA | 2178705 | A1 | 3/1997 |
| CA | 2391428 | A1 | 3/1997 |
| CA | 2259912 | C | 1/1998 |
| CA | 2280002 | A1 | 8/1998 |
| CA | 2289193 | A1 | 12/1998 |
| CA | 2289198 | A1 | 12/1998 |

(56) References Cited

FOREIGN PATENT DOCUMENTS

| | | | |
|---|---|---|---|
| CA | 2302397 | A1 | 3/1999 |
| CA | 2302488 | A1 | 3/1999 |
| CA | 2302674 | A1 | 3/1999 |
| CA | 2302680 | A1 | 3/1999 |
| CA | 2302704 | A1 | 3/1999 |
| CA | 2302678 | A1 | 4/1999 |
| CA | 2308590 | A1 | 5/1999 |
| CA | 2309185 | A1 | 5/1999 |
| CA | 2309186 | A1 | 5/1999 |
| CA | 2309183 | A1 | 6/1999 |
| CA | 2320978 | A1 | 8/1999 |
| CA | 2320979 | A1 | 8/1999 |
| CA | 2320989 | A1 | 8/1999 |
| CA | 2330608 | A1 | 12/1999 |
| CA | 2334513 | A1 | 12/1999 |
| CA | 2343286 | A1 | 3/2000 |
| CA | 2343288 | A1 | 3/2000 |
| CA | 2343756 | A1 | 3/2000 |
| CA | 2347721 | A1 | 5/2000 |
| CA | 2348567 | A1 | 5/2000 |
| CA | 2348574 | A1 | 5/2000 |
| CA | 2348575 | C | 5/2000 |
| CA | 2348994 | A1 | 5/2000 |
| CA | 2348999 | A1 | 5/2000 |
| CA | 2350515 | A1 | 5/2000 |
| CA | 2352973 | A1 | 6/2000 |
| CA | 2362172 | A1 | 8/2000 |
| CA | 2313596 | A1 | 2/2001 |
| CN | 1282484 | A | 1/2001 |
| CN | 1282485 | A | 1/2001 |
| CN | 1285990 | A | 2/2001 |
| CN | 1285991 | A | 2/2001 |
| CN | 1293798 | A | 5/2001 |
| CN | 1293858 | A | 5/2001 |
| CN | 1298590 | A | 6/2001 |
| CN | 1309861 | A | 8/2001 |
| CN | 1310822 | A | 8/2001 |
| CN | 1323418 | A | 11/2001 |
| CN | 1323421 | A | 11/2001 |
| CN | 1354942 | A | 6/2002 |
| CN | 1130061 | C | 12/2003 |
| CN | 1132399 | C | 12/2003 |
| CN | 1145314 | C | 4/2004 |
| CN | 1149521 | C | 5/2004 |
| CN | 1152549 | C | 6/2004 |
| CN | 1512724 | A | 7/2004 |
| CN | 1520197 | A | 8/2004 |
| CN | 1197336 | C | 4/2005 |
| CN | 1200548 | C | 5/2005 |
| CN | 1662025 | A | 8/2005 |
| CN | 1232077 | C | 12/2005 |
| CN | 1756280 | A | 4/2006 |
| CN | 100477702 | C | 4/2009 |
| CN | 100547568 | C | 10/2009 |
| CN | 102257789 | A | 11/2011 |
| CN | 101635775 | B | 12/2011 |
| DE | 60011863 | T2 | 12/2004 |
| DE | 69730498 | T2 | 9/2005 |
| DE | 60015236 | T2 | 2/2006 |
| DE | 69832275 | T2 | 8/2006 |
| DE | 69833285 | T2 | 9/2006 |
| DE | 69833394 | T2 | 10/2006 |
| DE | 69833462 | T2 | 10/2006 |
| DE | 69833935 | T2 | 11/2006 |
| DE | 60214191 | T2 | 12/2006 |
| DE | 69834184 | T2 | 3/2007 |
| DE | 69838795 | T2 | 10/2008 |
| DE | 69838814 | T2 | 11/2008 |
| DE | 69839022 | T2 | 1/2009 |
| DE | 69839222 | T2 | 3/2009 |
| EP | 0193961 | A2 | 9/1986 |
| EP | 0236013 | A2 | 9/1987 |
| EP | 0376517 | A2 | 7/1990 |
| EP | 0420779 | A2 | 4/1991 |
| EP | 0424015 | A2 | 4/1991 |
| EP | 0425161 | A2 | 5/1991 |
| EP | 0425163 | A2 | 5/1991 |
| EP | 0515068 | A2 | 11/1992 |
| EP | 0528732 | A1 | 2/1993 |
| EP | 0532972 | A1 | 3/1993 |
| EP | 0539105 | A2 | 4/1993 |
| EP | 0559979 | A2 | 9/1993 |
| EP | 0568770 | A2 | 11/1993 |
| EP | 0610625 | A2 | 8/1994 |
| EP | 0647050 | A2 | 4/1995 |
| EP | 0647051 | A1 | 4/1995 |
| EP | 0660573 | A2 | 6/1995 |
| EP | 0701358 | A1 | 3/1996 |
| EP | 0705017 | A2 | 4/1996 |
| EP | 0721268 | A2 | 7/1996 |
| EP | 0725526 | A2 | 8/1996 |
| EP | 0734187 | A2 | 9/1996 |
| EP | 0740450 | A2 | 10/1996 |
| EP | 0748102 | A2 | 12/1996 |
| EP | 0753956 | A2 | 1/1997 |
| EP | 0755146 | A2 | 1/1997 |
| EP | 0758175 | A1 | 2/1997 |
| EP | 0771095 | A2 | 5/1997 |
| EP | 0792076 | A2 | 8/1997 |
| EP | 0806858 | A2 | 11/1997 |
| EP | 0817455 | A2 | 1/1998 |
| EP | 0856980 | A2 | 8/1998 |
| EP | 0863651 | A2 | 9/1998 |
| EP | 0866407 | A1 | 9/1998 |
| EP | 0869639 | A2 | 10/1998 |
| EP | 0883306 | A2 | 12/1998 |
| EP | 0908047 | A1 | 4/1999 |
| EP | 0958560 | A1 | 11/1999 |
| EP | 0962087 | A1 | 12/1999 |
| EP | 1006706 | A2 | 6/2000 |
| EP | 1013062 | A1 | 6/2000 |
| EP | 1013066 | A1 | 6/2000 |
| EP | 1016280 | A1 | 7/2000 |
| EP | 1044553 | A1 | 10/2000 |
| EP | 1064630 | A1 | 1/2001 |
| EP | 1066712 | A1 | 1/2001 |
| EP | 1075153 | A2 | 2/2001 |
| EP | 1087597 | A2 | 3/2001 |
| EP | 1088277 | A1 | 4/2001 |
| EP | 1092313 | A1 | 4/2001 |
| EP | 1107555 | A2 | 6/2001 |
| EP | 1114543 | A1 | 7/2001 |
| EP | 1125214 | A1 | 8/2001 |
| EP | 1133677 | A2 | 9/2001 |
| EP | 1133736 | A1 | 9/2001 |
| EP | 1133742 | A1 | 9/2001 |
| EP | 1145153 | A1 | 10/2001 |
| EP | 1145154 | A1 | 10/2001 |
| EP | 1163564 | A2 | 12/2001 |
| EP | 1193961 | A2 | 4/2002 |
| EP | 1227635 | A2 | 7/2002 |
| EP | 1248447 | A2 | 10/2002 |
| EP | 1290861 | A1 | 3/2003 |
| EP | 1292901 | A1 | 3/2003 |
| EP | 1292939 | A1 | 3/2003 |
| EP | 1328121 | A1 | 7/2003 |
| EP | 0873642 | B1 | 4/2004 |
| EP | 1413954 | A2 | 4/2004 |
| EP | 1107615 | B1 | 6/2004 |
| EP | 1033024 | A4 | 9/2004 |
| EP | 1129545 | A1 | 9/2004 |
| EP | 1061723 | B1 | 10/2004 |
| EP | 1465397 | A1 | 10/2004 |
| EP | 1469663 | A1 | 10/2004 |
| EP | 1484903 | A2 | 12/2004 |
| EP | 1566949 | A1 | 8/2005 |
| EP | 0985308 | B1 | 11/2005 |
| EP | 1359735 | B1 | 1/2006 |
| EP | 1357729 | B1 | 2/2006 |
| EP | 1377001 | B1 | 2/2006 |
| EP | 0954922 | B1 | 3/2006 |
| EP | 0986875 | B1 | 4/2006 |
| EP | 1410614 | B1 | 8/2006 |
| EP | 1774760 | A2 | 4/2007 |

(56) References Cited

FOREIGN PATENT DOCUMENTS

| | | | |
|---|---|---|---|
| EP | 1021905 | B1 | 11/2007 |
| EP | 1031232 | B1 | 12/2007 |
| EP | 1865697 | A3 | 12/2007 |
| EP | 1040638 | B1 | 1/2008 |
| EP | 1048162 | B1 | 3/2008 |
| EP | 1157509 | B1 | 7/2008 |
| EP | 1337079 | B1 | 9/2008 |
| EP | 1326415 | B1 | 10/2008 |
| EP | 1013054 | B1 | 2/2009 |
| EP | 1333653 | B1 | 4/2009 |
| EP | 0983676 | B1 | 6/2009 |
| EP | 1125208 | B1 | 4/2010 |
| EP | 1142284 | B1 | 7/2010 |
| EP | 2380323 | A1 | 10/2011 |
| EP | 1408678 | B1 | 11/2011 |
| EP | 1057301 | B1 | 8/2013 |
| EP | 1131728 | B1 | 1/2014 |
| EP | 1625460 | B1 | 5/2014 |
| ES | 2231120 | T3 | 5/2005 |
| ES | 2255657 | T3 | 7/2006 |
| ES | 2256666 | T3 | 7/2006 |
| ES | 2257639 | T3 | 8/2006 |
| FR | 2671252 | A1 | 7/1992 |
| GB | 2273225 | A | 6/1994 |
| GB | 2306853 | A | 5/1997 |
| GB | 2315190 | A | 1/1998 |
| GB | 2324627 | A | 10/1998 |
| GB | 2369263 | A | 5/2002 |
| JP | 61-51247 | | 3/1986 |
| JP | 62-200956 | | 9/1987 |
| JP | 63-149955 | | 6/1988 |
| JP | 64-7460 | | 1/1989 |
| JP | 64-77265 | | 3/1989 |
| JP | 02-170756 | | 7/1990 |
| JP | 02-298154 | | 12/1990 |
| JP | 03-052443 | | 3/1991 |
| JP | 03-160865 | | 7/1991 |
| JP | 03-177144 | | 8/1991 |
| JP | 04-40723 | | 2/1992 |
| JP | 4-66858 | | 6/1992 |
| JP | 04-265049 | | 9/1992 |
| JP | 4-336742 | | 11/1992 |
| JP | 04-371056 | | 12/1992 |
| JP | 06-044157 | | 2/1994 |
| JP | 06-046150 | | 2/1994 |
| JP | 06-066830 | | 3/1994 |
| JP | 06-069988 | | 3/1994 |
| JP | 06-83771 | | 3/1994 |
| JP | 06-90292 | | 3/1994 |
| JP | 06-103058 | | 4/1994 |
| JP | 06-121051 | | 4/1994 |
| JP | 06-284203 | | 7/1994 |
| JP | 06-261129 | | 9/1994 |
| JP | 06-291877 | | 10/1994 |
| JP | 06-334748 | | 12/1994 |
| JP | 07-046321 | | 2/1995 |
| JP | 07-058851 | | 3/1995 |
| JP | 07-115471 | | 5/1995 |
| JP | 07-170288 | | 7/1995 |
| JP | 07-170546 | | 7/1995 |
| JP | 07-262104 | | 10/1995 |
| JP | 07-212471 | | 11/1995 |
| JP | 07-319538 | | 12/1995 |
| JP | 07-336447 | | 12/1995 |
| JP | 08-46699 | | 2/1996 |
| JP | 08-056377 | | 2/1996 |
| JP | 08-163252 | | 6/1996 |
| JP | 08-181793 | | 7/1996 |
| JP | 08-504305 | | 7/1996 |
| JP | 08-214076 | | 8/1996 |
| JP | 08-214346 | | 8/1996 |
| JP | 08-510071 | | 10/1996 |
| JP | 8-321885 | | 12/1996 |
| JP | 8-329118 | | 12/1996 |
| JP | 8-331618 | | 12/1996 |
| JP | 09-036963 | | 2/1997 |
| JP | 09-501812 | | 2/1997 |
| JP | 09-504394 | | 4/1997 |
| JP | 09-149137 | | 6/1997 |
| JP | 09-163031 | | 6/1997 |
| JP | 09-224093 | | 8/1997 |
| JP | 09-508508 | | 8/1997 |
| JP | 09-233118 | | 9/1997 |
| JP | 09-265408 | | 10/1997 |
| JP | 10-11374 | | 1/1998 |
| JP | 10-13811 | | 1/1998 |
| JP | 10-51549 | | 2/1998 |
| JP | 10-093713 | | 4/1998 |
| JP | 10-093716 | | 4/1998 |
| JP | 10-504425 | | 4/1998 |
| JP | 10-116249 | | 5/1998 |
| JP | 10-143451 | | 5/1998 |
| JP | 10-506766 | | 6/1998 |
| JP | 10-214113 | | 8/1998 |
| JP | 10-224477 | | 8/1998 |
| JP | 10-509847 | | 9/1998 |
| JP | 10-304073 | | 11/1998 |
| JP | 10-304074 | | 11/1998 |
| JP | 10-327258 | | 12/1998 |
| JP | 10-513632 | | 12/1998 |
| JP | 11-055741 | | 2/1999 |
| JP | 11-506292 | | 6/1999 |
| JP | 11-183189 | | 7/1999 |
| JP | 11-508430 | | 7/1999 |
| JP | 11-508715 | | 7/1999 |
| JP | 11-317817 | | 11/1999 |
| JP | 11-512906 | | 11/1999 |
| JP | 11-346266 | | 12/1999 |
| JP | 2000-011005 | | 1/2000 |
| JP | 2000-49847 | | 2/2000 |
| JP | 2000-151819 | | 5/2000 |
| JP | 2000-514985 | | 11/2000 |
| JP | 2000-514986 | | 11/2000 |
| JP | 2000-516432 | | 12/2000 |
| JP | 2000-516795 | | 12/2000 |
| JP | 2000-517142 | | 12/2000 |
| JP | 2001-500677 | | 1/2001 |
| JP | 2001-103533 | | 4/2001 |
| JP | 2001-292236 | | 10/2001 |
| JP | 2001-516993 | | 10/2001 |
| JP | 2001-517027 | | 10/2001 |
| JP | 2001-517029 | | 10/2001 |
| JP | 2001-517038 | | 10/2001 |
| JP | 2001-518754 | | 10/2001 |
| JP | 2001-522201 | | 11/2001 |
| JP | 2001-523930 | | 11/2001 |
| JP | 3226929 | B2 | 11/2001 |
| JP | 2001-524782 | | 12/2001 |
| JP | 2001-526871 | | 12/2001 |
| JP | 2002-503903 | | 2/2002 |
| JP | 2002-503921 | | 2/2002 |
| JP | 2002-504783 | | 2/2002 |
| JP | 2002-518890 | | 6/2002 |
| JP | 2002-519762 | | 7/2002 |
| JP | 2002-525895 | | 8/2002 |
| JP | 2002-528824 | | 9/2002 |
| JP | 2002-529836 | | 9/2002 |
| JP | 2002-529943 | | 9/2002 |
| JP | 2002-529944 | | 9/2002 |
| JP | 2002-529945 | | 9/2002 |
| JP | 2002-529994 | | 9/2002 |
| JP | 2002-530010 | | 9/2002 |
| JP | 2002-534003 | | 10/2002 |
| JP | 2002-537594 | | 11/2002 |
| JP | 2003-502720 | | 1/2003 |
| JP | 2003-507908 | | 2/2003 |
| JP | 2003-510929 | | 3/2003 |
| JP | 3384792 | B2 | 3/2003 |
| JP | 3393119 | B2 | 4/2003 |
| JP | 2003-516672 | | 5/2003 |
| JP | 3453561 | B2 | 10/2003 |
| JP | 3461488 | B2 | 10/2003 |
| JP | 3516656 | B2 | 4/2004 |
| JP | 3516659 | B2 | 4/2004 |

(56) References Cited

FOREIGN PATENT DOCUMENTS

| | | | |
|---|---|---|---|
| JP | 3547142 | B2 | 7/2004 |
| JP | 3547397 | B2 | 7/2004 |
| JP | 2004-312730 | | 11/2004 |
| JP | 2005-504452 | | 2/2005 |
| JP | 3615708 | B2 | 2/2005 |
| JP | 3628962 | B2 | 3/2005 |
| JP | 2005-094780 | | 4/2005 |
| JP | 2005-102234 | | 4/2005 |
| JP | 2005-124184 | | 5/2005 |
| JP | 3681403 | B2 | 8/2005 |
| JP | 3681406 | B2 | 8/2005 |
| JP | 3686087 | B2 | 8/2005 |
| JP | 3686337 | B2 | 8/2005 |
| JP | 3735124 | B2 | 1/2006 |
| JP | 3820151 | | 9/2006 |
| JP | 2006-295947 | | 10/2006 |
| JP | 3877523 | B2 | 2/2007 |
| JP | 4057785 | B2 | 3/2008 |
| JP | 4205310 | B2 | 1/2009 |
| JP | 4234926 | B2 | 3/2009 |
| JP | 4295186 | B2 | 7/2009 |
| JP | 4450515 | B2 | 4/2010 |
| JP | 2012-513725 | | 6/2012 |
| KR | 10-2011-0098841 | A | 9/2011 |
| WO | 9208194 | A1 | 5/1992 |
| WO | 9401959 | A1 | 1/1994 |
| WO | 9429995 | A1 | 12/1994 |
| WO | 9508236 | A2 | 3/1995 |
| WO | 9520860 | A1 | 8/1995 |
| WO | 9533325 | A2 | 12/1995 |
| WO | 9614704 | A1 | 5/1996 |
| WO | 9620553 | A2 | 7/1996 |
| WO | 9623265 | A1 | 8/1996 |
| WO | 9627254 | A1 | 9/1996 |
| WO | 9701917 | A1 | 1/1997 |
| WO | 9712472 | A1 | 4/1997 |
| WO | 9713352 | A1 | 4/1997 |
| WO | 9716014 | A2 | 5/1997 |
| WO | 9718662 | A1 | 5/1997 |
| WO | 9720424 | A1 | 6/1997 |
| WO | 9722201 | A2 | 6/1997 |
| WO | 9723078 | A1 | 6/1997 |
| WO | 9726749 | A1 | 7/1997 |
| WO | 9728635 | A1 | 8/1997 |
| WO | 9729584 | A1 | 8/1997 |
| WO | 9734401 | A1 | 9/1997 |
| WO | 9736414 | A1 | 10/1997 |
| WO | 9737500 | A1 | 10/1997 |
| WO | 9738389 | A2 | 10/1997 |
| WO | 9738519 | A1 | 10/1997 |
| WO | 9750235 | A1 | 12/1997 |
| WO | 9801987 | A1 | 1/1998 |
| WO | 9810573 | A2 | 3/1998 |
| WO | 9813765 | A1 | 4/1998 |
| WO | 9813974 | A1 | 4/1998 |
| WO | 9817048 | A1 | 4/1998 |
| WO | 9827479 | A2 | 6/1998 |
| WO | 9831130 | A1 | 7/1998 |
| WO | 9834390 | A1 | 8/1998 |
| WO | 9835326 | A1 | 8/1998 |
| WO | 9835509 | A2 | 8/1998 |
| WO | 9836551 | A1 | 8/1998 |
| WO | 9837481 | A1 | 8/1998 |
| WO | 9837677 | A2 | 8/1998 |
| WO | 9837686 | A1 | 8/1998 |
| WO | 9837687 | A1 | 8/1998 |
| WO | 9844699 | A1 | 10/1998 |
| WO | 9844714 | A1 | 10/1998 |
| WO | 9848577 | A2 | 10/1998 |
| WO | 9854877 | A2 | 12/1998 |
| WO | 9856133 | A2 | 12/1998 |
| WO | 9856141 | A1 | 12/1998 |
| WO | 9857501 | A2 | 12/1998 |
| WO | 9900960 | A1 | 1/1999 |
| WO | 9900966 | A1 | 1/1999 |
| WO | 9903247 | A2 | 1/1999 |
| WO | 9912367 | A1 | 3/1999 |
| WO | 9913635 | A1 | 3/1999 |
| WO | 9914919 | A1 | 3/1999 |
| WO | 9914920 | A1 | 3/1999 |
| WO | 9914924 | A1 | 3/1999 |
| WO | 9914951 | A1 | 3/1999 |
| WO | 9917518 | A1 | 4/1999 |
| WO | 9923806 | A1 | 5/1999 |
| WO | 9923807 | A1 | 5/1999 |
| WO | 9926395 | A1 | 5/1999 |
| WO | 9926424 | A2 | 5/1999 |
| WO | 9927698 | A1 | 6/1999 |
| WO | 9941720 | A1 | 8/1999 |
| WO | 9941890 | A2 | 8/1999 |
| WO | 9941891 | A1 | 8/1999 |
| WO | 9941895 | A1 | 8/1999 |
| WO | 9943137 | A1 | 8/1999 |
| WO | 9925117 | | 10/1999 |
| WO | 9956227 | A1 | 11/1999 |
| WO | 9956229 | A1 | 11/1999 |
| WO | 9965214 | A1 | 12/1999 |
| WO | 9965252 | A2 | 12/1999 |
| WO | 9967718 | A1 | 12/1999 |
| WO | 0007332 | A2 | 2/2000 |
| WO | 0016203 | A1 | 3/2000 |
| WO | 0016207 | A1 | 3/2000 |
| WO | 0016523 | A1 | 3/2000 |
| WO | 0018094 | A1 | 3/2000 |
| WO | 0025238 | A1 | 5/2000 |
| WO | 0026804 | A1 | 5/2000 |
| WO | 0026816 | A1 | 5/2000 |
| WO | 0026817 | A1 | 5/2000 |
| WO | 0027063 | A2 | 5/2000 |
| WO | 0028425 | A1 | 5/2000 |
| WO | 0028702 | A1 | 5/2000 |
| WO | 0035173 | A1 | 6/2000 |
| WO | 0038398 | A1 | 6/2000 |
| WO | 0044159 | A1 | 7/2000 |
| WO | 0049482 | A2 | 8/2000 |
| WO | 0049778 | A1 | 8/2000 |
| WO | 0113606 | A1 | 2/2001 |
| WO | 0124025 | A1 | 4/2001 |
| WO | 0140997 | A1 | 6/2001 |
| WO | 0141372 | A1 | 6/2001 |
| WO | 0143410 | A1 | 6/2001 |
| WO | 0152513 | A1 | 7/2001 |
| WO | 0180214 | A1 | 10/2001 |
| WO | 0180540 | A1 | 10/2001 |
| WO | 0184360 | A1 | 11/2001 |
| WO | 02065741 | A2 | 8/2002 |
| WO | 03010948 | A1 | 2/2003 |
| WO | 2004063854 | A2 | 7/2004 |
| WO | 2005036907 | A1 | 4/2005 |
| WO | 2006055059 | A2 | 5/2006 |
| WO | 2010075151 | A1 | 7/2010 |

OTHER PUBLICATIONS

European Office action for Application No. 00123329.5, dated Jun. 17, 2002, 6 pages.

European Office Action for Application No. 97933327.5, dated Aug. 26, 2002, 4 pages.

European Office Action for Application No. 97933327.5, dated Feb. 7, 2002, 5 pages.

Japanese Office Action for Application No. 2000-581781, mailed Oct. 8, 2002, 4 pages.

"Competitive Gateway Product," Nikkei Communications, Japan, No. 257, Nov. 1997, 18 pages.

"Guide for the Use of Micro-Researcher II/SGR (Scroll Graph Section)," NEC Corporation, Third Edition, Chapters 1 & 5, Jul. 1995, 2 pages.

"Kana: Customer Messaging System," Kana Communications Sales Brochure, Palo Alto, CA, 1996, 12 pages.

"Latest Trend in CTI," Nikkei Communications, No. 248, Jun. 16, 1997, 14 pages.

(56) References Cited

OTHER PUBLICATIONS

"Method for Automatic Contextual Transposition Upon Receipt of Item of Specified Criteria," IBM Technical Disclosure Bulletin, vol. 37, No. 2B, Feb. 1994, 1 page.
"New Telephone Service Changing Computer Telephone Business," Nikkei Communications, Nov. 11, 1996, 7 pages.
"Single Line Suffices for Internet Telephone," Nikkei Communications, May 19, 1997, 9 pages.
"Solution Drivers/CTI, CTI Solution Strategy of Seven Computer Vendors, Toward Market Development of Mainly Bank, Insurance and Communications Markets," Computopia, Computer Age Co., Ltd., Japan, vol. 33, No. 379, 5 pages, Apr. 1998.
Bachmann, David W. et al., "NetMod: A Design Tool for Large-Scale Heterogeneous Campus Networks," Center for Information Technology Integration (CITI), The University of Michigan, Ann Arbor, MI, Jun. 15, 1990, 34 pages.
Bangun, H. et al., A Network Architecture for Multiuser Networked Games on Demand, International Conference on Information Communications and Signal Processing, ICICS '97, Sep. 9-12, 1997, 5 pages.
Beck, C. et al., Interactive process of operating system for multimedia communication center, Genesys Telecom Lab, Inc. 2014, 3 pages.
Bernett, Howard et al., "Assessing Web-Enabled Call Center Technologies," IT Pro, May/Jun. 2001, 7 pages.
Bertsekas, Dimitri et al., "Data Networks," Prentice-Hall, New Jersey, 1987, 5 pages.
Bickley, M. et al., Using Servers to Enhance Control System Capability, 1999 Particle Accelerator Conference, New York, NY, Mar. 29-Apr. 2, 1999, 3 pages.
Bradley, Kirk A. et al., "Detecting Disruptive Routers: A Distributed Network Monitoring Approach," Department of Computer Science, University of California, Davis, Sep. 1, 1998, 10 pages.
Canadian Office Action for Application No. 2,259,912, dated Nov. 19, 2001, 2 pages.
Canadian Office Action for Application No. 2,289,198, dated Jun. 28, 2002, 2 pages.
Canadian Office Action for Application No. 2,302,397, dated Apr. 23, 2002, 2 pages.
Canadian Office Action for Application No. 2,302,678, dated Apr. 23, 2002, 2 pages.
Canadian Office Action for Application No. 2308590, dated Jun. 28, 2002, 2 pages.
Canadian Office Action for Application No. 2309183, dated Jul. 23, 2002, 2 pages.
Canadian Office Action for Application No. 2320978, dated Sep. 26, 2002, 2 pages.
Chan, Kevin F. et al., "Interactive Network Planning and Analysis on a Personal Computer," Computer Applications in Power, IEEE, vol. 3, No. 1, Jan. 1990, 5 pages.
Chau, Sam et al., "Intelligent Network Routing Using CCS7 and ISDN," Global Telecommunications Conference, vol. 3, 6 pages, 1990.
Chaudhuri, Surajit et al., "Optimizing Queries over Multimedia Repositories," Hewlett-Packard Laboratories, Stanford, Mar. 1996, 12 pages.
Chaum, David, "Untraceable Electronic Mail, Return Addresses, and Digital Pseudonyms," Communications of the ACM, vol. 24, No. 2, Feb. 1981, 8 pages.
Chew, T.-S. et al., "NETPLAN-a Telecommunications Network Planning Support System," TENCON '92, IEEE Region 10 International Conference, vol. 2, 7 pages, 1992.
Chinese Office Action for Application No. 98812258.8 dated Jul. 26, 2002, 5 pages.
Chiu, H. et al., "Conferencing Metaphor," IBM Technical Disclosure Bulletin, vol. 36, No. 2, Feb. 1993, 4 pages.
Chou, Sheng-Lin., et al., "Computer Telephony Integration and Its Applications," IEEE Communications Surveys & Tutorials, vol. 3, No. 1, 2000, 10 pages.
Cordom, Christopher et al., "Conversant VIS Listens and Talks to Your Customers," AT&T Technology, vol. 9, No. 2, 4 pages, 1994.
Curbera, Francisco et al., "Unraveling the Web Services Web: An Introduction to SOAP, WSDL, and UDDI," IEEE Internet Computing, 8 pages, Mar./Apr. 2002.
D'Hooge, Herman, "The Communicating PC," IEEE Communications Magazine, 6 pages, Apr. 1996.
Durinovic-Johri, Sanja et al., "Advanced Routing Solutions for Toll-Free Customers: Algorithm Design and Performance," Proceedings of the International Teletraffic Congress, ITC-15, 1997, 12 pages.
Eren, P. Erhan, et al., "Interactive Object-Based Analysis and Manipulation of Digital Video," IEEE Workshop on Multimedia Signal Processing, 1998, 6 pages.
Esesve, D.R., "Wireless Application Protocol (WAP)," Vitam College of Engineering, No Date Available, 12 pages.
European Office action Application No. 04011886.1, dated Mar. 9, 2007, 6 pages.
European Search Report for Application No. 00123329.5, dated Jan. 30, 2002, 2 pages.
European Search Report for Application No. 97904087.0, dated Nov. 5, 2001, 3 pages.
European Search Report for Application No. 97933327.5, dated Oct. 11, 2001, 3 pages.
European Search Report for Application No. 98903471.5, dated Jul. 26, 2002, 4 pages.
European Search Report for Application No. 98903623.1, dated Apr. 17, 2002, 3 pages.
European Search Report for Application No. 98907371.3, dated Mar. 28, 2002, 3 pages.
European Search Report for Application No. 98924821.6, dated Jun. 13, 2002, 2 pages.
European Search Report for Application No. 98926248, dated Jul. 18, 2002, 3 pages.
European Search Report for Application No. 98948163.5, dated Aug. 8, 2000, 3 pages.
Festa, Paul, "Vignette Updates StoryServer Platform," CNET News.com, Sep. 16, 1997, 4 pages.
Foster, Robin Harris, "Advanced Definity Call Centers: Working for You and Your Customers," AT&T Technology, vol. 9, No. 2, 1994, 6 pages.
Francis, Paul et al., "Flexible Routing and Addressing for a Next Generation IP," SIGCOMM, 10 pages, 1994.
Gawrys, G.W., et al., "ISDN: Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct. 1989, 4 pages.
Harvey, Dean E. et al., "Call Center Solutions," AT&T Technical Journal, vol. 70, No. 5, 10 pages, Sep./ Oct. 1991.
Held, Gilbert, "Voice Over Data Networks," McGraw Hill, Texas, 1998, 16 pages.
Henderson, Shane G. et al., "Rostering by Interating Integer Programming and Simulation," Proceedings of the 1998 Winter Simulation Conference, Washington D.C., Dec. 13, 1998, 7 pages.
Hofmann, Peter. et al., "@INGate: Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Preliminary Examination Report for PCT/US01/13313, dated Apr. 22, 2002, 4 pages.
International Preliminary Examination Report for PCT/US96/16919, dated Feb. 18, 1998, 18 pages.
International Preliminary Examination Report for PCT/US97/01469, dated Oct. 14, 1998, 8 pages.
International Preliminary Examination Report for PCT/US97/11881, dated Mar. 27, 1998, 3 pages.
International Preliminary Examination Report for PCT/US98/00631, dated Sep. 10, 1999, 7 pages.

(56) References Cited

OTHER PUBLICATIONS

International Preliminary Examination Report for PCT/US98/02847, dated Jul. 9, 1999, 5 pages.
International Preliminary Examination Report for PCT/US98/13644, dated Jan. 12, 2000, 6 pages.
International Preliminary Examination Report for PCT/US98/18646, dated Oct. 30, 2000, 5 pages.
International Preliminary Examination Report for PCT/US98/18789, dated Dec. 30, 1999, 6 pages.
International Preliminary Examination Report for PCT/US98/22527, dated Jun. 30, 2000, 5 pages.
International Preliminary Examination Report for PCT/US99/12841, dated Jan. 22, 2001, 5 pages.
International Preliminary Examination Report for PCT/US99/25308, dated Sep. 10, 2000, 3 pages.
International Preliminary Examination Report for PCT/US99/25309, dated May 8, 2001, 4 pages.
International Search Report for PCT/US00/00781, dated Apr. 12, 2000, 2 pages.
International Search Report for PCT/US00/00785, dated Oct. 2, 2000, 2 pages.
International Search Report for PCT/US00/023066, dated Oct. 30, 2000, 1 page.
International Search Report for PCT/US00/27982, dated Jan. 31, 2001, 3 pages.
International Search Report for PCT/US00/27983, dated Mar. 19, 2001, 2 pages.
International Search Report for PCT/US00/27984, dated Mar. 22, 2001, 1 page.
International Search Report for PCT/US01/07457, dated Aug. 30, 2001, 1 page.
International Search Report for PCT/US01/13313, dated Jul. 6, 2001, 1 page.
International Search Report for PCT/US01/40267, dated Jul. 17, 2001, 1 page.
International Search Report for PCT/US02/23080, dated Oct. 1, 2002, 1 page.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.
International Search Report for PCT/US97/11881, dated Oct. 24, 1997, 1 page.
International Search Report for PCT/US98/00631, dated Jun. 18, 1998, 1 page.
International Search Report for PCT/US98/01158, dated Jul. 17, 1998, 1 page.
International Search Report for PCT/US98/02152, dated Jun. 25, 1998, 1 page.
International Search Report for PCT/US98/02847, dated Aug. 6, 1998, 1 page.
International Search Report for PCT/US98/02848, dated Aug. 11, 1998, 1 page.
International Search Report for PCT/US98/02923, dated Aug. 19, 1998, 1 page.
International Search Report for PCT/US98/06334, dated Sep. 1, 1998, 2 pages.
International Search Report for PCT/US98/10357, dated Jan. 14, 1999, 1 page.
International Search Report for PCT/US98/11442, dated Oct. 21, 1998, 2 pages.
International Search Report for PCT/US98/13644, dated Apr. 21, 1999, 2 pages.
International Search Report for PCT/US98/18646, dated Jan. 29, 1999, 2 pages.
International Search Report for PCT/US98/18789, dated Jan. 29, 1999, 3 pages.
International Search Report for PCT/US98/18833, dated Nov. 19, 1998, 1 page.
International Search Report for PCT/US98/18874, dated Jan. 29, 1999, 1 page.
International Search Report for PCT/US98/18989, dated Jan. 25, 1999, 1 page.
International Search Report for PCT/US98/22527, dated Apr. 2, 1999, 2 pages.
International Search Report for PCT/US98/22555, mailed Mar. 3, 1999, 1 page.
International Search Report for PCT/US98/22600, mailed Jun. 4, 1999, 1 page.
International Search Report for PCT/US98/22935, mailed Apr. 14, 1999, 1 page.
International Search Report for PCT/US99/02812, mailed May 11, 1999, 1 page.
International Search Report for PCT/US99/02814, mailed Jun. 17, 1999, 1 page.
International Search Report for PCT/US99/02822, mailed Aug. 18, 1999, 1 page.
International Search Report for PCT/US99/03038, mailed Apr. 23, 1999, 1 page.
International Search Report for PCT/US99/03039, mailed May 11, 1999, 1 page.
International Search Report for PCT/US99/12700, mailed Nov. 30, 1999, 1 page.
International Search Report for PCT/US99/12781, mailed Sep. 9, 1999, 2 pages.
International Search Report for PCT/US99/12841, mailed Sep. 10, 1999, 2 pages.
International Search Report for PCT/US99/20259, dated Feb. 15, 2000, 1 page.
International Search Report for PCT/US99/20387, dated Dec. 7, 1999, 2 pages.
International Search Report for PCT/US99/20461, dated Dec. 23, 1999, 2 pages.
International Search Report for PCT/US99/25117, dated Nov. 1, 2000, 2 pages.
International Search Report for PCT/US99/25265, dated Feb. 18, 2000, 1 page.
International Search Report for PCT/US99/25308, dated Feb. 3, 2000, 1 page.
International Search Report for PCT/US99/25309, dated Feb. 10, 2000, 1 page.
International Search Report for PCT/US99/25310, dated Feb. 10, 2000, 1 page.
International Search Report for PCT/US99/26619, dated Mar. 17, 2000, 1 page.
International Search Report for PCT/US99/26659, dated Feb. 4, 2000, 1 page.
International Search Report for PCT/US99/29043, dated Mar. 20, 2000, 1 page.
International Search Report for PCT/US99/29044, dated May 11, 2000, 1 page.
International Written Opinion for PCT/US98/22527, mailed Dec. 27, 1999, 5 pages.
Japanese Office Action for Application No. 1997-527811, mailed Oct. 10, 2000, 6 pages.
Japanese Office Action for Application No. 1998-505335, mailed Mar. 5, 2002, 7 pages.
Japanese Office Action for Application No. 1998-531244, mailed Sep. 10, 2002, 5 pages.
Japanese Office Action for Application No. 1998-536740, mailed Sep. 3, 2002, 14 pages.
Japanese Office Action for Application No. 1999-500765, mailed Sep. 3, 2002, 11 pages.
Japanese Office Action for Application No. 1999-502827, mailed Dec. 3, 2002, 4 pages.
Japanese Office Action for Application No. 1999-502827, mailed May 28, 2002, 3 pages.
Japanese Office Action for Application No. 2000-512333, mailed Sep. 3, 2002, 6 pages.

(56) References Cited

OTHER PUBLICATIONS

Japanese Office Action for Application No. 2000-512334, mailed Sep. 10, 2002, 9 pages.
Japanese Office Action for Application No. 2000-512336, mailed Jul. 23, 2002, 8 pages.
Japanese Office Action for Application No. 2000-514448, mailed Sep. 3, 2002, 10 pages.
Japanese Office Action for Application No. 2000-519541, mailed Aug. 20, 2002, 10 pages.
Japanese Office Action for Application No. 2000-522718, mailed Sep. 10, 2002, 9 pages.
Japanese Office Action for Application No. 2000-531822, mailed Sep. 24, 2002, 6 pages.
Japanese Office Action for Application No. 2000-531940, mailed Dec. 3, 2002, 4 pages.
Japanese Office Action for Application No. 2000-532958, mailed Aug. 20, 2002, 7 pages.
Japanese Office Action for Application No. 2000-554115, mailed Oct. 1, 2002, 5 pages.
Japanese Office Action for Application No. 532950, dated Dec. 17, 2002, 6 pages.
Katz, Michael, "When CTI Meets the Internet," Telecommunications, vol. 31, No. 7, Jul. 1997, 6 pages.
Kaufman, Harvey, "Call Centers in Cyberspace," Communications News, vol. 34, Issue 7, Jul. 1997, 4 pages.
Kaukonen, S., et al., "Agent-Based Conferencing Using Mobile IP-Telephony," Proceedings of Multimedia Signal Processing, 1999, 6 pages.
Kramer, Brian, "How to Send a File to the Sender of a Message?," Google Discussion Group, May 27, 1994, 5 pages.
Lee, Chien-I, et al., "A New Storage and Retrieval Method to Support Editing Operations in a Multi-Disk-based Video Server," Fourth International Conference on Parallel and Distributed Information Systems, IEEE, Miami Beach, FL, Dec. 1996, 10 pages.
Lin, Yi-Bing et al., "A Flexible Graphical User Interface for Performance Modeling," Software—Practice and Experience, vol. 25(2), Feb. 1995, 24 pages.
Low, Colin, "The Internet Telephony Red Herring," Global Telecommunications Conference, Nov. 1996, 15 pages.
Mackay, Wendy E., et al., "Virtual Video Editing in Interactive Multimedia Applications," Communications of the ACM, vol. 32, No. 7, Jul. 1989, 9 pages.
Malabocchia, Fabio, et al., "Mining Telecommunications Data Bases: An Approach to Support the Business Management," Network Operations and Management Symposium, IEEE, vol. 1, Feb. 1998, 9 pages.
Masashi, Tsuboi et al., "Computer Telephony Integration System," CTStage, Oki Electric Research and Development, 174, vol. 64, No. 2, Apr. 1, 1997, 10 pages.
Matsumoto, Akihiko, "Bank CTI/Call Center Using Up Customer Information, Analysis of Six Major Manufacturers' Solutions," Network Computing, Ric Telecom Corporation, Japan, vol. 10, No. 10, Oct. 1, 1998, 13 pages.
Matsuo, Yasunori, "Microsoft Project for Windows 95," Nikkei Personal Computing, Nikkei Business Publications, Inc., No. 255, Dec. 18, 1995, 2 pages.
Mattison, Rob, "Data Warehousing and Data Mining for Telecommunications," Artech House, Boston, 1997, 7 pages.
Metz, Christopher, "IP Routers: New Tool for Gigabit Networking," On the Wire, IEEE Internet, Nov./ Dec. 1998, 5 pages.
Microsoft Dictionary Pages, Microsoft Press, Redmond, WA, 1991, 2 pages.
Monson-Haefel, Richard, "Enterprise JavaBeans," O'Reilly & Assoc., 2nd Ed., 1999, 7 pages.
Murayama, Hideki, "Integrated Customer Supporting System View Workshop/CS, OA Business Personal Computer," NEC Business System, Denpa Press Co., Ltd., vol. 15, No. 12, Dec. 1997, 6 pages.
Nariani, Sushil, "Internet Telephony," Whatis.com, Oct. 25, 1999, 2 pages.
Newton's Telecom Dictionary, The Official Dictionary of Telcommunications & the Internet, 16th Edition, Telecom Books, Feb. 2000, 3 pages.
Newton, Harry, "Newton's Telecom Dictionary," Flatiron Publishing, New York, 1994, 7 pages.
Orozco-Barbosa, Luis et al., "Design and Performance Evaluation of Intelligent Multimedia Services," Computer Communications, vol. 20, 1997, 14 pages.
Padmanabhan, M., et al. Speech Recognition Performance on a Voicemail Transcription Task, IBM T.J. Watson Research Center, Yorktown Height, NY, 4 pages.
Rangan, P. Venkat, et al., "A Window-Based Editor for Digital Video and Audio," Proceedings of the 25th Hawaii International Conference on System Sciences, IEEE, vol. 2, Jan. 1992, 9 pages.
Recker, Mimi M. et al., "Predicting Document Access in Large, Multimedia Repositories," ACM Transactions on Computer-Human Interaction, vol. 3, 1994, 23 pages.
Rodriguez-Martinez, Manuel et al., "MOCHA: A Self-Extensible Database Middleware System for Distributed Data Sources," International Conference on Management Data—SIGMOD, 2000, 12 pages.
Rosenberg, Arthur M., "Call Center Computer Telephony: Technology Overview," Gartner, Inc., Jan. 1998 (24 pages).
Schmandt, Chris, "Phoneshell: The Telephone as Computer Terminal," Proceedings of ACM Multimedia Conference, 1993, 10 pages.
Sekine, Shoji et al., "Front Office Oriented Solution for Customer Satisfaction and Profit Expansion," Hitachi Hyoron Co, Ltd., Japan, vol. 80, No. 9, Sep. 1998, 11 pages.
Semilof, Margie, "Call Centers Go On-Line," Communications Week, No Date Available, 2 pages.
Sevcik, Peter et al., "The Call Center Revolution," Northeast Consulting Technical Paper, Jan. 1, 1997, 12 pages.
Smith, J.D., An Overview to Computer-Telecommunications Integration (CTI), Telecommunications, Conference Publication No. 404, IEEE, Mar. 26-29, 1995, 5 pages.
Sulkin, Allan, Building the ACD-LAN Connection, Business Communications Review, Jun. 1996, 4 pages.
Supplemental European Search Report for Application No. 98908545.1, dated Sep. 5, 2002, 4 pages.
Szlam, Aleksander et al., "Predictive Dialing Fundamentals," Flatiron Publishing, New York, 1996, 28 pages.
Tadamura, Katsumi et al., "Synchronizing Computer Graphics Animation and Audio," IEEE, 1998, 11 pages.
Taisei, Mori et al., "Call Center: Promotion of Information Use with a Direct Link to Core Business with Eye on the Internet Customer," Ric Telecom Corporation, Japan, vol. 10, No. 8, Aug. 1, 1998, 9 pages.
Tang, Jingrong et al., "Advanced Service Architecture for H.323 Internet Protocol Telephony," Computer Communications, vol. 23, 2000, 14 pages.
Thio, Fu Wang et al., "Distributed Multimedia Database: A Design and Application Study," The Fourth International Conference on High Performance Computing in the Asia-Pacific Region, IEEE, Beijing, China, vol. 2, May 2000, 6 pages.
Toji, Ryutaro et al., "A Study of Customer Contact Operation System and Functions," Proceedings of the IECE General Conference, Comm. 2, Mar. 6, 1997, 3 pages.
Toji, Ryutaro et al., "OCN Multimedia Customer Contact System," NTT Technical Journal, The Telecommunication Association, Japan, vol. 10, No. 1, Jan. 1, 1998, 6 pages.
Tsunemasa, Mizuo., "CTI World 2: World of CTI," Business Communication, vol. 34, No. 2, Feb. 1, 1997, 13 pages.
Van Zijl, Lynette, et al., "A Tool for Graphical Network Modeling and Analysis," IEEE Software, Jan. 1992, 8 pages.
Vazquez, E., et al., Graphical Interface for Communication Network Analysis and Simulation, Department of Telematic Engineering, Technical University of Madrid, IEE, 1991, Spain, 4 pages.
Wang, Yong et al., "Real-time scheduling for multi-agent call center automation", Information service agents lab, school of computing science Simon Fraser University, Burnaby,BC Canada, 1999, 13 pages.
Wolter, Roger., "XML Web Services Basics," Microsoft Corporation, Dec. 2001, 4 pages.

(56) References Cited

OTHER PUBLICATIONS

Zenel, Bruce et al., Intelligent Communication Filtering for Limited Bandwidth Environments, Computer Science Department, Columnia University, IEEE, 1995, 7 pages.
Canadian Office Action for Application No. 2320978, dated Jun. 2, 2003, 2 pages.
Canadian Office Action for Application No. 2334513, dated May 30, 2003, 2 pages.
Canadian Office Action for Application No. 2347721, dated Aug. 12, 2004, 3 pages.
Canadian Office Action for Application No. 2352973, dated Apr. 17, 2003, 3 pages.
Chinese Office Action for Application No. 200980151937.6, dated Jul. 1, 2013, 14 pages.
Chinese Office Action for Application No. 98812259.6, dated Jan. 10, 2003, 9 pages.
Chinese Office Action for Application No. 98812261.8, dated Jun. 20, 2003, 10 pages.
Chinese Office Action for Application No. 99808531.6, dated Mar. 14, 2003, 14 pages.
Chinese Office Action for Application No. 99811995.4, dated Apr. 8, 2005, 6 pages.
Chinese Office Action for Application No. 99811995.4, dated Jul. 6, 2007, 11 pages.
Chinese Office Action for Application No. 99811996.2, dated May 9, 2003, 10 pages.
Chinese Office action for Patent Application No. 200980151937.6, dated Feb. 15, 2015, 6 pages.
Chinese Office action with English Translation for Application No. 200980151937.6 dated May 23, 2014, 7 pages.
European Office action for Application No. 00115441.8, dated Feb. 11, 2004, 7 pages.
European Office action for Application No. 00115441.8, dated Mar. 15, 2005, 4 pages.
European Office Action for Application No. 00115441.8, dated May 18, 2006, 11 pages.
European Office Action for Application No. 00119160.0, dated Jan. 16, 2004, 6 pages.
European Office Action for Application No. 00123331.1, dated Apr. 18, 2006, 5 pages.
European Office Action for Application No. 00305049.9, dated Dec. 29, 2003, 5 pages.
European Office Action for Application No. 00908266.0, dated Aug. 10, 2005, 6 pages.
European Office action for Application No. 02400027.5, dated Jan. 21, 2008, 5 pages.
European Office action for Application No. 02756535.7, dated Aug. 5, 2005, 6 pages.
European Office Action for Application No. 03022831.6, dated Nov. 30, 2006, 7 pages.
European Office Action for Application No. 03800376.0, dated Jul. 8, 2008, 6 pages.
European Office Action for Application No. 04009176.1, dated Oct. 12, 2011, 8 pages.
European Office Action for Application No. 97904087.0, dated Jun. 25, 2002, 5 pages.
European Office Action for Application No. 98903471.5, dated May 29, 2006, 4 pages.
European Office Action for Application No. 98903471.5, dated Oct. 11, 2004, 6 pages.
European Office Action for Application No. 98908545.1, dated Mar. 15, 2005, 4 pages.
European Office Action for Application No. 98908545.1, dated Nov. 14, 2003, 10 pages.
European Office Action for Application No. 98924821.6, dated Aug. 26, 2003, 4 pages.
European Office Action for Application No. 98926248.0, dated Aug. 5, 2004, 4 pages.
European Office Action for Application No. 98926248.0, dated Dec. 11, 2003, 4 pages.
European Office Action for Application No. 98926248.0, dated Oct. 21, 2002, 6 pages.
European Office Action for Application No. 98944799.0, dated Aug. 18, 2005, 7 pages.
European Office Action for Application No. 98944799.0, dated Mar. 26, 2008, 5 pages.
European Office Action for Application No. 98944830.3, dated Jan. 30, 2006, 9 pages.
European Office Action for Application No. 98946907.7, dated Jun. 1, 2006, 6 pages.
European Office Action for Application No. 98946926.7, dated Dec. 8, 2005, 4 pages.
European Office Action for Application No. 98953947.3, dated Aug. 22, 2006, 6 pages.
European Office Action for Application No. 98953962.2, dated Oct. 28, 2005, 5 pages.
European Office Action for Application No. 98956309.3, dated Jun. 8, 2005, 5 pages.
European Office Action for Application No. 99905907.4, dated Oct. 31, 2005, 4 pages.
European Office Action for Application No. 99906856.2, dated Sep. 24, 2007, 5 pages.
European Office Action for Application No. 99906958.6, dated Feb. 22, 2006, 7 pages.
European Office Action for Application No. 99927333.7, dated Aug. 21, 2006, 9 pages.
European Office Action for Application No. 99927340.2, dated Aug. 9, 2011, 6 pages.
European Office Action for Application No. 99927340.2, dated Nov. 25, 2013, 5 pages.
European Office Action for Application No. 99945479.6, dated Aug. 9, 2006, 6 pages.
European Office Action for Application No. 99945519.9, dated Aug. 20, 2007, 6 pages.
European Office action for Application No. 99956732.4, dated Aug. 17, 2006, 7 pages.
European Office action for Application No. 99956745.6, dated Mar. 14, 2006, 5 pages.
European Office Action for Application No. 99960267.5, dated May 10, 2007, 6 pages.
European Office Action for Application No. 99960279.0, dated Aug. 16, 2005, 6 pages.
European Office Action for Application No. 99965163.1, dated Jul. 13, 2009, 5 pages.
European Search Report and Written Opinion for Application No. 05783002.8, dated Mar. 16, 2009, 8 pages.
European Search Report for 0115441.8 (now EP1075153), dated Nov. 6, 2002, 3 pages.
European Search Report for Application No. 00123331.1, dated Dec. 5, 2003, 6 pages.
European Search Report for Application No. 00305049.9, dated May 7, 2003, 3 pages.
European Search Report for Application No. 00908266.0, dated May 24, 2005, 3 pages.
European Search Report for Application No. 00913226.7, dated Feb. 14, 2005, 3 pages.
European Search Report for Application No. 0119160.0, dated Apr. 17, 2003, 3 pages.
European Search Report for Application No. 01920248.0, dated May 3, 2004, 3 pages.
European Search Report for Application No. 01927387.9, dated Jun. 2, 2006, 3 pages.
European Search Report for Application No. 02400027.5, dated Feb. 20, 2004, 3 pages.
European Search Report for Application No. 02756535.7, dated May 25, 2005, 4 pages.
European Search Report for Application No. 03002575.3, dated Jun. 4, 2003, 3 pages.
European Search Report for Application No. 03008532.8, dated Dec. 27, 2004, 3 pages.
European Search Report for Application No. 03008534.4, dated Jul. 23, 2003, 3 pages.

(56) References Cited

OTHER PUBLICATIONS

European Search Report for Application No. 03022831.6, dated Mar. 22, 2006, 3 pages.
European Search Report for Application No. 03023463.7, dated Jun. 14, 2004, 3 pages.
European Search Report for Application No. 03076826.1, dated Sep. 10, 2003, 3 pages.
European Search Report for Application No. 03077174.5, dated Sep. 4, 2003, 4 pages.
European Search Report for Application No. 03077712.2, dated Mar. 29, 2004, 3 pages.
European Search Report for Application No. 03800376, dated May 7, 2007, 3 pages.
European Search Report for Application No. 04007911.3, dated Aug. 17, 2004, 5 pages.
European Search Report for Application No. 04007913.9, dated Aug. 5, 2004, 4 pages.
European Search Report for Application No. 04011886.1, dated Jun. 22, 2006, 5 pages.
European Search Report for Application No. 07018035.1, dated Apr. 23, 2009, 4 pages.
European Search Report for Application No. 98944799.0, dated Aug. 5, 2004, 3 pages.
European Search Report for Application No. 98944830.3, dated Aug. 11, 2004, 3 pages.
European Search Report for Application No. 98946907.7, dated Aug. 11, 2004, 3 pages.
European Search Report for Application No. 98946926.7, dated Aug. 11, 2004, 3 pages.
European Search Report for Application No. 98948164.3, dated Jun. 15, 2004, 3 pages.
European Search Report for Application No. 98953947.3, dated Aug. 20, 2004, 3 pages.
European Search Report for Application No. 98953962.2, dated Sep. 2, 2004, 3 pages.
European Search Report for Application No. 98956187.3, dated Sep. 16, 2005, 3 pages.
European Search Report for Application No. 98956309.3, dated Sep. 10, 2004, 3 pages.
European Search Report for Application No. 99905907.4, dated Jun. 1, 2005, 3 pages.
European Search Report for Application No. 99906856.2, dated Oct. 4, 2006, 3 pages.
European Search Report for Application No. 99906958.6, dated Aug. 19, 2005, 3 pages.
European Search Report for Application No. 99927333.7, dated Mar. 30, 2005, 5 pages.
European Search Report for Application No. 99927340.2, dated Oct. 18, 2004, 3 pages.
European Search Report for Application No. 99945479.6, dated Mar. 24, 2006, 3 pages.
European Search Report for Application No. 99945519.9, dated Oct. 18, 2005, 3 pages.
European Search Report for Application No. 99945556.1, dated Nov. 16, 2004, 3 pages.
European Search Report for Application No. 99956732.4, dated Apr. 19, 2006, 4 pages.
European Search Report for Application No. 99956745.6, dated Jun. 30, 2005, 3 pages.
European Search Report for Application No. 99960267.5, dated Jul. 14, 2005, 3 pages.
European Search Report for Application No. 99960279.0, dated Apr. 26, 2005, 3 pages.
European Search Report for Application No. 99965163.1, dated Nov. 19, 2004, 4 pages.
European Search Report for Application No. 99971602.0, dated Feb. 6, 2007, 3 pages.
International Preliminary Examination Report for PCT/US01/40267, dated Dec. 9, 2002, 4 pages.
International Preliminary Report on Patentability for PCT/US2005/027544, dated May 22, 2007, 7 pages.
International Search Report and Written Opinion for PCT/US2009/068402, dated Mar. 31, 2010, 10 pages.
International Search Report for PCT/US03/41677, dated Apr. 10, 2006, 1 page.
International Search Report for PCT/US05/27544, dated Jun. 14, 2006, 1 page.
Japanese Interrogation and Re-Examination Report for Application No. 1999-502827, mailed Oct. 26, 2004, 7 pages.
Japanese Office Action for Application No. 1998-531244, mailed Jan. 6, 2004, 4 pages.
Japanese Office Action for Application No. 1998-536740, mailed Feb. 24, 2004, 5 pages.
Japanese Office Action for Application No. 1999-500765, mailed Feb. 10, 2004, 6 pages.
Japanese Office Action for Application No. 1999-502827, mailed Nov. 1, 2005, 8 pages.
Japanese Office action for Application No. 2000-220082, mailed on Apr. 1, 2003, 3 pages.
Japanese Office Action for Application No. 2000-511299, mailed Feb. 3, 2004, 4 pages.
Japanese Office Action for Application No. 2000-511299, mailed May 16, 2006, 7 pages.
Japanese Office Action for Application No. 2000-512336, mailed Jun. 24, 2003, 4 pages.
Japanese Office Action for Application No. 2000-519541, dated May 16, 2005, 4 pages.
Japanese Office Action for Application No. 2000-519541, mailed Dec. 2, 2003, 7 pages.
Japanese Office Action for Application No. 2000-519541, mailed Mar. 14, 2006, 6 pages.
Japanese Office Action for Application No. 2000-554115, dated Apr. 27, 2005, 5 pages.
Japanese Office Action for Application No. 2000-554115, mailed Jan. 6, 2004, 4 pages.
Japanese Office Action for Application No. 2000-556311, mailed Oct. 21, 2003, 6 pages.
Japanese Office Action for Application No. 2000-570673, dated Oct. 4, 2005, 4 pages.
Japanese Office Action for Application No. 2000-570673, mailed Mar. 8, 2005, 6 pages.
Japanese Office Action for Application No. 2000-570673, mailed Oct. 14, 2003, 6 pages.
Japanese Office Action for Application No. 2000-570677, mailed May 11, 2004, 8 pages.
Japanese Office Action for Application No. 2000-570677, mailed Nov. 30, 2004, 10 pages.
Japanese Office Action for Application No. 2000-570941, mailed Oct. 7, 2003, 6 pages.
Japanese Office Action for Application No. 2000-578753, mailed May 11, 2004, 11 pages.
Japanese Office Action for Application No. 2000-580124, mailed Apr. 12, 2005, 6 pages.
Japanese Office Action for Application No. 2000-580124, mailed Oct. 7, 2003, 5 pages.
Japanese Office Action for Application No. 2000-580329, mailed Feb. 15, 2005, 8 pages.
Japanese Office Action for Application No. 2000-580329, mailed May 13, 2008, 8 pages.
Japanese Office Action for Application No. 2000-580329, mailed Oct. 4, 2005, 5 pages.
Japanese Office Action for Application No. 2000-581781, mailed Feb. 3, 2004, 4 pages.
Japanese Office Action for Application No. 2000-590363, mailed Apr. 1, 2003, 6 pages.
Japanese Office Action for Application No. 2001-526724, mailed Aug. 1, 2006, 5 pages.
Japanese Office Action for Application No. 2001-526724, mailed Dec. 13, 2005, 5 pages.
Japanese Office Action for Application No. 2001-526724, mailed May 17, 2005, 4 pages.

(56) References Cited

OTHER PUBLICATIONS

Japanese Office Action for Application No. 2006-127262, mailed Jun. 1, 2010 (5 pages).
Japanese Offide Action for Application No. 2006-127262, mailed Nov. 18, 2008 (7 pages).
Japanese Office Action for Application No. 2011-543586, mailed Jan. 24, 2013, 5 pages.
Korean Office Action for Application No. 10-2011-7016735, dated Jun. 13, 2013, 3 pages.
Korean Office Action for Application No. 10-2011-7017067, dated Aug. 21, 2012, 9 pages.
Wagner, Susanne., "Intralingual Speech-to-Text Conversion in Real-Time: Challenges and Opportunities," Challenges of Multidimensional Translation Conference Proceedings, 2005, 10 pages.
Derfler, Frank J. et al., How Networks Work, Que Corporation, Millennium Ed., 39 pages.
Solis, Ignacio et al., FLIP: a Flexible Protocol for Efficient Communication Between Heterogeneous Devices, IEEE, 2001, 10 pages.
White, Ron, How Computers Work,. Que Corporation, 7th Edition, Oct. 15, 2003, 53 pages.

* cited by examiner

METHOD AND APPARATUS FOR EXTENDED MANAGEMENT OF STATE AND INTERACTION OF A REMOTE KNOWLEDGE WORKER FROM A CONTACT CENTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED DOCUMENTS

[The present invention is a continuation of co-pending application Ser. No. 11/070,898, filed on Mar. 1, 2005, which is a continuation of patent application 10/269,124, filed on Oct. 10, 2002 and issued as U.S. Pat. No. 6,985,943, which is a continuation in part (CIP) to a U.S. patent application Ser. No. 09/405,335 entitled Method and apparatus for Method and Apparatus for Data-Linking a Mobile Knowledge Worker to Home Communication-Center Infrastructure filed on Sep. 24, 1999, issued as U.S. Pat. No. 6,711,611, which is a CIP to U.S. patent application Ser. No. 09/151,564 filed Sep. 11, 1998, issued as U.S. Pat. No. 6,108,711, and these prior applications are incorporated by reference in their entirety. The present invention is also related to U.S. Pat. No. 5,960,073 entitled Method and Apparatus for Providing an Interactive Home Agent with Access to Call Center Functionality and Resources and to a U.S. Pat. No. 5,802,163 entitled Methods and Apparatus for Implementing an Outbound Network Call Center both of which are incorporated herein by reference.] *The present application is a reissue patent application of U.S. Pat. No. 7,565,428, filed on Oct. 29, 2007 as U.S. patent application Ser. No. 11/926,913, which is a continuation of U.S. patent application Ser. No. 11/070,898, filed on Mar. 1, 2005, now U.S. Pat. No. 7,373,405, which is a continuation of U.S. patent application Ser. No. 10/269,124, filed on Oct. 10, 2002, now U.S. Pat. No. 6,985,943, the contents of all of which are incorporated herein by reference in their entirety. The contents of U.S. patent application Ser. No. 09/405,335, filed on Sep. 24, 1999, now U.S. Pat. No. 6,711,611, of U.S. patent application Ser. No. 09/151,564, filed on Sep. 11, 1998, now U.S. Pat. No. 6,108,711, of U.S. patent application Ser. No. 08/940,712, filed on Sep. 30, 1997, now U.S. Pat. No. 5,960,073, and of U.S. patent application Ser. No. 08/628,837, filed on Apr. 5, 1996, now U.S. Pat. No. 5,802,163, are incorporated herein by reference in their entirety.*

FIELD OF THE INVENTION

The present invention pertains to telephony communications systems and has particular application to methods including software enabling extended management capabilities of state and interaction of a remote knowledge worker from a contact center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in call centers with computer hardware and software adapted for better routing of telephone calls, faster delivery of telephone calls and associated information, and improved service with regard to client satisfaction. Such computer-enhanced telephony is known in the art as computer-telephony integration (CTI).

There are many ways that CTI enhancement may be done in the art, and the present inventors are knowledgeable in most of these. The present inventors are also knowledgeable about many special architectures and software enhancements that are not in the public domain. In the following background material only that material specifically designated as prior art should be taken to be acknowledged as prior art material by the inventors.

Generally speaking, CTI implementations of various design and purpose are implemented both within individual call-centers and, in some cases, at the telephone network level. For example, processors running CTI software applications may be linked to telephone switches, service control points (SCPs), and network entry points within a public or private telephone network. At the call-center level, CTI processors are typically connected to telephone switches and, in some cases, to similar CTI hardware at the network level, often by a dedicated digital link. CTI processors and other hardware within a call-center are commonly referred to as customer premises equipment (CPE). It is the CTI processor and application software in such centers that provides computer software enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents using such stations may have access to stored data and enhanced services and tools as well as being linked to incoming callers by telephone equipment. Such stations may be, and usually are, interconnected through the PC/VDUs by a local area network (LAN). One or more data or transaction servers may also be connected to the LAN that interconnects agent stations. The LAN is, in turn, typically connected to the CTI processor, which is connected to the call switching apparatus of the call center in systems known to the present inventors.

When a call arrives at a call center, whether or not the call has been pre-processed at a service control point (SCP), typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used, in systems known to the present inventors, as a key to access additional information from a customer information system (CIS) database at a server on the network that connects the agent workstations. In this manner information pertinent to a call may be provided to an agent, often as a screen pop on the agent's PC/VDU.

In recent years, advances in computer technology, telephony equipment, and infrastructure have provided many opportunities for improving telephone service in public-switched and private telephone intelligent networks. Similarly, development of a separate information and data network known as the Internet, together with advances in computer hardware and software have led to a new multimedia telephone system known in the art by several names. In this new system telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach points in the network such as an Internet Service Provider (ISP), which then connects the user to the Internet backbone. The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links and available bandwidth, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet protocol (IPNT) calls, a DNT center may also share other forms of media with customers accessing the system through their computers. E-mails, Video mails, fax, file share, file transfer, video calls, and so forth are some of the other forms of media, which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In typical communication centers, DNT is accomplished by Internet connection and IPNT calls. For this reason, IPNT and the Internet will be used in examples to follow. It should be understood, however, that this usage is exemplary, and not limiting.

In systems known to the inventors, incoming IPNT calls are processed and routed within an IPNT-capable communication center in much the same way as COST calls are routed in a CTI-enhanced call center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls, or to a network-connected server on the LAN. Therefore, in most cases, IPNT calls are routed to the agent's PC while conventional telephony calls are routed to the agent's conventional telephone or headset. Typically separate lines and equipment are implemented for each type of call weather COST or IPNT.

Due in part to added costs associated with additional equipment, lines, and data ports that are needed to add IPNT capability to a CTI-enhanced call-center, developers are currently experimenting with various forms of integration between the older COST system and the newer IPNT system. For example, by enhancing data servers, interactive voice response units (IVR's), agent-connecting networks, and so on, with the capability of conforming to Internet protocol, call data arriving from either network may be integrated requiring less equipment and lines to facilitate processing, storage, and transfer of data. Some such equipment and services are known to the present inventors, which are not in the public domain.

With many new communication products supporting various media types available to businesses and customers, a communication center must add significant application software to accommodate the diversity. For example, e-mail programs typically have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

In a system known to the inventor, full multimedia functionality is supported wherein agents and customers may interact in a seamless manner. Likewise interaction histories of virtually any supported media may be automatically recorded and stored for latter access by agents and in some cases customers (clients) themselves. Such a system, termed a customer-interaction-network-operating system (CINOS) by the inventor, comprises a suite of software enhancements, implemented both at the communication center and at CPE sites, that are designed to provide automated and seamless interaction between customers, associates, and agents.

In order to successfully implement and administer the many aspects of a network operating system such as the CINOS system introduced above, a new agent called a knowledge worker has emerged. This is especially true in more state-of-the-art multimedia communication-centers. In a broad sense, a knowledge worker may be any individual that specializes, or is expert in a specific field or fields utilized within the communication center. Knowledge workers may be responsible for such tasks as creating automated scripts, building integrated software applications, tracking and parsing certain history paths in a database for automated reporting, and other relatively complicated functions. Knowledge workers may also be trained agents responsible for sales, service and technical assistance.

A knowledge worker, weather an agent or specialized technician, generally has all of the resource in the way of customer data, interaction data, product data, and multimedia support at his fingertips as long as he or she is operating from a designated PC/VDU or other supported station within the communication center. In some cases, a knowledge worker may have full data access and multimedia support if he is located off-site but is linked to the center by a suitable data-network connection such as from a home office or remote station.

Because a network operating system such as CINOS requires that certain customer or client CPE, including network equipment, be enhanced with software designed to facilitate seamless interaction with the communication center, it is often necessary that knowledge workers be dispatched into the field away from the communication center to aid in such as installation, set-up, and programming of software applications and tools. In some instances this can be a formidable enterprise.

A knowledge worker possesses the kind of skills that are largely indispensable and not shared by the average communication center worker. When a knowledge worker is away from a home-center such as on the road, or at a client location, he is generally limited in data access and interaction capability with his or her home communication-center data and tools. In some cases this may be a liability to the center. In many cases she/he will be limited to specific data that was carried along, or that may be downloaded from the center to such as a cellular telephone, a personal digital assistant (PDA) or a Laptop computer. Moreover, a mobile knowledge worker in the field may also be limited in providing service to the home-center by virtue of the same data-access limitations.

In some cases, a knowledge worker at a client site may, after some set-up, programming, and initialization, commandeer a suitable client PC so that she/he may establish free and unfettered access to home-center data and software services. However, such interaction, if not on the be-half of the client, may be deemed by the client as an intrusion at most and an inconvenience at least.

In typical contact centers, which may also include multimedia communication centers, the preponderance of incoming and outgoing interactions are processed by voice (DNT) or Web-based self service interfaces or by communication-center agents located within the domain of the center and managed through a communication center environment. However, many interactions cannot be successfully processed through client self-service interfaces or on-site agents often because of a high level of assistance required. Such interactions require the expertise of a knowledge worker, a knowledge worker being a call-center employee with a more detailed knowledge of the center structure and operations than the typical on-site agent.

Knowledge workers are not required for routine service assistance or other duties that are routinely performed within the domain of the center. As a result, they are typically located off site in a pool or remote to the extent of performing as a home-based or traveling workers. Therefore, standard communication center control systems and procedures cannot be applied to such knowledge workers. Often this problem is due to an absence of a CTI link established between the location of the knowledge worker and the communication center. Off-site knowledge workers are mobile and typically operate using a variety of communication equipment (non-CTI telephone, personal digital assistants [PDAs], wireless Web, etc.) and using applications that are not assimilated in standard or unified array throughout the communication environment. Therefore, it becomes increasingly difficult to provide management from the communication center in terms of state control and report accessibility. For example, which of a force of off-site knowledge workers are at any given time able to receive an interaction wherein they are also able to exchange interaction-related data with the center, client or both?

Remote knowledge workers are, from a control and management standpoint, invisible to standard CTI-enabled facilities. Not having the ability to manage these workers causes the ongoing costs associated with doing business from a communication center to rise.

The inventors are familiar with a system taught in U.S. Pat. No. 5,802,163 entitled Methods and Apparatus for Implementing an Outbound Network Call Center referenced in the Cross-Reference to Related Documents section of this specification. That system teaches a method and apparatus for integrating a remote home agent in a call center. In practice, the home agent or knowledge worker must dial a specific enabled telephony switch in the telephone network when an interaction to the agent is detected. This action terminates the incoming interaction to a first station-side port of the telephony switch. A connection is thus maintained between the home agent and the telephony switch until the agent disconnects. In this way, all events that are determined to be destined to the home agent are switched to the established connection. This action provides a continuing connection between the telephony switch and the home agent until the home agent disconnects. Events, such as incoming calls at the center selected to go to the home agent may then be switched to the established connection. The telephony switch functions as a login portal for the agent. However, only the agent's media stream is controlled in this case. Interaction-related data and agent status are not considered or addressed.

The inventors are also familiar with a call-center system taught in U.S. Pat. No. 5,960,073 entitled Method and Apparatus for Providing an Interactive Home Agent with Access to Call Center Functionality and Resources also listed in the Cross-Reference section of this specification above. This system supports remote agent stations through a network by establishing a data link between a computer platform at the remote agent station and a CTI-processor connected to a telephony switch at the call center. Events destined to the agent are switched from the call center to a telephone at the agent station while data pertaining to the calls is transferred over the data link to the computer platform at the remote agent station to be displayed. In this system data pertaining to or related to calls is retrieved from a database at the call center. The data can include scripts for an agent at the remote station.

Call center services are supported by cooperation between software at the CTI processor and the computer platform at the remote station. In one embodiment the data link, once established, is kept open while calls continue to be switched to the remote station. In another embodiment after an initial agent log in, dial up is done from the remote station upon detecting calls from the call center by a TAPI compliant device. A reduced log is performed at the CTI processor at the call center to save time. In yet another embodiment, the CTI processor establishes the data connection each time using a modem bank adapted for dialing. The modem bank switches the call from the call center to the remote station. A plurality of remote stations may be thus supported.

A drawback with this system is that it requires first-party control equipment established at the remote agent workplace. The first-party control equipment controls the remote agent phone separately from the agent's computer platform.

The inventor is familiar with yet another system taught in U.S. patent application Ser. No. 2001/0023448 entitled Method and Apparatus for Data-Linking a Mobile Knowledge Worker to Home Communication-Center Infrastructure also listed in the cross-reference section of this specification. The system is a proxy system enabling a worker remote from a communication center to operate with full access to data and software at the communication center from a light computer device typically unable to operate as a workstation at the communication center. In this system, a proxy server, which may be a LAN-connected server at the communication center, has a two-way data link to the light computer device operated by the remote agent. The proxy executes software, which ascertains the hardware and software characteristics of the light device.

The proxy server accesses communication-center data at direction of the light device, operates communication center software tools, and provides results to the light device over the communication link in a form usable by the light device. This approach suggests a general method for management of remote knowledge workers from within a contact center (CC). In particular, it suggests using a proxy server as a mediator between a contact center environment and a remote agent device. However, it is still limited in terms of further enhancement that might enable more specific techniques and mechanisms. Part of this solution includes a remote option that requires special equipment to be provided and connected to the remote agent's telephone set, which in addition, must be a specially adapted telephone set to accept the equipment.

What is clearly needed is a method and apparatus that can provide full and unobstructed access to communication-center data and services for a mobile or otherwise remote knowledge worker. Such a method and apparatus would allow a communication center to freely dispatch mobile knowledge workers to client locations or other areas within the domain of a large communication campus or network of communication centers without compromising quality and response time of high-level technical services. Moreover, the method would not need to rely on client-associated resources.

SUMMARY OF THE INVENTION

In a preferred embodiment of the present invention a network system for managing remote agents of a communication center is provided, comprising a primary server connected to the network, the primary server controlling at least one routing point used by the communication center, one or more secondary servers distributed on the network and accessible to the agents, the secondary server or servers having data access to agent computing platforms and communication peripherals, and a software suite distributed in part to the secondary server or servers and in part to one or more agents computing platforms and peripherals, the software suite including protocol for reporting agent status data. The system is characterized in that the agent's computing platforms and peripherals are monitored for activity state by the one or more secondary servers whereupon the one or more secondary servers exchange control messaging and event related data using ISCC protocols with the primary server over the network, the primary server recognizing CTI protocol equivalents for the messaging for the purpose of intelligently routing events incoming to or otherwise communicatively involving the remote agents.

In some preferred embodiments the network is an Internet network and the routing point is one of or a combination of a telephony switch, a service control point, and an Internet Protocol Router. Also in some preferred embodiments the remote agents are grouped together in a central facility, while in some others the remote agents are distributed over a home network. In some cases the remote agents may be mobile and wirelessly connected to the one or more secondary servers.

In various embodiments the agent's computing platforms and peripherals are one of or a combination of a desktop computer, a lap top computer, a personal digital assistant, a cellular telephone, an Internet Protocol telephone and a paging device. Also in various embodiments remote agents are specialized knowledge workers offering service not available within the communication center.

In some preferred embodiments software suite is an extension of a CTI software suite used in the communication center, the extended portion for parameterizing and enabling additional services and communication apparatus generic to the remote agents but not available within the center. Also in some preferred embodiments control messaging and event related data exchanged between the primary server and the one or more secondary servers is formatted using Extensible Markup Language. In some cases Extensible Style sheet Language Transformation is used to transform the Extensible Markup Language files into formats useable on the computing platforms of the remote agents. The useable formats may include HTML, HDML, WAP, and WML.

In some embodiments a CTI-enhanced Interactive Voice Response system is used to exchange data with a remote agent receiving calls on an analog telephone in the event that the agent does not have access to a computing platform connected to the telephone and the one or more secondary servers. Also in some embodiments the remote agents establish one or more destination numbers for receiving events, the destination numbers to be set in the CTI environment for the period that the agent is logged into the system. The destination numbers may include one or a combination of telephone numbers, fax numbers, Internet Protocol addresses, e-mail addresses, universal resource locators (URLs), and pager numbers.

In another aspect of the invention a software suite for managing remote agents of a communication center is provided comprising a client portion including a contact navigation application, a contact extension application, and a code library, and a server application including a transaction management application, an agent specific application, and an ISCC application program interface. The suite is characterized in that the client portion specifies functionality and reports state information of the remote agent to the server application, whereupon the server application reports same under ISCC protocol to a communication-center suite for routing purposes and wherein the communication-center suite provides event-related data under ISCC protocol to the server application, which in turn transforms the data into data formats usable on various communication devices of the remote agent.

In some embodiments the remote agents are part of a communication center network, the server portion functioning as the network access and agent monitoring point for the remote agents. The communication network may include the Internet network and the public switched telephony network (PSTN). The remote agents may be grouped together in a central facility or distributed over a home network. In many cases the remote agents are mobile and wirelessly connected to the one or more secondary servers.

In some preferred embodiments the client portion resides on one or a combination of a desktop computer, a lap top computer, a personal digital assistant, a cellular telephone, an Internet Protocol telephone and a paging device. Further the remote agents may be specialized knowledge workers offering service not available within the communication center.

In some embodiments the software suite is an extension of a CTI software suite used in the communication center, the extended portion for parameterizing and enabling additional services and communication apparatus generic to the remote agents but not available within the center. The ISCC protocols may include Extensible Markup Language used to format messaging and event-related data. In some cases Extensible Style sheet Language Transformation may be used to transform the Extensible Markup Language files into formats useable on the computing platforms of the remote agents. The useable formats include HTML, HDML, WAP, and WML.

In some embodiments the remote agents establish one or more destination numbers for receiving events on the various communication devices, the destination numbers to be set in the CTI environment for the period that the agent is logged into the system providing the software. In some cases the destination numbers include one or a combination of telephone numbers, fax numbers, Internet Protocol addresses, e-mail addresses, universal resource locators, and pager numbers.

In yet another aspect of the invention a method for managing information about remote agents of a communication center for the purpose of intelligently routing events involving those agents is provided, comprising steps of (a) providing a software suite accessible to the agents for parameterizing and enabling additional services and communication apparatus generic to the remote agents but not available within the center; (b) providing a network link between the software suite and CTI software of the communication center; and (c) routing communication events involving the remote agents according to state and other information about the agents provided by and through the software suite.

In preferred embodiments of the method, in step (a), the agents are accessible to the communication center through a combination of the Internet network and the public switched telephony network. Also in preferred embodiments, in step (a), the software suite comprises a server portion and a client portion. Also in some embodiments, in step (a), the agents are knowledge workers offering service not available from agents within the communication center. Further, in step (a), communication apparatus may include one or a combination of a desktop computer, a lap top computer, a personal digital assistant, a cellular telephone, an Internet Protocol telephone and a paging device. Still further, in step (a), the software suite may be configured and updated from the communication center.

In some embodiments, in step (b), the network link supports ISCC protocol, which may include Extensible Markup Language and Extensible Style Sheet Transformation Language. In some cases the client portion resides on one or more of the communication apparatus and the server portion resides on a server accessible to the one or more communication apparatus via a network link.

In some embodiments, in step (c), state information includes ready, not ready, logged in, logged out, and on call. Also in step (c) other information may include skill level, registered destination numbers, and communication device type and platform.

BRIEF DESCRIPTION OF THE DRAWING FIGURES

DESCRIPTION OF THE PREFERRED EMBODIMENTS

Figure 1:
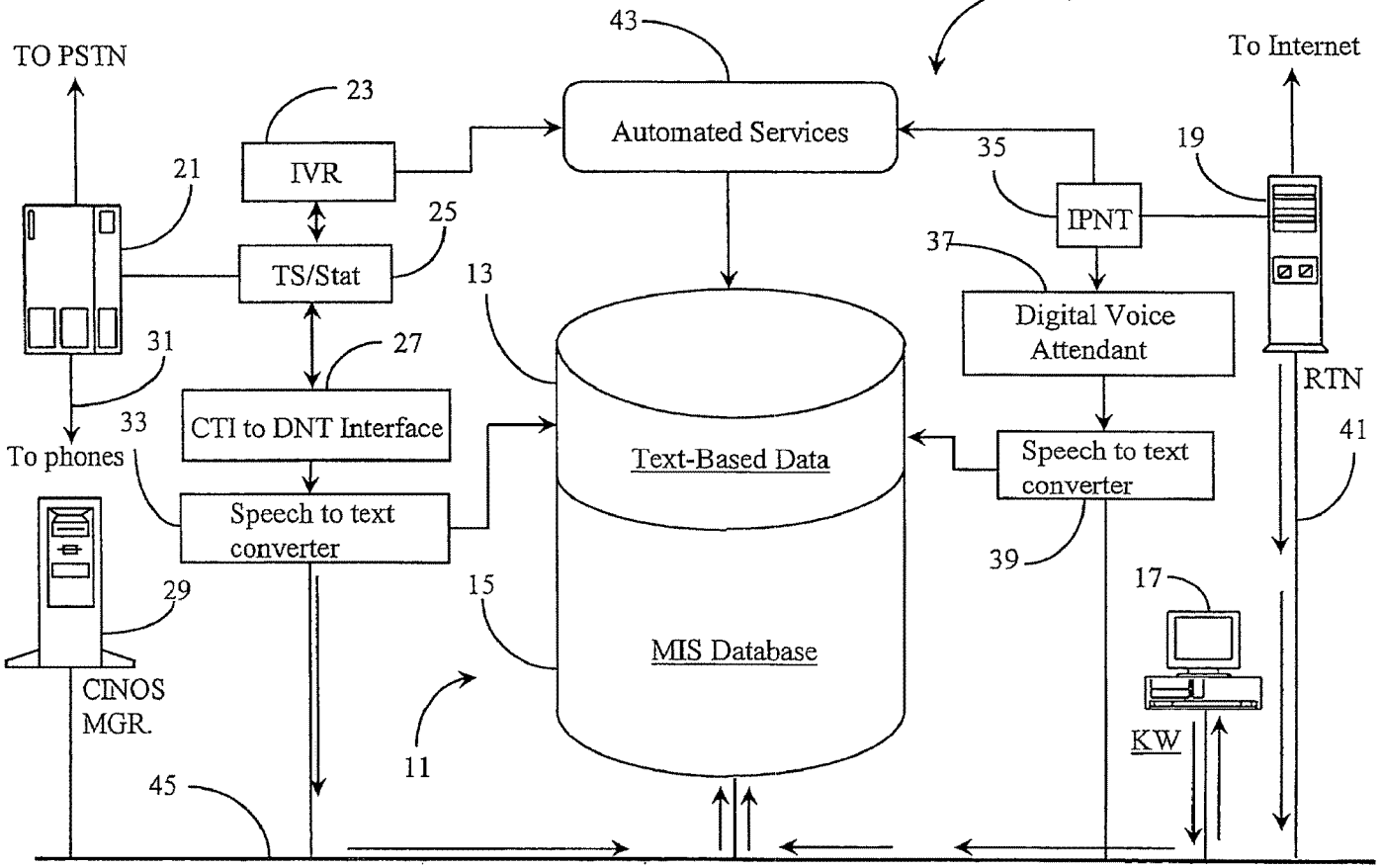
FIG. 1 is an exemplary overview of a multimedia-interaction storage system within a communication center according to an embodiment of the present invention.

FIG. 1 is an exemplary overview of a multimedia-interaction storage system within communication-center architecture 9 according to an embodiment of the present invention. Communication center 9 is illustrated solely for the purpose of illustrating just one of many possible system architectures in which the invention may be practiced. Center 9, which in a preferred embodiment comprises both conventional and data-network telephony (DNT) apparatus, is exemplary of an architecture that could facilitate a network operating system such as CINOS (known to the inventor). Communication center 9 may be assumed to have all the internal components described in the background section such as agent workstations with LAN connected PC/VDUs, agent's COST telephones, and so on. Such a communication center operating an enhanced interaction network operating system such as CINOS would employ knowledge workers trained to interact with associates, clients, and in some cases internal systems that require programming, scripting, researching, and the like.

For the purposes of this specification, a knowledge worker (KW) is a highly skilled individual that is at least trained in systems programming and implementation using software tools. A KW is also typically trained in the use of all supported communication media and applications that may be used with a network operating system. In many instances, a KW may also handle high level sales and service while functioning as an agent for the communication center both inside the center and at a client's location. However, as described in the background section, a KW away from home (in the field) will not generally have full access to all communication center data and tools unless he/she carries a powerful computer station along, or commandeers a client's station having suitable connectivity and ability to perform all of the applications at the home station. Therefore, having many such highly skilled workers in the field and not in the communication center may be, at times, a considerable liability to the communication center, but unavoidable at times. It is to this aspect that the present invention mostly pertains.

Referring again to FIG. 1, a multimedia data-storage system represented herein by a centralized grouping of connected and labeled text blocks is provided and adapted to facilitate rules-based storage of all communication-center interaction between agents and clients including co-workers and associates. Such a representation illustrates an important part of CINOS function.

At the heart of the storage system is a mass-storage repository 11 adapted to store multimedia interactions as well as text-based related files. Repository 11 may utilize any form of digital storage technology known in the art such as Raid-Array, Optical Storage, and so on. The storage capacity of repository 11 will depend directly on its implementation with regard to the size of communication center 9 and predicted amount of data that will be stored and kept by the system.

In this example, repository 11 is divided logically into two sections. One section, multimedia information system (MIS) 15, is responsible for storing copies and records of all multimedia interactions, defined as media that is not text-based, such as audio, video, and graphics-based media. All multimedia interactions are stored in MIS 15 whether incoming, outgoing, or internal. A second section, herein referred to, as text section 13 is responsible for all text-based interactions as well as text versions and annotations related to non-text files.

Repository 11 is connected to a communication-center local area network (LAN) 45. Repository 11 is accessible via LAN 45 to authorized personnel within a communication center such as agents, KWs, or the like using computerized workstations connected on the LAN, and may, in some instances, also be made available, in full or in part, to clients and associates communicating with the call center. A network router (RTN) 19 is shown connected to LAN 45 via network connection 41. In this example, network router 19 is the first point within a communication center wherein data network telephony (DNT) media arrives. Network router 19 is exemplary of many types of routers that may be used to route data over LAN 45. An Internet-protocol-network-telephony (IPNT) switch 35 is connected to network router 19 via a data link. IPNT switch 35 further routes or distributes live IPNT calls that do not require routing to a live agent. IPNT calls that are routed to live agents are sent over connection 41 to LAN 45 where they reach agent PC/VDU's at agent and KW workstations connected to the LAN (PC/VDU is exemplary) or DNT-capable phones (not shown) as illustrated via directional arrows.

In the multimedia storage system represented herein, a KW such as one operating at a provided work station (PC/VDU 17) typically has access to all multimedia interaction histories that are stored in repository 11. CINOS applications (not shown) executable on workstations such as PC/VDU 17 empowers the KW to facilitate many tasks in the realm of communication center functionality. Such tasks include, but are not limited to, researching and creating virtually any type of system report regarding data held in repository 11, updating and creating new management applications that may alter or enhance CINOS functionality, and other such system-administrator-type duties. LAN 45 is the network through which the "in-house" KW is empowered to access such as a CINOS MGR server 29, repository 11, and other connected data sources and systems (not shown) that may be present in a communication center such as center 9.

By reviewing capabilities of the multimedia storage system of communication center 9, a full appreciation of the necessity of various in-house skills possessed by a KW, such as the skill of operating at station 17, may be acquired by one with skill in the art. Therefore, a detailed review of communication-center operation, particularly storing interactions follows.

Creating text-based versions of non-text multimedia transactions may, in some cases, be accomplished by an automated method. For example, a digital voice attendant 37 is provided and linked to IPNT switch 35. Digital voice attendant 37 may be of the form of a DNT-capable IVR or other digital voice-response mechanism as may be known in the art. Such automated attendants may interact with a voice caller instead of requiring a live agent. A speech-to-text converter 39 is provided and linked to voice attendant 37. As digital voice attendant 37 interacts with a caller, speech-to-text converter 39 converts the speech to text. Such text may then be stored automatically into text section 13 of repository 11 and related to the also-recorded audio data. Part of the purpose and rationale for the creation of text documents related to non-text files is that text can be more easily mined for content and meaning than non-text files.

It will be apparent to one with skill in the art that as speech recognition technologies are further improved over their current state, which is adequate for many implementations, reliable text versions of audio transactions are not only possible but also practical. Such speech-to-text conversions are used here only for the convenience of automation wherein no live attendant is needed to transcribe such audio data. The inventor is familiar with such converters as used in such as the CINOS system incorporated herein by reference. Such converters provide convenience in transaction recording but are not specifically required to achieve the interaction storage objectives of communication center 9. A KW such as one operating from station 17 may be called upon to create and set-up the various rules-based applications that are required for routing and determining when digital voice attendant 37 will interface with a client or associate.

An automated services system 43 is provided and has a direct connection to section 13 of data repository 11. System 43 is adapted to handle automated interaction and response for certain text-based interactions such as e-mails, facsimiles, and the like, wherein a complete text record of the interaction may be mirrored, or otherwise created and stored into text section 13. For example, a fax may be sent and mirrored into section 13 or, perhaps recreated using an optical character recognition (OCR) technique and then entered. Physical text-documents such as legal papers and the like may be automatically scanned, processed by OCR techniques, and then entered into text section 13 before they are sent to clients. There are many possible automated techniques for creating and entering text files into a database including methods for generating automated responses. A KW such as one operating at station 17 may be called upon to oversee the creation and operation of all automated services insuring such as prompt response time, queue management, accurate threading and organization into a database, updating or adding enhanced capability, and so on.

With respect to the dual telephony capability (COST/DNT) of communication center 9, a central telephony switch 21 is provided to be a first destination for COST calls arriving from, for example, a PSTN network. Switch 21 may be a PBX, ACD, or another known type of telephony switch. Internal COST-wiring 31 connects telephony switch 21 to agent's individual telephones (not shown). Switch 21 is enhanced by a computer-telephony integration (CTI) processor 25 running an instance of a T-server CTI suite and an instance of a Stat-server, which are software enhancements known to the inventor. Such enhancements provide CTI applications, such as intelligent routing, statistical analysis routines, and so on. CINOS as previously described and disclosed in the co pending prior application incorporated herein is adapted to be integrated with such software when present in a CINOS-enhanced communication-center. A KW such as one operating station 17 may be called upon to compile and analyze results provided from statistical analysis routines executed at processor 25 for the purpose of creating new routing rules of routines that further enhance functionality.

An intelligent peripheral in the form of a COST IVR 23 is provided for the purpose of interacting with callers seeking information and the like who do not require connection to a live agent at the communication center. IVR technology may comprise voice response, touch tone interaction, or a combination of such known technologies. IVR 23 is linked to processor 25 and also to automated services 43. An example of an IVR interaction may take the form of a presentation to a caller from the PSTN of options for using an automated service such as those described above, or perhaps waiting for a live agent. A KW such as a KW operating at station 17 may be called upon to create and install appropriate interaction scripts into IVR 23 for interaction with clients and associates calling in from the PSTN.

A CTI to DNT interface 27 is provided for the purpose of converting COST data to digital mode compatible with DNT so as to be adapted for digital storage and interaction according to CINOS functionality and enterprise business rules. Bi-directional arrows illustrated between interface 27 and IVR 23 represent the ability to route interactions in either direction. COST to DNT conversion may be accomplished in IVR 23 in addition to or in place of interface 27. The connection architecture presented herein is exemplary only.

A speech-to-text converter 33 is provided for converting audio from the CTI side to text for entering into text section 13 as was taught with regard to converter 39 on the DNT side. Actual recorded media interactions are illustrated entering MIS 15 after text versions are rendered and entered into section 13 however this is not required. In some instances text versions of multimedia interactions may be rendered after the interaction is stored. There is no limitation regarding sequence. It is sufficient to say that converters 39 and 33 are capable of real-time conversion and entry.

Server 29 shown connected to LAN 45 is adapted to host a CINOS MGR (operating system) application, which provides control and organization with regard to various functions provided by the CINOS system as a whole. The storage architecture represented herein by the described text blocks, and all it encompasses in this embodiment, is meant only to be an example architecture as may be dedicated to the storage and organization of communication-center data according to enterprise rules.

It will be appreciated by one with skill in the art that a network operating system including a system for automatically storing and recording virtually all communication center transactions requires substantial skill in set-up, implementation, and administration both on the COST side and the DNT side within a communication center such as center 9. Moreover, a substantial network operating system such as CINOS has client-side software applications that subscribers or associates must utilize in order to achieve full seamless interaction with agents and subsystems operating according to the system parameters. In some cases, the operating system may span several communication centers over a large technical campus connected by a WAN. This fact requires that system administrators and troubleshooters be available to assist in facilitating and preparing client and associate CPE for interacting with communication center equipment and software according to system parameters.

If a KW such as one operating at station 17 could be mobilized to operate effectively outside of communication center 9 such as at a client location, and still be able to service center 9 from the field, then an enterprise hosting center 9 and perhaps other like centers could save considerable resources associated with training and expenses incurred for maintaining a larger number of fixed KW's.

The inventor provides a method and apparatus whereby such a mobile KW could have full and unfettered access to virtually all data systems and sources housed within his home communication center without having to carry a powerful station or inconveniencing a client by commandeering client resources. This inventive method and apparatus is described below in enabling detail.

Figure 2:
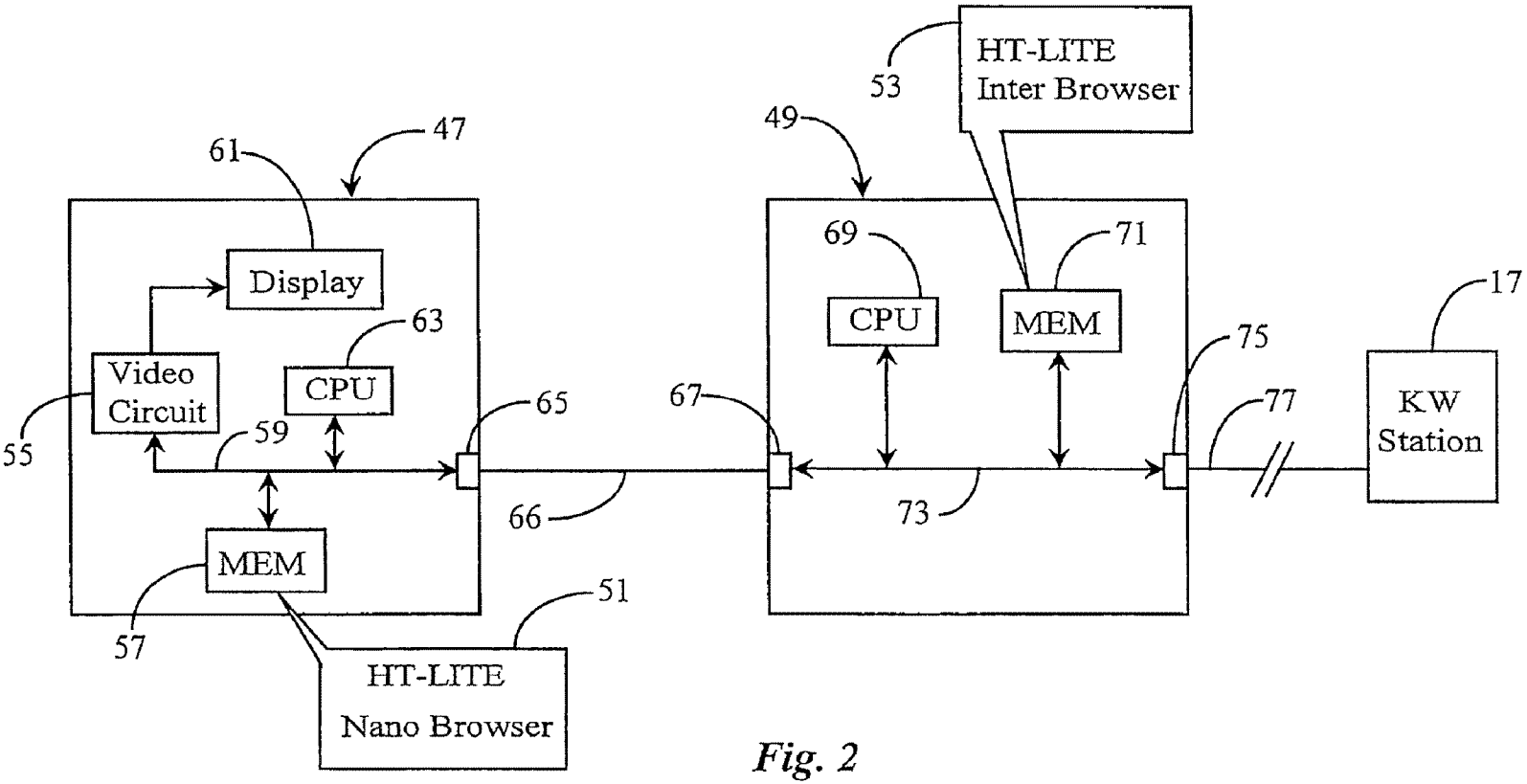
FIG. 2 is a block diagram illustrating a connective relationship between a proxy server and a hand-held computer operated by a mobile knowledge worker according to a preferred embodiment of the present invention.

FIG. 2 is a block diagram illustrating a connective relationship between a proxy server 49 and a hand-held computer 47 operated by a mobile KW according to a preferred embodiment of the present invention.

Hand-held computer 47 has a CPU 63, a memory 57, a video adapter circuitry 55, and a modem 65 all communicating on bus 59. Video circuitry 55 drives a display 61. Memory 57 may be any of a number of types, such as flash, random access (RAM), read-only (ROM) or similar type, or a combination of these. There may be other components as well, but these are not shown to facilitate description of the unique aspects of this embodiment of the invention. The hardware arrangement is intentionally shown as general, and is meant to represent a broad variety of architectures, which depend on the particular computing device used. Possibilities include many types of portable hand-held computers and also adapted cellular phones capable of receiving and sending video. A mobile KW would use such as device for communication and data access while in the field.

Proxy-Server 49 is a relatively sophisticated and powerful computer typical of computers used as WEB servers, although the use in this embodiment of Proxy-Server 49 is not the conventional or typical functions of a WEB server as known in the art. Proxy-Server 49 has a CPU 69, a memory 71, and a means of connecting to a data network such as the Internet. The network connecting means in this embodiment is a modem 67 communicating on a bus 73. In other embodiments the network connecting means may be a network adapter or other.

Modem 67 in the embodiment shown is compatible with modem 65 in computer 47. A communication link 66, which may be facilitated by a telephone line or a wireless connection, facilitates communication between computer 47 and server 49. The means of connection and communication can be any one of several sorts, such as a telephone dial-up, an Internet connection through an ISP, or a cell telephone connection, wireless IP networks or other wireless link, including private cell or wireless WAN or LAN. A communication port 75 connects to communication link 77 providing communication, in this case, through the Internet, to a suitable station or server in communication center 9 of FIG. 1. In this example, the linked station is preferably the KW's own home-center workstation or PC/VDU 17 from FIG. 1.

Port 75 and link 77 may also be any one of several types, or a combination of types. In some embodiments, server 49 and station 17 will be nodes on a local area network (LAN) covering a large technical campus, and the link between the two servers will be a serial network link with port 75 being a LAN card according to any of a number of well-known protocols. In other embodiments link 77 may be a telephone line, and port 75 will be a dial-up telephone modem. In still other embodiments, this link could be a parallel communication link. This link could also be through the Internet or other wide area network.

Proxy-Server 49 exists in this embodiment of the invention to perform functions enabling hand-held computer 47 to operate as an apparently powerful web-browsing machine, even though the stand-alone capability of computer 47 will not even begin to support such functionality. As is well known in the art, for a computer to be a fully functional web-browsing system requires a high-performance CPU and execution of relatively sophisticated web-browsing and display applications. Such a computer typically has to operate, as described above, at or above a million instructions per second.

Proxy-Server 49 executes a program 53 the inventor terms an Inter-Browser. The Inter-Browser combines functionality of a conventional web browser with special functions for recognition of and communication with hand-held computer 47. Commands from computer 47, such as, for example, a command to access a WEB page on the World Wide Web, or a server or station such as station 17 within a home communication center such as center 9, are received by Proxy-Server 49 operating the Inter-Browser program, and acted upon as though they are commands received from a conventional input device such as a keyboard.

Following the example of a command communicated over link 66 from computer 47 for accessing station 17, shown herein and in FIG. 1, Proxy-Server 49 accesses the appropriate server (in this case station 17) over link 77, and transmits the appropriate data over link 77. Proxy-Server 49 therefore has HTML and TCP/IP capability for accessing source data over the Internet. By hosting other routines that allow interface with data systems, data sources and such as station 17, a KW may have full access to virtually any type of data or software tools that he could access from his station if he were operating from within center 9.

Proxy-Server 49, instead of displaying the downloaded data (or playing video and/or audio output, as the case may be, depending on the downloaded data), translates the data to a simpler communication protocol and sends the data in a TCP/IP protocol to computer 47 for output over link 66. Link 66 becomes a dedicated TCP/IP pipe to and from Proxy-Server 49. Proxy-Server 49 thus acts as a proxy for computer 47, performing those functions of WEB browsing and data download that computer 47 cannot perform under its own computing power.

Computer 47, through execution of a program the inventor terms a NanoBrowser 51 sends commands entered at computer 47 over link 66 to Proxy-Server 49 and accepts data from Proxy-Server 49 to be displayed on display 61. Data is transferred in a protocol the inventor terms HT-Lite. The NanoBrowser also provides for interactive selection of links and entry into fields in displays, as is typical for WEB pages displayed on a computer screen. The NanoBrowser provides for accepting such entry, packaging data packets in TCP/IP form, and forwarding such data to Proxy-Server 49, where much greater computer power provides for efficient processing.

One of the processing tasks that has to conventionally occur at the browser's computer is processing of received data into a format to be displayed on whatever display the user has. There are, as is well known in the art, many types of displays and many display modes. These range all the way from relatively crude LCD displays to high-resolution, multi-color displays. There are, in addition, a number of other functions that have to be performed conventionally at a user's computer to interact effectively with the WWW. For example, audio and video and some other functions typically require supplemental, or helper, applications to be installed on or downloaded to a field unit to process audio and video data and the like.

Most data transferred by WEB servers assumes relatively high-end displays, such as color SVGA displays as known in the art. Data accessed through the Internet from such as MIS database 15 of FIG. 1 would also assume a high-end display and large file size dependent on the type of media accessed. In PDAs, cellular video phones, and digital organizers, such as those anticipated for use in the present invention, the displays are relatively low resolution, and are typically LCD in nature. In the system described with the aid of FIGS. 1 and 2, Inter-Browser program 53 at Proxy-Server 49 and the HT-Lite Nano-Browser 51 at hand-held unit 47 cooperate in another manner as well. When one connects to the Proxy-Server the hand-held unit, through the HT-Lite Nano-Browser program, provides a signature, which the Proxy-Server compares with logged signatures.

An ID match when connecting a hand-held unit to the Proxy-Server provides the Proxy-Server with information about the hand-held unit, such as CPU type and power, screen size, type and resolution, presence of a pointer device, and sound capability. The Proxy-Server then uses this specific information to translate HTML and other files from the Internet to a form readily usable without extensive additional processing by the hand-held unit. For a small monochrome LCD display a 60k/70k JPEG file becomes a 2k/4k bit map, for example. Also, multi-file pages are recombined into single file pages. This translation also minimizes bandwidth requirement for link 66, and speeds transmission of data. In this way, a mobile KW may have access to all types of data sourced at his or her home communication center. Through proxy server 49, a KW may also initiate and receive multimedia interactions including high-end transactions while operating unit 47.

It is in this ability of the Proxy-Server to do the heavy computing, of which the translation of HTML files is a single example, that is responsible for a unique ability of hand-held devices in practicing embodiments of the present invention to accomplish functions that they could not otherwise accomplish, and to do so without inordinate usage of stored energy. In various embodiments of the present invention, hand-held devices with CPUs having an ability to run at from 0.001 to 0.05 MIPs can serve as WEB browsers, displaying WEB pages and allowing users to initiate on-screen links and to input data into input fields. Given the above example of MIPs requirement for WEB browsing, where currently available solutions may provide a 5× advantage, practicing the present invention can provide an advantage of up to 2000×, resulting in battery life approaching 2 weeks (given a 100 g battery weight), where expected battery life for similar functionality with a powerful CPU was calculated as 8 minutes.

As a given example of an instance wherein a mobile KW may provide full service to a home center, consider the following: Assume a mobile KW from center 9 of FIG. 1 is at a client premise installing network software and therefore not at center 9. He opens his or her hand-held device 47 and plugs in to a nearby telephone jack for the purpose of establishing a connection to proxy server 49, which in this case, may be implemented anywhere on the Internet. While he is configuring software on a client's computer, an important call from communication center 9 arrives through server 49 (hosted by the enterprise) to his hand-held 47. The call is pre-processed at proxy server 49 by Inter-Browser 53 and transmitted over link 66 to device 47 where it is displayed according to device parameters and rules associated with Nanno-Browser 51.

Suppose that the call requests that the KW rewrite a script used in such as digital voice attendant 37 because the current message has become corrupted or is not playing properly. The KW may then initiate a multimedia call to his resident workstation such as station 17 (FIG. 1) through proxy 49 by way of link 77. The call would arrive at router 19 and be routed directly over link 41 to station 17 based on identity thus by-passing normal DNT call handling routines. Part of the call includes a command to allow the KW to control the operation of station 17 by proxy. He may then use command keys to cause Inter-Browser 53 to browse a list of pre-prepared DNT scripts stored at station 17. Such a list may appear as a text summary on such as display 61 of device 47. The KW may then scroll through and select a script thus issuing a command to station 17 (by proxy) to access attendant 37 (FIG. 1) and replace the message which is overwritten by the new one.

It will be apparent to one with skill in the art that there are a wide variety of interaction possibilities by virtue of the method and apparatus of the present invention. In the cited example, a DNT call was made to the KW's computing device 47. Therefore, proxy 49 acts in one aspect as a call router. In another embodiment, a KW may accept a cellular call or a COST call and respond to the request-using device 47.

In still another embodiment, a KW operating a portable device such as device 47 may temporarily plug in to any connected LAN network such as may be found connecting a large technical campus or the like. Upon plugging in, the KW may initiate an outbound-call to server 49 in the Internet and receive a temporary IP address and device authentication for communicating with such as center 9.

To practice the invention, given an accessible WEB server configured as a Proxy-Server according to an embodiment of the present invention, one needs only to load HT-Lite Nano-Browser software on a computer and to provide Internet access for the computer, such as by a telephone modem. In many cases, candidate computers have built-in modems. In other cases, an external modem may be provided and connected. In the case of hand-held devices, such as PDAs and organizers, some have an ability to load software via a serial port, a PC card slot, through the modem extant or provided, or by other conventional means. In some cases, all operating code is embedded, that is, recorded in read-only memory. In some of these cases, adding HT-Lite routines may require a hardware replacement. In virtually all cases of hand-held devices, however, the necessary routines can be provided.

One of the components of the HT-Lite Nano-Browser software (51) is a minimum browser routine termed by the inventor a Nano-Browser. The Nano-Browser is capable of exerting a URL over the modem connection to access the Proxy-Server. Theoretically, one could exert a URL of a WEB site other than the Proxy-Server, but the result would be an unusable connection, as the small hand-held unit would not be able to handle the sophisticated data provided to be downloaded unless it were such as e-mail or other simple data.

Connection to the Proxy-Server provides the Proxy-Server with information as to the KW and the KW's equipment. These operations proceed in a manner well known in the art for such log-on and security transactions. Once access is extended to the KW, an interface is provided for the KW to browse in a manner very similar to well-known WEB interfaces. That is, the KW's display (61) provides an entry field for a URL which is asserted by an enter key or the like. There may also be an address book for often-visited sites, as is common with more powerful machines.

Similarly, there are no strict requirements for the location of Proxy-Server 49 or of accessible data sources or home stations in embodiments of the present invention. No restrictions are placed on such locations beyond restrictions on servers/nodes in general. In one embodiment, a corporation with multiple and perhaps international locations may have a local area network with one or more Proxy-Servers, and employees, particularly those employees whose job functions require travel, are provided with hand-held digital assistants according to an embodiment of the present invention. Multiple functions are then provided over Internet connection in Internet protocol, far beyond what could otherwise be provided with small and inexpensive units; and battery life for these units (device 47) would be far beyond what would otherwise be expected. Furthermore, a company could reduce or streamline a force of KW's to a smaller number of mobile KW's with enhanced portable devices such as device 47.

It will be apparent to one with skill in the art that the device-proxy method such as the one described above could be applied to a wide range of communication center architectures and network operating systems without departing from the spirit and scope of the present invention. A KW operating a device such as device 47 may operate while traveling to or from client locations as well as on-site at a client location. Types of devices used to communicate with proxy server 49 may vary without departing from the spirit and scope of the present invention. For example, PDAs, small notebook computers, some cellular telephones, CE type machines; all may be adapted for a proxy relationship.

Extended Management Control

According to another embodiment of the present invention an enhanced method and system is provided for enabling full and unobstructed access to contact center services and data for remote knowledge workers, including provision of full state and interaction management capabilities to the center managing the knowledge workers. The method and apparatus of the present invention is described in enabling detail below.

Figure 3:
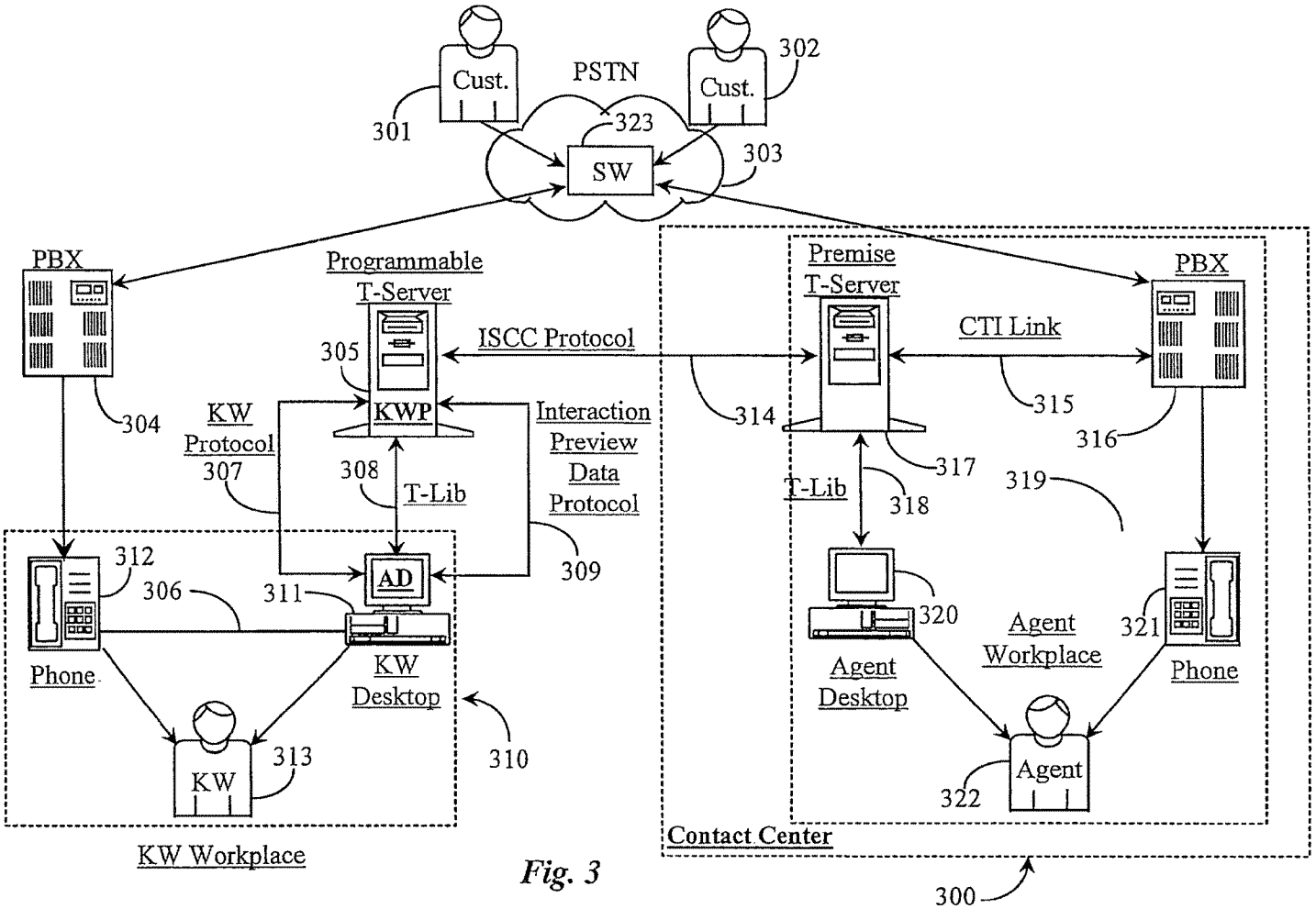
FIG. 3 is an architectural overview of a state and interaction management system according to an embodiment of the present invention.

FIG. 3 is an architectural overview of a state and interaction management system implemented from a contact center 300 according to an embodiment of the present invention. Contact Center 300 can be employed in any mix of communication environment. For example, in a dually-capable COST/DNT multimedia environment, in a COST only environment, or in a DNT only environment. In the present example, a COST environment is illustrated. Likewise, one with skill in the art will recognize that there may be more and different types of known communication center equipment present and cooperative with the system of the invention other than what is illustrated in this example without departing from the spirit and scope of the present invention.

Center 300 utilizes a central office telephony switch 316, which in this case, is a private branch exchange (PBX) switch. Switch 316 may also be an automated call distributor (ACD) or another known type or manufacture of telephony switch. Switch 316 is a relatively dumb switch, but is enhanced for intelligent routing and control by a CTI processor 317 running an instance of CTI transaction server (T-Server) software. CTI enhancement in this example is driven by T-Server software, which is an application that controls switch 316 and provides the intelligent computerized rules and executable routines for interaction management and state detection and management. A typical CTI link 315 connects processor 317 to PBX switch 316 in this example.

An agent workplace 319 is illustrated within the domain of center 300. Workplace 319 is adapted minimally in this example with an agent desktop computer 320 and an agent telephone 321. It will be apparent to one with skill in the art that there will, in actual practice, be typically many agent stations provided and adapted for normal communication center routine business and communication. The inventor illustrates only one station and deems the illustration sufficient for the purpose of teaching the features of the present invention in an enabling way.

In this case, agent telephone 321 is a COST telephone connected to PBX switch 316 by standard internal telephony wiring. Agent desktop 320 is connected to a communication center LAN illustrated by a LAN network 318 labeled T-Lib (for transaction library). A transaction library contains all of the business and routing rules applied to normal center interaction and operation. It may be assumed in this example, that other equipment (not shown) is connected to LAN 318 such as other agent stations, a customer information system, a product history database, and many other equipment types both client-oriented and service-oriented.

An agent illustrated herein as agent 322 uses telephone 321 and desktop computer 320 for the purpose of handling routine interactions such as purchase orders, order status reports, internal logging and reporting, and other tasks. In one embodiment, telephone 321 may be an IP-capable telephone and also may have a sound connection to desktop computer 320.

A COST telephony network 303 is illustrated in this example as a preferred telephony network bridging customers to center 300 using COST technology. Network 303 is a public telephony switch notably most local to center 300, Switch 332 is the last routing point in network 303 before making connection to switch 316 in a preferred embodiment. In one embodiment, switch 323 is CTI-enabled similarly to switch 316 within center 300 and communication center routines can be executed at switch 323 over a separate network connecting the CTI processors associated with both switches 316 and 323.

A customer 301 and a customer 302 are illustrated in association with telephone network 303, which is a public switched telephone network (PSTN) in this example. Customer 302 is illustrated as placing a call to center 300 through switch 323 and switch 316. In normal practice, the call of customer 302 will be internally routed using CTI intelligence to an agent or automated interface within center 300. In this case agent 322 receives the call on telephone 321. Desktop 320 will display any pertinent customer information obtained from pre-interaction with customer 302 or from data sources internal to center 300, or both.

A knowledge worker workplace 310 is illustrated in this example and is associated with communication center 300 by a network link 314 adapted for ISCC protocols. ISCC is an acronym for the well-known International Symposium on Computers and Communications. ISCC-developed protocols may be assumed to be practiced over network line 314 including a Flexible Interconnecting Protocol (FLIP).

It may be assumed then, in this example, that KW workplace 310 is located remotely from center 300 and outside of the physical domain of center 300. Workplace 310 may be associated with other KW workplaces in a remote contact center. In another embodiment, workplace 310 may be a home-based workplace. In still another embodiment, workplace 310 may be in a state of mobility such as in a vehicle or at a remote customer worksite. KW workplace 310 has a desktop computer 311 (or equivalent) and a KW telephone 312. A knowledge worker (KW) 313 receives calls from PSTN 303 that are directly placed from customers such as from customer 301, or calls that are received to and then redirected from center 300.

As described above, KW workplace 310 is not physically part of center 300 in terms of residing within a same building or physical structure. Rather, worker 313 is operating from a remote location. A major difference between the architecture of agent 322 and knowledge worker 313 is that worker 313 has no CTI link between a local switch and center 300. In this example, a local switch 304 is illustrated and represents a local network switch (PSTN) presumably closest to KW 313. In practice however, if workplace 310 is mobile, such as working while traveling, there may not be a specific permanent local switch from whence calls arrive to KW 313.

It will be recognized by one with skill in the art that in the mobile sense, even in a wireless and semi-permanent networked environment, the fixtures illustrated within workplace 310 may vary widely. For example, telephone 312 may be a cellular telephone with Internet capability and desktop 311 may be a PDA or a laptop. In a fixed but remote location such as a remote knowledge worker contact center, individual knowledge workers may still be highly mobile but connected to communication to a LAN inside the center using a variety of communication devices.

To facilitate connection from center 300 to knowledge worker workspace 310, a programmable T-server/Processor 305 is provided and distributed on a data packet network (DPN) such as, for example, the well-known Internet network. If workplace 310 is part of a permanent contact center operating remotely from center 300, then switch 304 and processor 305 may be part of the equipment maintained in the contact center. However, for knowledge workers that are home agents or highly mobile, then switch 304 and processor 305 are network level systems, switch 304 in the PSTN and processor 305 in a private or public DPN.

The fact that there is no CTI link to center 300 means that under normal circumstance, the activities of KW 313 in workplace 310 cannot be managed. The system of the invention is enabled by a software platform known to the inventor as a Knowledge Worker Platform (KWP) that functions in cooperation with hosting equipment, namely processor 305, to alleviate the requirement for a hardwired CTI link or other complicated connection methods, system dependant CPE, or complex client software applications. KWP is a proxy agent that receives KW status information (e.g. ready or not ready) from a KW device such as from desktop 311 and sets the information within CC environment at center 300. Status reporting is used for determining KW availability for routing determination. KWP also supplies the KW device with call-related information (e.g. customer/product information) when an event is routed.

Workplace 310 is connected to processor 305, running an instance of programmable T-server, by a network link 308. In this case, processor 305 is accessible from desktop computer 311. In this particular embodiment, desktop 311 and telephone 312 are permanent fixtures and workplace 310 is part of an established physical center. In this case, link 308 may be a LAN network providing connectivity to other KW stations. Similarly, telephone 312 would be just one of many connected to switch 304 by internal telephone wiring. In this case, telephone 312 is also connected to desktop 311 by a cable so that desktop 311 may monitor call activity on telephone 312. It will be appreciated that there are many other possible architectural scenarios both fixed and mobile using wireless technologies.

Desktop computer 311 has an instance of agent desktop (AD) application installed thereon similar to a traditional application expected for a traditional in-house desktop like desktop 320 manned by agent 322 within center 300. However, the program on desktop 311 is modified to interact with KWP running on processor 305. KWP (processor 305) and AD (KW desktop 311) exchange information including Transaction Library data (T-Lib), Knowledge Worker Protocol (KW Protocol), and Interaction Preview Data Protocol (IPDP). Data links 307 and 309 are logical only and all data shared between processor 305 and desktop 311 may travel over a single physical or wireless data connection.

The AD application running on desktop 311 may be adapted to run on virtually any network-capable device such as a cellular telephone with display, an IP telephone, a PDA, a paging device, and so on. The only modifications required for AD at workplace 310 are the application program interfaces required to work with data that is not in standard CTI format. In a preferred embodiment, KWP uses Extensible Markup Language (XML)-based protocol for device independent presentation and Extensible Style sheet Language Transformation (XSLT) scripts for transforming XML source data to, for example, HTML data or other data formats to accommodate device-dependent data presentation requirements. Basically XSLT is an XML processing language known in the art.

It is important to note herein that the models for KWP and AD are the standard T-Server and agent desktop models. Appropriate extensions are made to KWP and AD to enhance capability for dealing with KW protocol and added T-Lib entities. For example, the model for a knowledge worker is an extension of the model for a standard agent. Therefore, attributes of the KW model do not exist in the standard agent model. These attributes or object entities are added to the standard T-Lib for KW use. The extended attributes define the separation of remote KW characteristics and function constraints from those of a regular CTI agent.

In practice, CTI telephony capability is extended to KW 313 by way of link 314, 308, and the adapted applications KWP and AD. Switch 304 remains a dumb switch having no CTI control. For example, assume customer 301 has a direct number to telephone 312 and places a call to KW 313. The call request is routed through switch 323 to switch 304 where notification of the call exemplifies a ringing event at telephone 312. At this point, center 300 has no indication or idea that KW 13 has a call-event ringing notification. However, when agent 313 takes the call, AD software on desktop 311 detects the activity and sends pertinent state data to KWP in processor 305, which in turn delivers the information to premise server 317.

Once server 317 has the information, other calls destined to telephone 312 can be managed and queued according to KWP reporting data. During interaction with the caller on telephone 312, KW 313 can use desktop 311 to obtain additional call and customer data, product data, history data and so on from center resources. Likewise, KW 313 may use terminal 311 to perform a call-related action such as hold, transfer, terminate, and other like commands. The command path in a preferred embodiment can be executed from server 317 and direct to a CTI-processor running an instance of T-Server (command path not shown) that intelligently enables switch 323 to terminate, interact or otherwise treat the event accordingly at switch 323. An advantage is that management information is available from the time of call receipt. If a queue is used, the information may be used for queue management purposes so that the center can tell whether or not a particular knowledge worker is not available. The center can then route calls destined to KW 313 based on availability.

In one embodiment, customer 302 places a call to KW 313 the event routed through switch 323, and switch 316. By identifying the DN as that of KW 313 (telephone 312) CTI messaging takes place between switch 316 and the Premise T-server application on processor 317. Server 317 then communicates through ISCC link 314 to the Programmable T-Server application on processor 305 enhanced as KWP. KWP messages with AD at desktop 310 to determine availability of DN (telephone 312). AD checks telephone activity by link 306 and if available responds along the reverse chain of links. Assuming availability then switch 323 can seamlessly re-direct the event to switch 304 by command from processor 317 and cause a ringing event at telephone 312. This assumes that processor 317 is connected to a like processor at switch 323. Otherwise, the call can be rerouted from switch 316 through switch 323 to switch 304. Link 306 is virtual in the sense that telephone activity at telephone 312 can instead be monitored from switch 323 if it is CTI-enabled and has a link to processor 317.

Outbound calls, inbound calls, and KW to KW remote calls can be monitored and reported in terms of state activity and availability. Assume, for example, that KW 313 places an outbound call from telephone 312 destined for telephone 321 in agent workplace 319. AD running on desktop 311 detects the outbound DN and uploads pertinent data to processor 305 whereupon KWP sends appropriate request for availability to Premise T-Server 317 controlling switch 316. Premise T-server 317 has information pertinent to the activity state and availability of agent 322 in his workplace 319 by way of LAN connection 318. Returned data follows the reverse chain and may show up on desktop 311 before the ringing event has expired. A wealth of information can be propagated between KW 313 and center 300.

Data about callers and contact center service tools and full database access is made available to KW 313 on desktop 311 using KWP and AD applications. If there is no monitoring capability between the device that KW 313 receives an event on and the computing platform of KW 313, then KW 313 may have to manipulate AD on the computing platform in order to access center 300 for data pertinent to the event. In other embodiments the computing platform and the device used to receive events are one in the same such as a network-capable cellular telephone for example.

KW 313 can register any number of DNs from AD on desktop 311 to receive events when he or she is leaving workplace 310 and will be away for a period. In the case of a short distance, a wireless peripheral can be used to access center data through desktop 311 and a wireless telephone can be set-up to receive the events. There are many equipment variations that are possible.

The nature of the connection between KWP and a KW device can be configured according to a number of criteria and supported platforms. For example, a one-way connection can be utilized for practicing only KW status notification to center 300. A two-way connection can be practiced for call-related data propagation. In addition to dial-up techniques to facilitate the connection between KWP and a KW device, wireless and Internet Protocol (IP) connections can be implemented. It is also possible to practice the invention with a simple PSTN connection.

KWP architecture supports any existing media and platform. More specifically, KWP supports a traditional desktop with a data link (illustrated in this example), wireless linking for PDAs and wireless browser applications. KWP also supports conventional voice devices including but not limited to analog telephone, conventional IVR, and VoiceXML based IVR. Messaging protocols such as Simple Messaging System (SMS), Instant Messaging (IM), email. Internet markup languages such as traditional HTML-based languages are supported along with more recently introduced Wireless Application Protocol (WAP) and Wireless Markup Language (WML). More detail regarding the software platform of the invention and how it functions in telephony scenarios is presented below.

Figure 4:
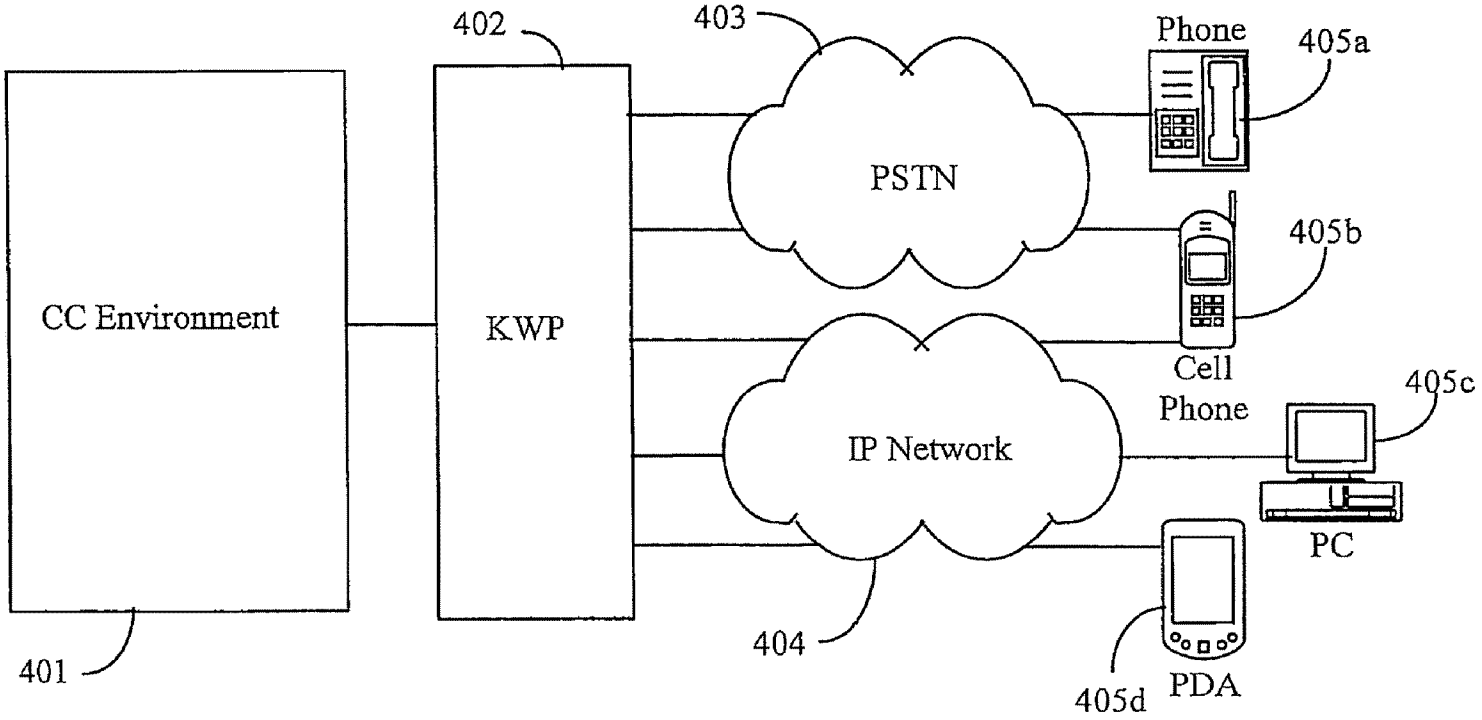
FIG. 4 is a block diagram illustrating system connection hierarchy according to an embodiment of the invention.

FIG. 4 is a block diagram illustrating system connection hierarchy according to an embodiment of the invention. In this simple example, KWP 402 resides between the communication center environment (401) and the remote KW or KWs. Therefore, KWP 402 is a proxy-serving platform that is integrated as an extension of the CTI telephony platform generally described as the T-Server platform. In this example, CC Environment 401 is analogous to the capabilities of center 300 described with reference to FIG. 3 including any extension of those capabilities into the PSTN network by way of separate data network connections and CTI processor distribution to network level components.

KWP 402 is analogous to KWP running on processor 303 described with reference to FIG. 3. IP network 404 and PSTN network 403 illustrate exemplary communication networks used in communication. Other networks may also be substituted therfor or used in conjunction therewith. A plurality of KW devices is illustrated as examples of varying types of devices that may be used by a KW to practice the invention. A standard analog telephone 405a can be used in a simple embodiment to communicate with KWP through PSTN 403. IVR-based technology is used in this case to provide the KW with call and center-related data as well as for receiving routed events. A cellular telephone 405b is illustrated and can be adapted to communicate with KWP 402 through a COST connection or through a DNT connection. WAP and WML are supported so that XML-based data from CC environment 401 can be displayed on device 405b.

It is noted herein that AD, described with reference to FIG. 3, normally requires approximately 30 megabytes of disk space in a robust version for desktops and the like. Therefore, an AD-Lite application would be downloaded to device 405b according to storage availability. In another embodiment, AD may be combined with KWP at server side wherein AD is still personalized to the particular KW authorized to access it and operate it from device 405b.

A PC 405c is illustrated in this example and is analogous to desktop 311 described with reference to FIG. 3. A PDA 405d is illustrated in this example as a possible KW device that communicates to KWP through IP network 404, or can also be operated with a wireless connection through PC 405c as a host.

Figure 5:
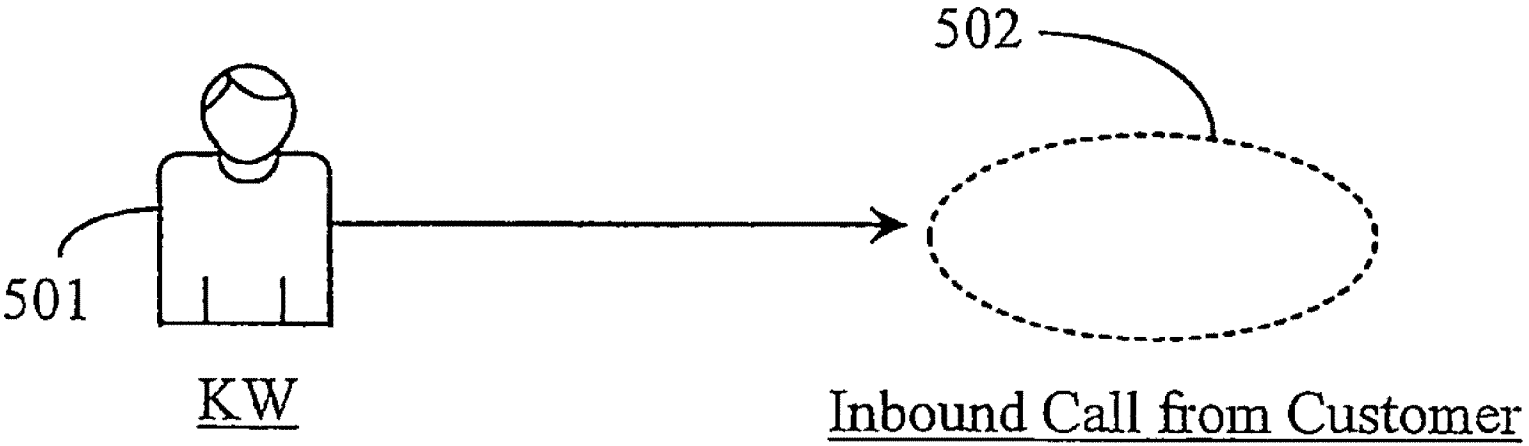
FIGS. 5 through 8 are block diagrams illustrating call control use cases according to an embodiment of the present invention.

FIGS. 5 through 8 are block diagrams illustrating call control use cases according to an embodiment of the present invention. Referring now to FIG. 5, the basic advantage of KWP in that KW agent 501 can accept inbound calls form customers (502) wherein availability status, skill level, and other criteria can be provided to the communication center environment for the purpose of routing call 502. If the DN of KW 501 is not integrated with a KW computing platform, then KW 501 can still enter input from the KWP-connected computing platform when on call using an unregistered DN to retrieve data. At this point the communication center can track the activities and results based on KW data input. In another embodiment, the DN of the KWs receiving telephone can be set in the CC environment wherein a network level switch enhanced by CTI software can monitor state, determine best routing, and initiate data transfer of call-related and center-related data to the KW without first party input.

Figure 6:
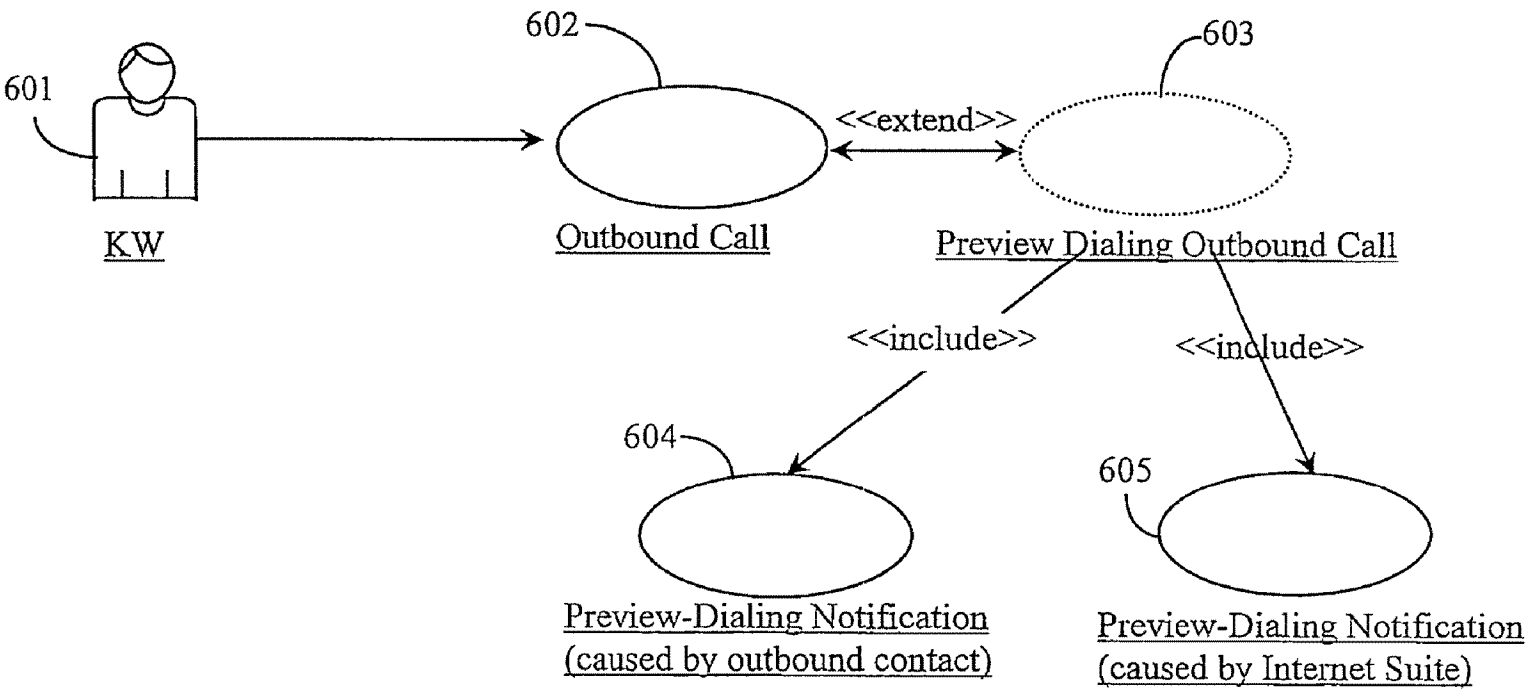

Referring now to FIG. 6, KW 601 can initiate an outbound call (602). As an extension to traditional outbound dialing, a preview-dialing mode 603 is supported which includes preview dialing notification caused by outbound contact (605) and a preview-dialing mode supported by Internet suite (605) for IP mode.

Figure 7:
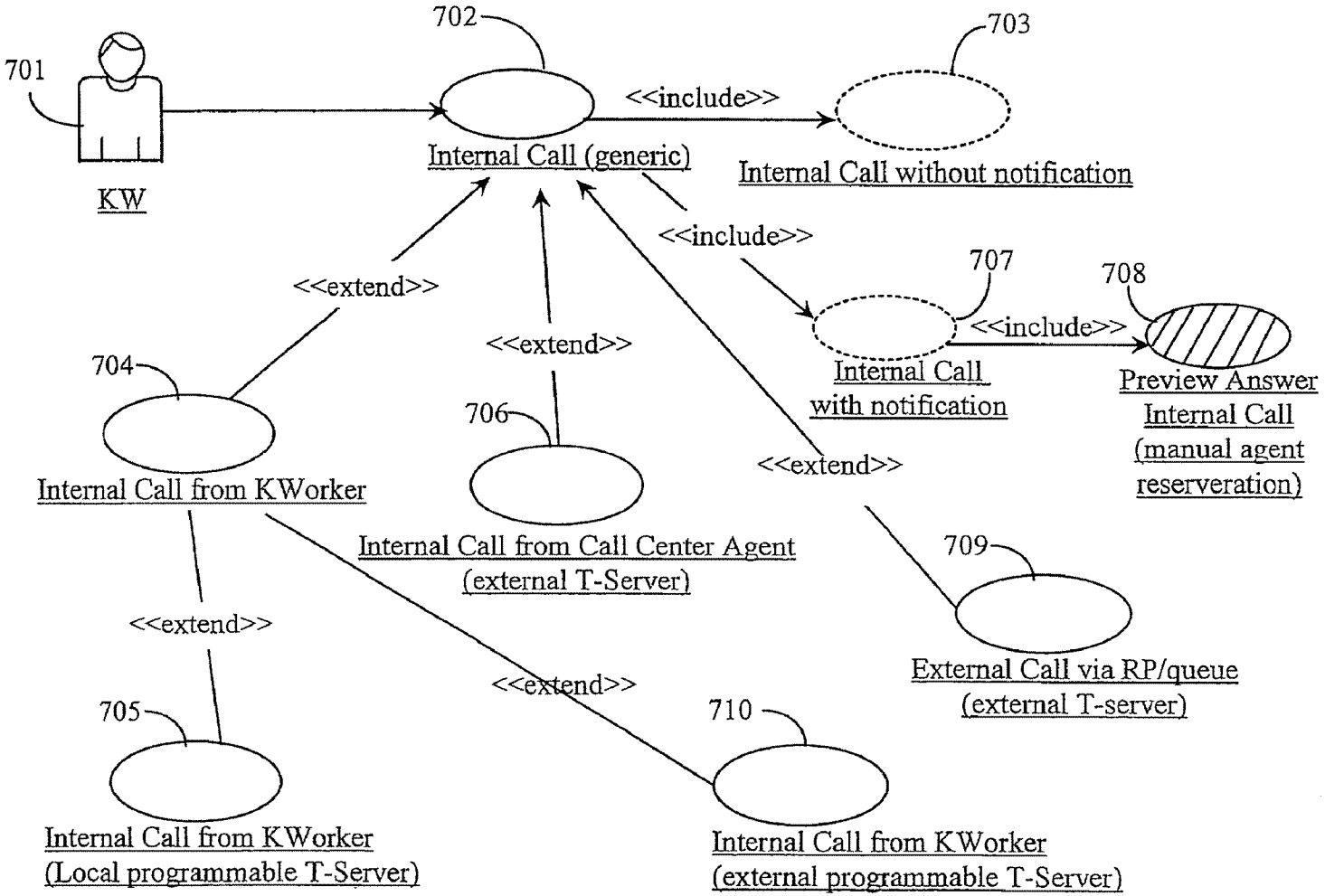

Referring now to FIG. 7, a KW (701) can place or receive internal calls (702) from other knowledge workers. This includes an internal call without notification (703), an internal call with notification (707). An internal call with notification includes an option (708) for preview answer of the internal call associated with a manual agent reservation. There are several extended options including an external call (709) via RP queue performed by an external T-Server, an internal call (706) from a center agent performed by the external T-Server, and an internal call (704) from another KW. Option 704 can be extended to an option of internal call (710) from a KW performed by an external programmable T-Server, or an option of internal call (705) from a KW performed by a local programmable T-Server.

Figure 8:
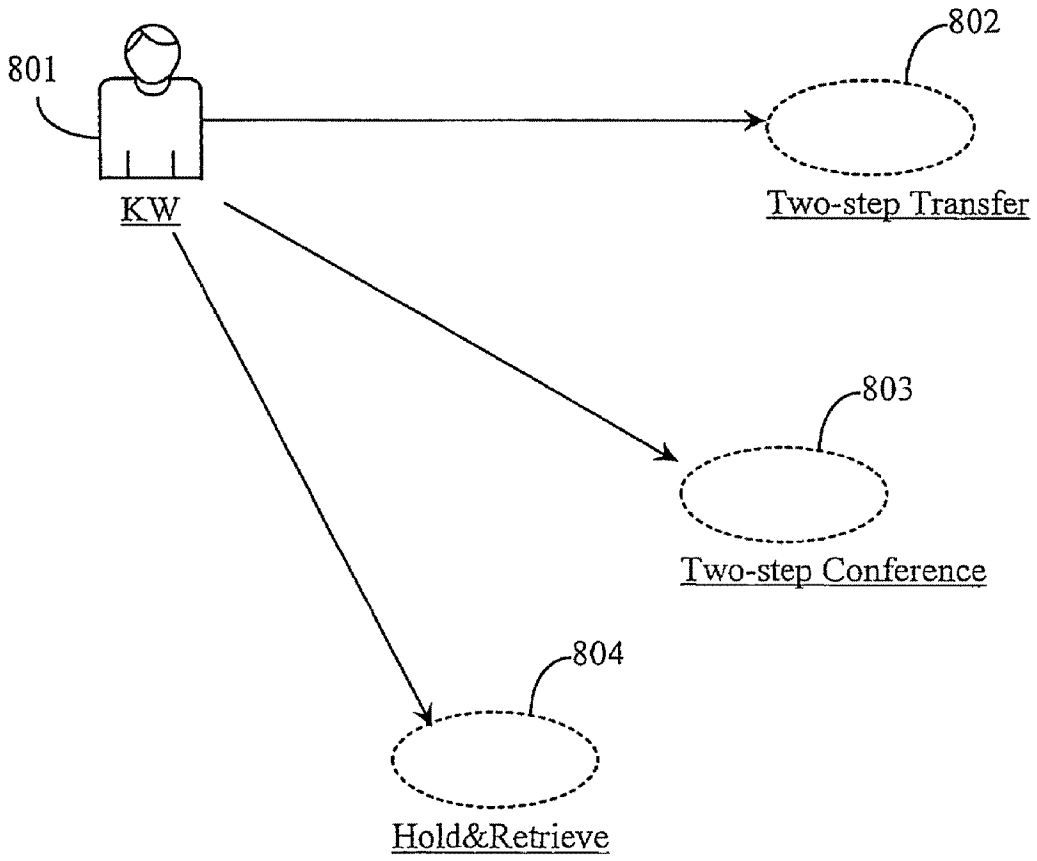

Referring now to FIG. 8, KW 801 can initiate more complicated interactions such as a two-step transfer (802), a two-step conference (803), and a hold and retrieve (804).

Figure 9:
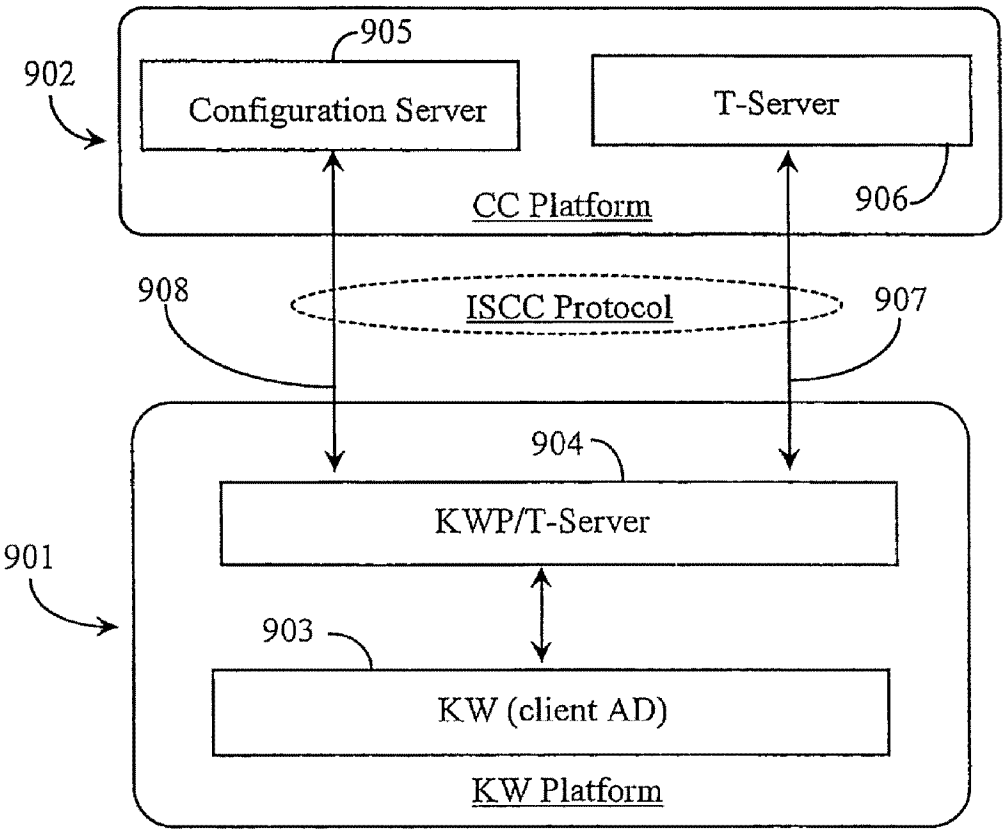
FIG. 9 is a block diagram illustrating components of the Knowledge Worker software and integration thereof to a communication center framework.

FIG. 9 is a block diagram illustrating components of the Knowledge Worker software and integration thereof to a communication center framework. The KWP 901 of the present invention includes a server application 904, which is analogous to programmable T-Server and KWP software running on processor 305 described with reference to FIG. 3 above.

A KW desktop or "client" application 903 is also part of KWP 901. KW desktop 903 is analogous to AD running on desktop 311 described with reference to FIG. 3.

KWP communicates with a communication center (CC) Platform 902 over a data link (908, 907) that supports ISCC protocol. Link (908, 907) is separated in terms of element number to show communication of two separate components in this example. However, the physical link is analogous to link 314 described with reference to FIG. 1.

CC platform 902 includes a configuration server 905 and standard premise T-Server 906. Configuration server 905 is a software implement that is used to configure and update KWP/programmable T-server 904. In turn, KWP/T-Server programs KW desktop 903 if required. As was described further above, KWP 901 is an extension of CC framework. For example, T-server 906 serves as a basic model whereas KWP/T-Server is extended in functionality by additional attributes and capabilities.

Existing T-Library (T-Lib) protocol is used to build additional KW messaging between KWP/T-Server and client the application 903. Standard agent desktop applications are extended to provide KW functionality.

Figure 10:
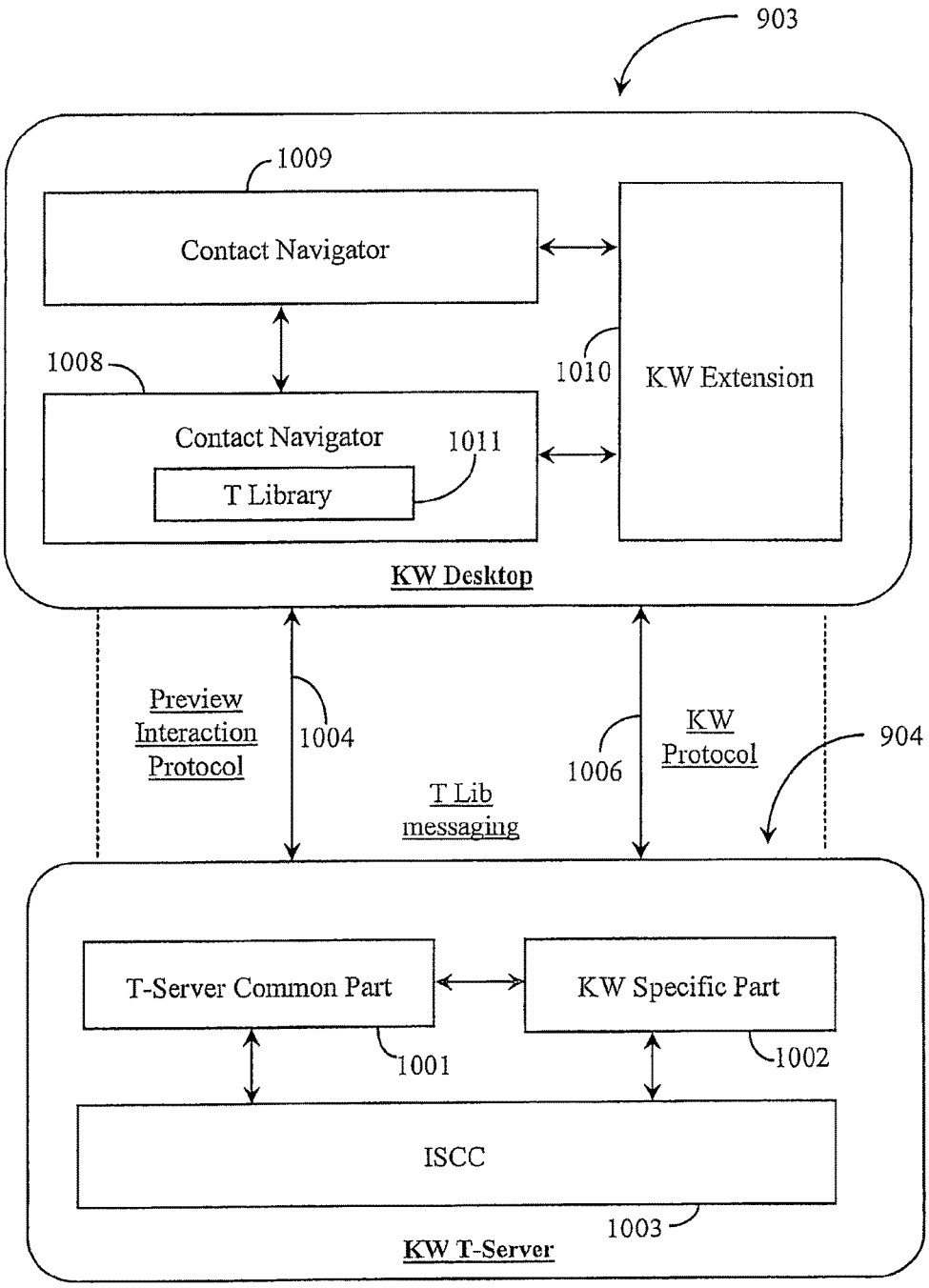
FIG. 10 is a block diagram illustrating components of the knowledge worker platform.

FIG. 10 is a block diagram illustrating components of the knowledge worker platform 901 of FIG. 9. As described with reference to FIG. 9 above, KWP 901 comprises a KW desktop application 903 and a KW T-Server application 904. KW desktop application 903 comprises an agent desktop application known to the inventor as Contact Navigator given the element number 1009. Contact Navigator 1009 utilizes a Transaction Library or T-Library 1008, which contains all of the required business and routing rules and object entities needed to build useful communication between two physically disparate systems namely, the CC platform and the KWP. By themselves, navigator 1009 and library 1008 are identical to the desktop application contained within the physical contact center domain analogous to AD running on agent desktop 320 in center 300 described with reference to FIG. 3 above.

In this example, desktop 903 is enhanced with KW extension software 1010. KW extension 1010 contains all of the attributes that facilitate the added capabilities of a KW desktop over a standard model desktop. T-Lib 1011 is thus enhanced with the appropriate components defined by the extension. It is noted herein that since KW desktop 903 is based on the standard desktop model (contact navigator) added capability can be remotely programmed thereto using the configuration server described with reference to the CC platform of FIG. 9. The appropriate components are downloaded to KW extension 1010 for KW use.

KW desktop 903 has connection with KW T-Server 904 as described further above in this specification. KW T-Server 904 is partitioned into two parts, a T-Server common part 1001 and a KW specific part 1002. KW T-Server 904 is also enhanced with ISCC communication capability via ISCC protocol 1003 for the purpose of economic communication with the contact-center platform.

One main goal of the invention is to maintain separation of KW specific part of T-Server functionality from the standard functionality of T-Server framework components at the host contact center. Such separation allows independent development and support for KWP 901 over contact center framework. Further, separation enables seamless integration of KWP with a variety of host customer-relation-management (CRM)-vendors.

KW protocol is provided instead of traditional CTI protocol. KW protocol, shown exchanged over logical link 1006 between the desktop and the T-Server provides CTI like messaging capability. This means that any KW desktop that registers a DN with KW T-Server 904 establishes telephony switch functionality at the contact center for servicing those registered DNs. KW protocol carries CTI like messages regarding real-time status of any registered DNs from KW desktop to KW T-Server. Various call-control messages are supported like TmakeCall, TanswerCall, TreleaseCall, THoldCall, and so on. These messages are treated as CTI messages that inform KW T-Server 904 of status of a particular interaction.

The structure of messages in KWP is presented below.

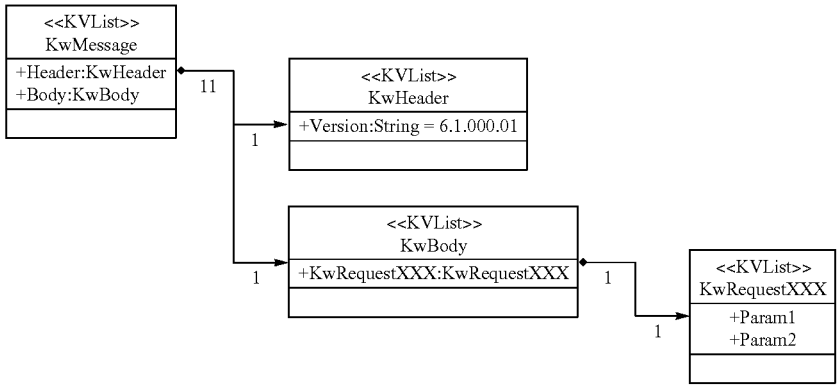

The KWP message is encoded in a KVList data type that enables future extension of KWP without breaking compatibility with older applications.

KVList Structure

The following code exemplifies the structure of a KVList:

```
typedef enum {
    KVTypeString,
    KVTypeInt,
    KVTypeBinary,
```

-continued

```
        KVTypeList,
        KVTypeIncorrect = -1 /* used for error indication only */
    } TKVType;
    struct_kv_pair {
        TKVType type;
        char *key;
        int length;
        union {
            char *_string_value;
            int_int_value;
            unsigned char *_binary_value;
            struct kv_list *_list_value;
        } _value;
    #define string_value        _value._string_value
    #define int_value           _value._int_value
    #define binary_value        _value._binary_value
    #define list_value          _value._list_value
        struct_kv_pair *kv_next;
        struct_kv_pair *kv_prev;
    };
    typedef struct_kv_pair TKVPair;
    struct kv_list {
        struct_kv_pair *list;
        struct_kv_pair *current;
        struct_kv_pair *tail;
    };
    typedef struct kv_list TKVList;
```

TEvent Structure

The following code exemplifies the structure of a transaction event (Tevent):

```
typedef struct {
enum TMessageType           Event;
TServer                     Server;
int                         ReferenceID;
char                        *HomeLocation;
char                        *CustomerID;
TConnectionID               ConnID;
TConnectionID               PreviousConnID;
TCallID                     CallID;
int                         NodeID;
TCallID                     NetworkCallID;
int                         NetworkNodeID;
TCallHistoiyInfo            CallHistory;
TCallType                   CallType;
TCallState                  CallState;
TAgentID                    AgentID;
TAgentWorkMode              WorkMode;
long                        ErrorCode;
char                        *ErrorMessage;
TFile                       FileHandle;
char                        *CollectedDigits;
char                        LastCollectedDigit;
TDirectoryNumber            ThisDN;
TDirectoryNumber            ThisQueue;
unsigned long               ThisTrunk;
TDNRole                     ThisDNRole;
TDirectoryNumber            OtherDN;
TDirectoryNumber            OtherQueue;
unsigned long               OtherTrunk;
TDNRole                     OtherDNRole;
TDirectoryNumber            ThirdPartyDN;
TDirectoryNumber            ThirdPartyQueue;
unsigned long               ThirdPartyTrunk;
TDNRole                     ThirdPartyDNRole;
TDirectoryNumber            DNIS;
TDirectoryNumber            ANI;
char                        *CallingLineName;
TDirectoryNumber            CLID;
TAddressInfoType            InfoType;
TAddressInfoStatus          InfoStatus;
TTreatmentType              TreatmentType;
TRouteType                  RouteType;
char                        *ServerVersion;
TServerRole                 ServerRole;
TMask                       Capabilities;
```

-continued

```
    TKVList                 *UserData;
    TKVList                 *Reasons;
    TKVList                 *Extensions;
    TTimeStamp              Time;
    void                    *RawData;
    TDirectoryNumber        AccessNumber;
    TXRouteType             XRouteType;
    TReferenceID            XReferenceID;
    TKVList         *TreatmentParameters;
    char            *Place;
    int             Timeout;
    TMediaType              MediaType; /* added 7/15/99 ER#9462 */
    TLocation InfoType      LocationInfo;
    TMonitorNextCallType    MonitorNextCallType;
/*
 * Used in RequestPrivateService/EventPrivateInfo:
 */
    TPrivateMsgType         PrivateEvent;
} TEvent;
```

Another protocol provided for use in practice of the present invention is known as Preview-Interaction-Protocol (PIP) to the inventor. Preview interaction protocol is illustrated as being exchanged between KW T-Server 904 and KW desktop 901 over logical link 1004. PIP provides an ability for a KW to preview incoming interactions before actually receiving them. In this way, a KW has the capability of accepting or rejecting an incoming interaction based on attached data such as user data attached with an incoming telephone call. This capability also allows the contact center platform to correctly process external call-control routines like external call, external transfer, external conference, and so on. All preview interaction messaging takes place between KW desktop 903 and KW T-Server 904.

T-Library functions as a messaging transport layer in the software communication scheme. In other words, particular T-Lib messages are used to carry KW protocol and PIP messages.

Figure 11:
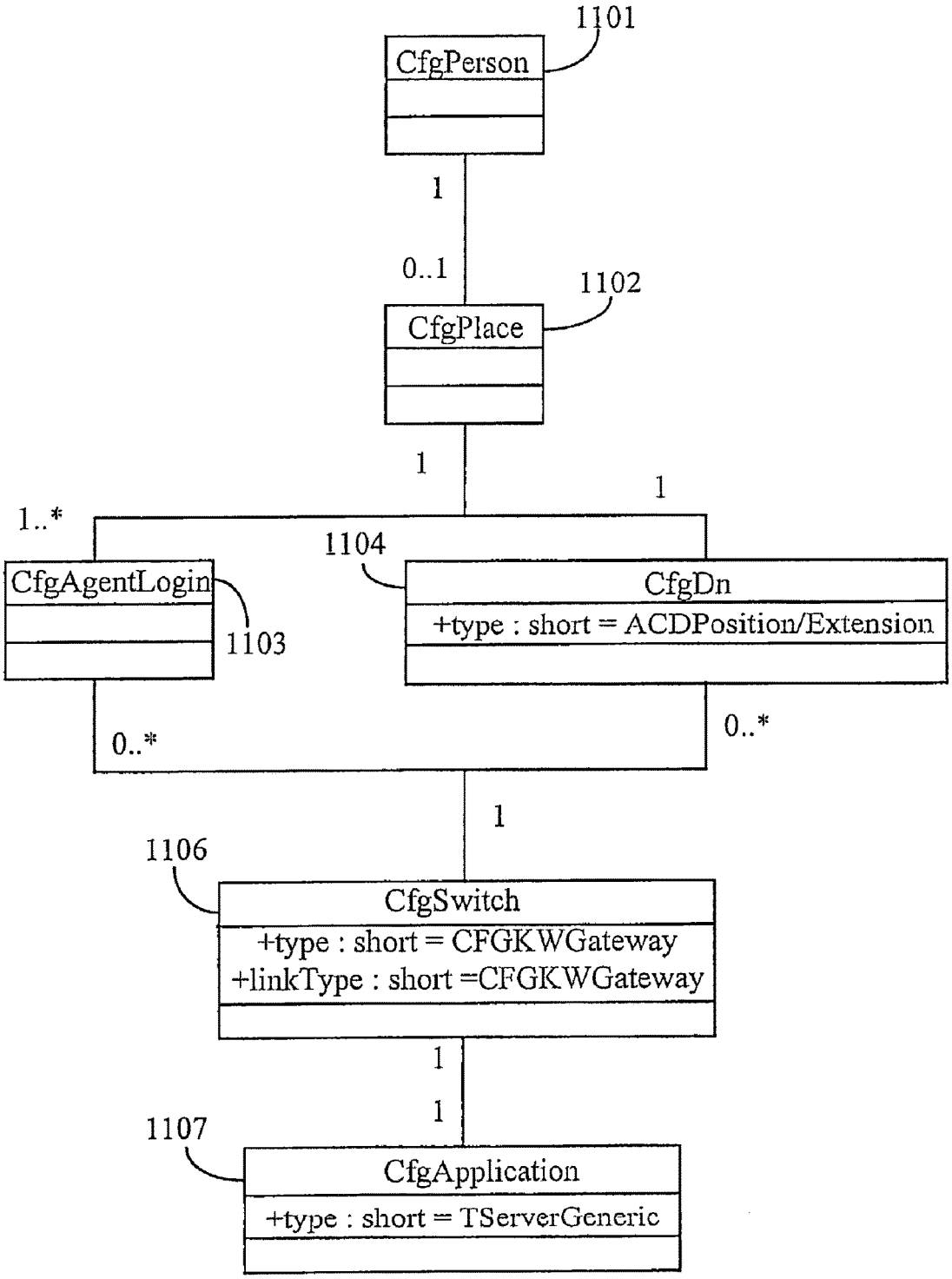
FIG. 11 is a configuration model for knowledge worker state information.

FIG. 11 is a configuration model 1100 for knowledge worker state information according to an embodiment of the present invention. Configuration-Management-Entities (CME) are configured into the system for active state and call control. CME configuration model 1100 is a typical CME configuration routine for configuring remote knowledge workers to practice the present invention. First a KW is configured with CfgPerson 1101. Secondly, the place or places of operation are configured with CfgPlace 1102. The relationship between person and place typically includes one place where a KW will receive interactions. However in some embodiments a KW may be live at one place and have automated services set up in another place. Therefore, the relationship between person and place in this CME model can be one to many.

Place 1102 has two basic attributes that must be configured. These are agent login (CfgAgentLogin) 1103 and DN (CfgDn) 1104. Agent login includes any pre-designed procedure deemed appropriate for a KW to login to the system of the invention. In some cases login may not be required in terms of passwords and so on. Simply opening a connection between the KW computing platform and the KW T-Server may be sufficient for login purposes. In some embodiments, KW platforms associated with automated systems may remain connected and, therefore logged in 24/7. In other cases, automated connection establishment and login may be pre-programmed so that the KW platform will login whether the agent is actually there or not.

CfgDn 1104 is used to register one or more KW DNs with the contact center environment, typically a CTI telephony switch. A KW may configure more than one DN with attached data as to what types of interactions should be routed to which DN. A DN may include one or more telephone numbers, cell phone numbers, an e-mail address, a virtual number for an automated system, an IP address and still other location identifications. One to many relationships between place 1102 and agent login 1103 are possible. Similarly, one to many relationships between agent login 1103 and CfgDn 1104 are possible.

CfgSwitch 1106 configures the acting telephony switch or switches practicing the present invention. This process uses a special KW gateway. CFGKWGateway enables the switch to differentiate KW telephony traffic from regular contact-center and other normal traffic. Switches with or without CTI links are configured if they are involved in KW interaction routing. CfgApplication 1107 is used to configure KWP software at the remote location. This configuration process includes configuring KW T-Server and KW desktop software. CME provides data sync methods for data synchronization, data transformation between customer main and central storage facilities and data transfer between directories by LDAP or preferably through XML and XSLT import/export mechanisms.

Figure 12:
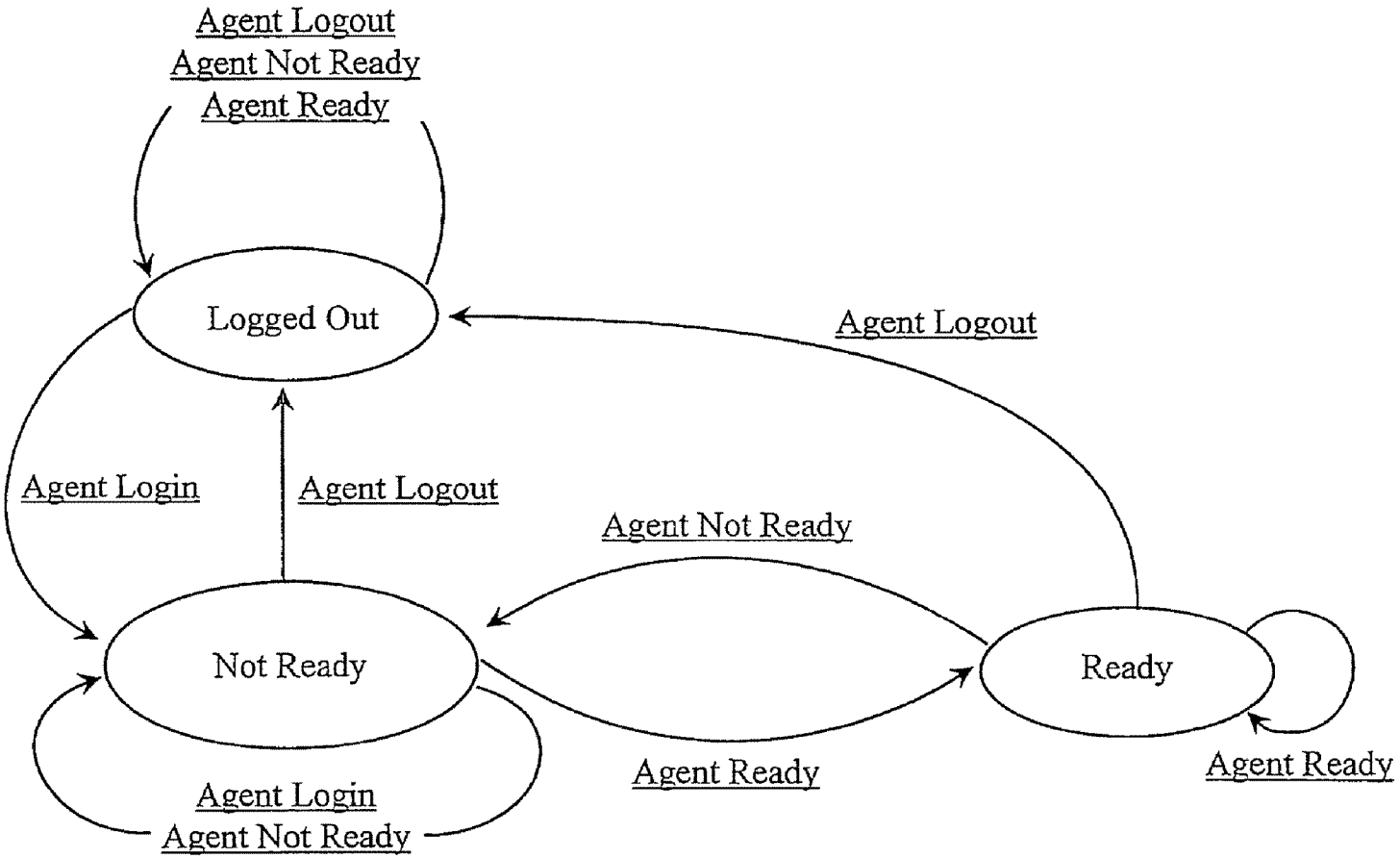
FIG. 12 is a data model for presenting an active knowledge worker state.

FIG. 12 is a data model for presenting an active knowledge worker state. The model of this example presents the various agent states that are implemented by KW T-Server 904 described with reference to FIG. 10 above. The basic reportable states are Agent Login, Agent Logout, Agent Ready, and Agent Not Ready. This model is the basic agent model for standard CTI-T-Server implementation as would be the case inside contact center 300 described with reference to FIG. 3. Hence the term agent can be replaced with the more appropriate term knowledge worker for remote implementation. The arrows represent all possible associations in the model. One with skill in the art will recognize that this is a basic example and that other reportable knowledge worker states may also be represented in this model. Similarly, this model may be applied to different types of interaction media including telephone interaction without departing from the spirit and scope of the invention.

Figure 13:
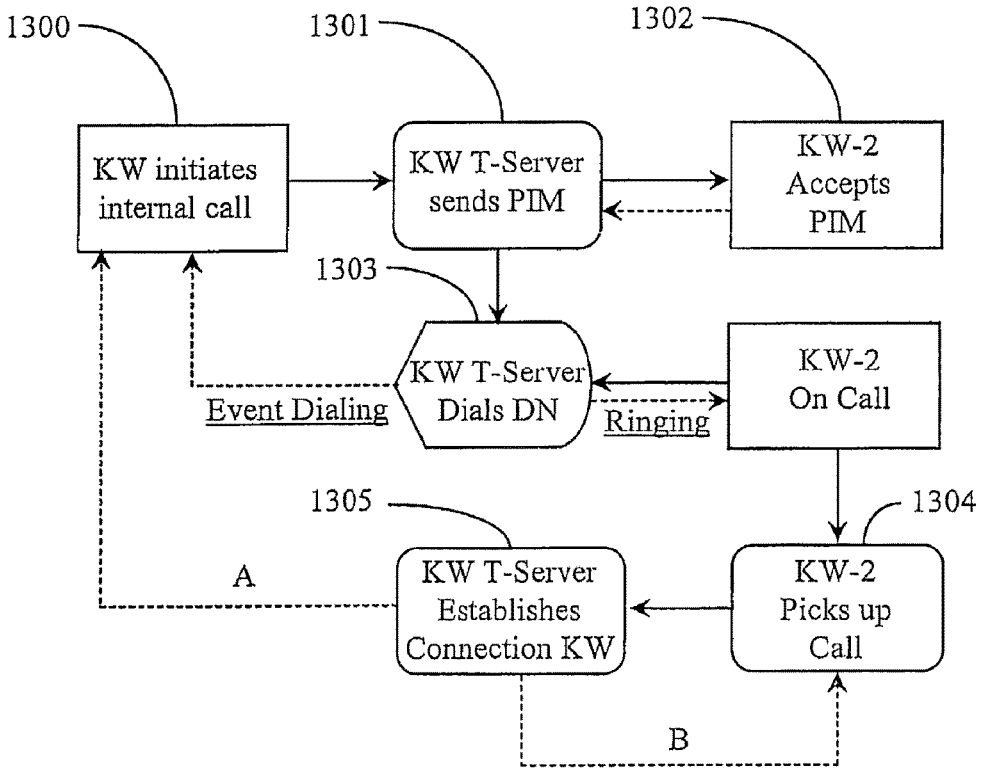
FIG. 13 is a process flow diagram illustrating the sequence of a successful internal call.

FIG. 13 is a process flow diagram illustrating the sequence of a successful internal call. At step 1300 a KW initiates an internal call to another KW. This action can occur from a KW telephone or from a KW computing platform analogous to telephone 312 and desktop 311 of station 310 described with reference to FIG. 3. At step 1301, a KW T-Server analogous to processor 305 described with reference to FIG. 3 receives notification of the initiated call and sends a preview interaction message (PIM) to the destination KW. The PIM is forwarded before the call is dialed and gives the second KW a chance to decide whether or not he will accept the call based on the PIM data.

At step 1302, KW-2 receives and, in this case accepts the PIM from the KW T-Server. A dotted return arrow illustrates an acceptance response forwarded back to the T-Server. At step 1303, the T-Server dials the DN specified in the call initiation event. A notification of a dialing event (broken return arrow labeled Event Dialing) displays on the caller's computer platform or is activated on the caller's telephone with respect to KW of step 1300. There are many indication possibilities for a dialing event. A ringing event is also established by the T-Server at the computer platform or telephone of KW-2 as illustrated by the broken arrow labeled Ringing. At this particular moment it happens that KW-2 is on a current call. A pre-defined time period may be established for the ringing event so that KW-2 may, during that time, terminate the previous call and pick up.

At step 1304, KW-2 picks up the call. Detecting the pick up at step 1305, the KW T-Server establishes the connection between the KW of step 1300 and KW-2 of step 1304 as indicated by broken arrows. It will be apparent to one with skill in the art that there may be variations in this process for a successful internal call between 2 KWs without departing from the spirit and scope of the invention. Variations in the flow are dependant on actual events. For example, in the case that KW-2 could not terminate the previous call to pick up the initiated event before a sever timeout has occurred, a notification of not ready could be returned to the initiating KW. Similarly, KW-2 could opt to reject the call before it is made by rejection the PIM request.

Figure 14:
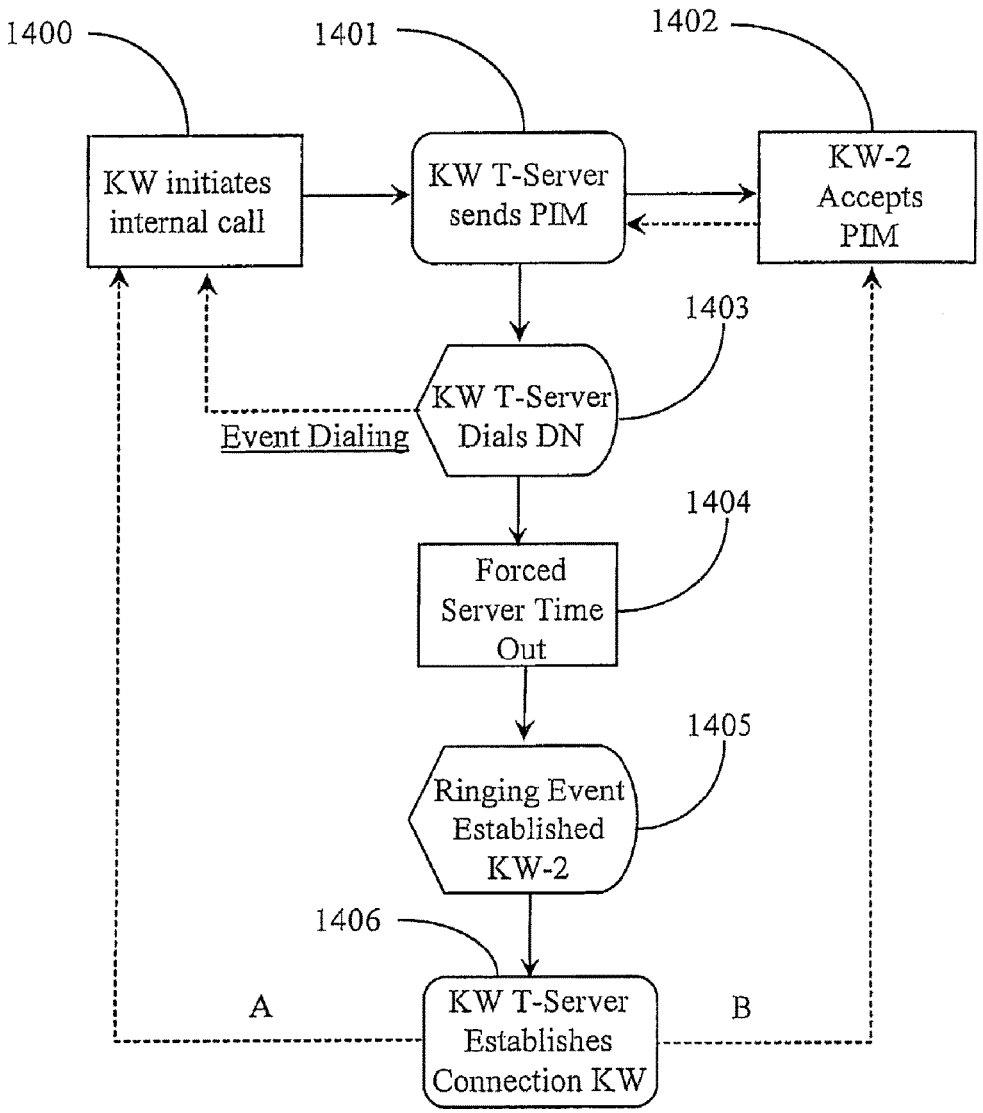
FIG. 14 is a process flow diagram illustrating a variation of the sequence of FIG. 13 with a forced answer.

FIG. 14 is a process flow diagram illustrating a variation of the sequence of FIG. 13 with a forced answer. In this example, steps 1400-1403 are identical to steps 1300-1303 described with reference to FIG. 13 above. Therefore, the same description given in the example above applies to steps 1400-1403 of this example as well.

At step 1404, there is a forced server time out indicating a forced answer mode. At step 1405, a ringing event is established at the station of KW-2 audible over telephone or audible and perhaps visible on the computing platform of KW-2. At step 1406 then, KW T-Server establishes connection for the dialed event. It is noted herein that event connection first connects the initiating party and then the receiving party as indicated by broken arrows A and B.

Figure 15:
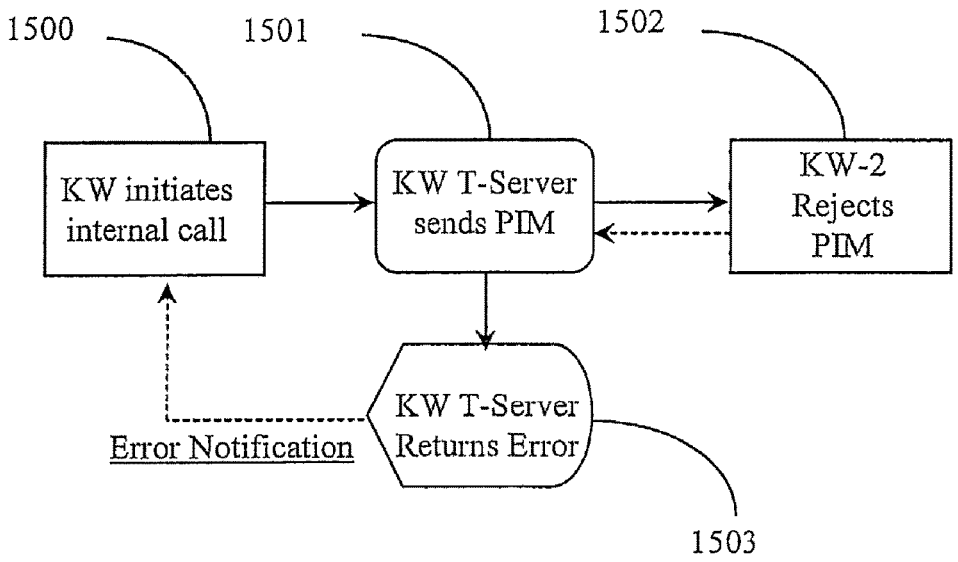
FIG. 15 is a process flow diagram illustrating the sequence of a failed internal call.

FIG. 15 is a process flow diagram illustrating the sequence of a failed internal call. At step 1500 a KW initiates a call to another KW as described with reference to the previous 2 examples. At step 1501, the KW T-Server sends a PIM request to the second KW (KW-2). However, upon reviewing the request, KW-2 decides not to accept the call and rejects the PIM in step 1502 as illustrated by a broken return arrow. The result of this action is that in step 1503, the KW T-Server returns an error message or notification to the initiating KW. It is noted herein that notification messages can take the form of a wide variety of media such as Voice over Internet Protocol (VoIP), IVR response, e-mail response, and son dependant upon media type and equipment.

Figure 16:
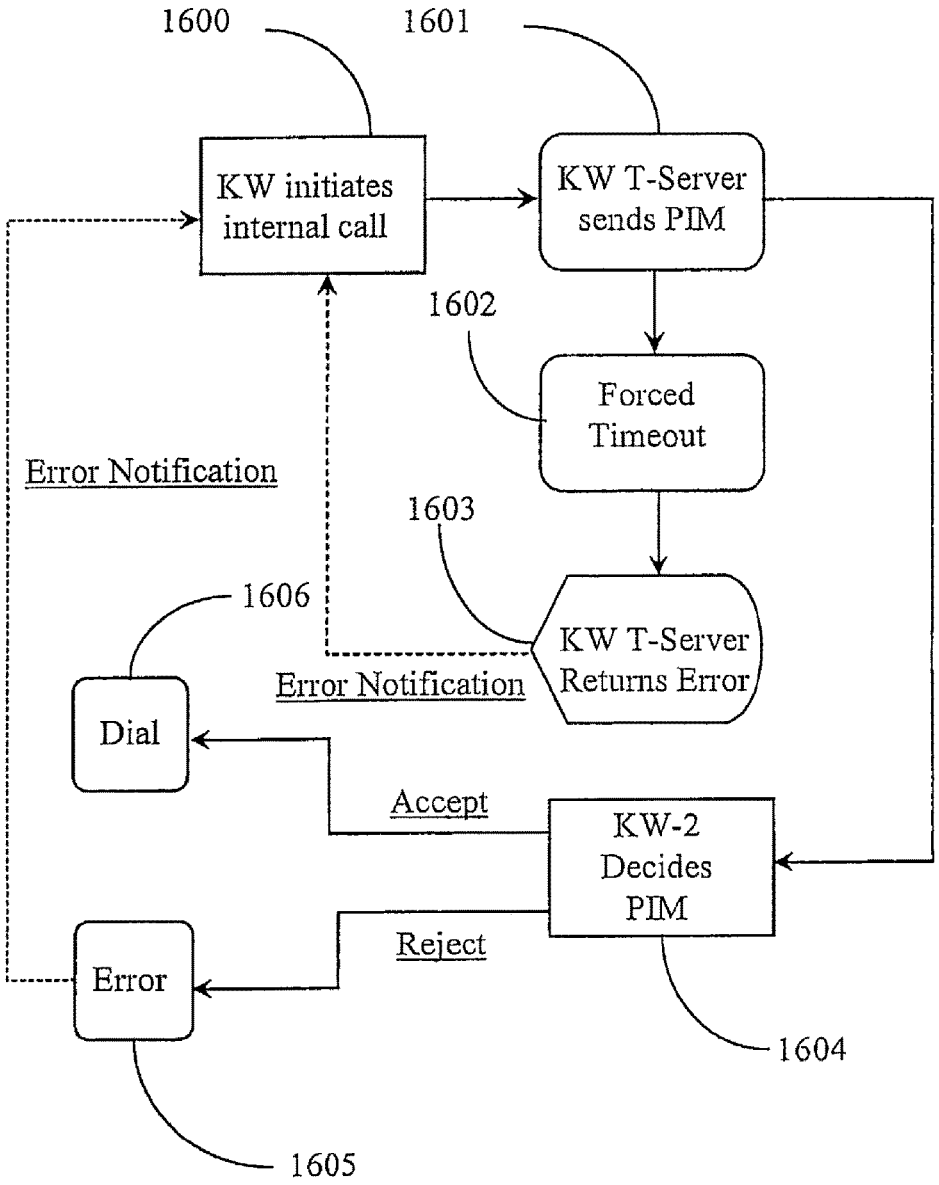
FIG. 16 is a process flow diagram illustrating the sequence of an internal call with a forced timeout before PIM decision according to an embodiment of the invention.

FIG. 16 is a process flow diagram illustrating the sequence of an internal call with a forced timeout before PIM decision according to an embodiment of the invention. Steps 1600 and 1601 are identical to the first 2 steps of the previous examples. However, at step 1602 a forced server timeout occurs before KW-2 responds to the PIM request sent in step 1601.

At step 1603 the KW T-Server sends a timeout error notice to the initiating KW. In the meantime, the PIM request sent to KW-2 is still alive and pending. At step 1604 after the timeout occurs, KW-2 receives the PIM request and determines whether to accept or reject the call. If in step 1604 KW-2 accepts the request, then at step 1606 KW T-Server dials the DN number and subsequent steps for dial notification, ringing event notification and connection establishment occur as with a successful internal call. However, if KW-2 rejects the call event at step 1604, then at step 1605 KW T-Server sends an error notification back to the initiating KW as indicated by the broken return arrow.

Figure 17:
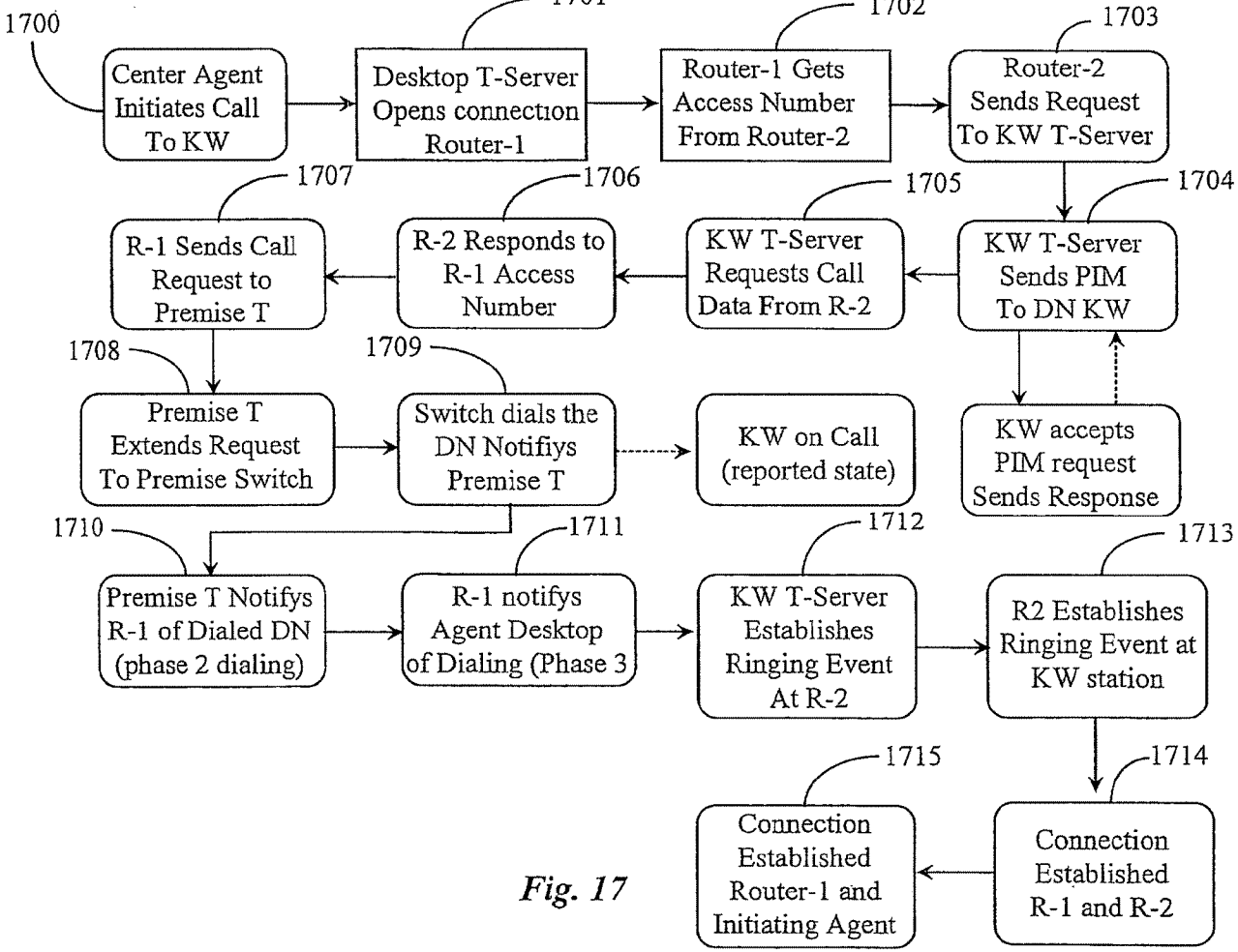
FIG. 17 is a process flow diagram illustrating the sequence of a successful external call from agent to remote KW according to an embodiment of the present invention.

FIG. 17 is a process flow diagram illustrating the sequence of a successful external call according to an embodiment of the invention. At step 1700 a center agent initiates a call to a remote KW. Initiation of the call can take place from the agent telephone or from the agent desktop analogous to telephone 321 and desktop 320 in workplace 319 of center 300 described with reference to FIG. 3. At step 1701 the desktop T Server opens a connection to a first local router or router 1. It is noted herein that the T-server implement may be in the agent desktop itself or it may be in a premise T Server processor accessible to the agent.

At step 1702 the first router local to the agent sends a request to a second router local to the KW to get an access number or DN. At step 1703 the second router forwards the request to the KW T-Server hosting the agent. It is assumed in this example that the KW in question is logged in. Otherwise, an error message (KW not available) would be returned to the initiating agent.

At step 1704 the KW T-Server sends a PIM to the KW having the requested access number or DN. The KW is now aware of the impending incoming call and can decide whether to accept or reject the call. In this case, the KW that will receive the call accepts the PIM request as indicated by the associated block below block 1704. At step 1705 KW T-Server requests call data from the second router. In the meantime, at step 1706 the second router gives the access number to the first router local to the agent.

At step 1707 the first router sends a call request to the premise T-Server. At step 1708 the premise T-Server extends the call request to the premise switch. At step 1709 the switch dials the associated DN and notifies the premise T Server in the first phase of dialing. At step 1710 the premise T-Server notifies the first router of the DN in phase 2 of dialing. At step 1711 the first router notifies the agent desktop of the dialing (phase 3). This manifestation may occur on the agent telephone, desktop or both.

At step 1712 the KW T-Server establishes a ringing event at the second router local to the KW in a first phase of ring notification. At step 1713 the second router establishes the ringing event at the KW station, for example, on the telephone or desktop or both. At step 1714 the connection is established between router 1 and router 2. At step 1715, the connection is extended from router 1 to the calling agent. It is assumed in this example that the connection is a COST connection, however DNT interactions are similarly routed according to CTI rules.

It will be apparent to one with skill in the art that the steps described in this example may vary in number and order without departing from the spirit and scope of the present invention. For example, it may be that there are more than 2 routers involved in the connection path of the call. Similarly, server timeouts, agent availability, queuing requirements, and so on can change the nature and order of the described steps. The inventor intends that the presented example illustrate just one example of an external incoming call sourced from a center agent and destined to a remote knowledge worker according to a preferred embodiment.

Figure 18:
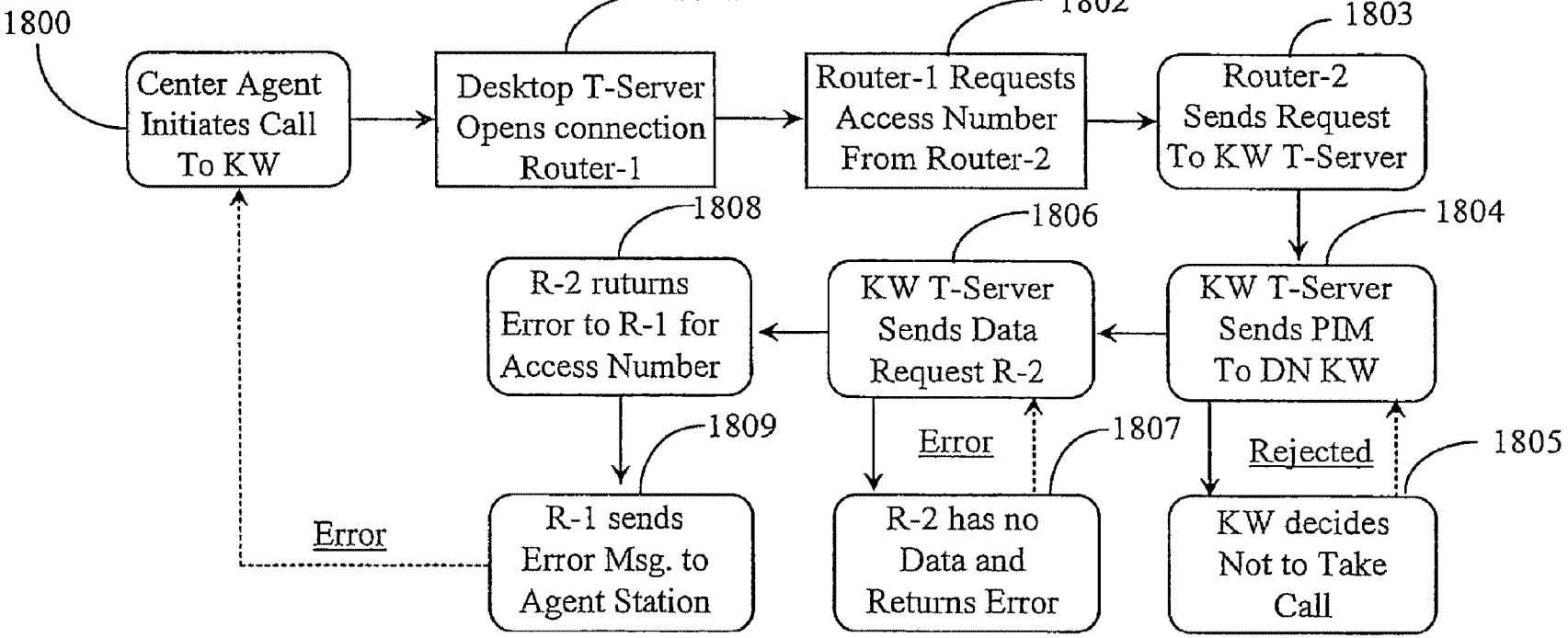
FIG. 18 is a process flow diagram showing the process of a failed external call according to an embodiment of the present invention.

FIG. 18 is a process flow diagram of a failed external call according to an embodiment of the present invention. Steps 1800 through 1804 are identical to steps 1700 through 1704 described with reference to FIG. 17 above for a successful external call from a center agent to a remote KW.

At step 1805 however, the KW decides not to accept the pending call and return a rejection response. At step 1806 the KW T-Server sends a data request to R-2 for call data. At step 1807 R-2 sends an error message to KW T-Server because of absence of call data due to KW rejection of PIM request. At step 1808 R-2 returns an error message to R-1 local to the agent regarding the earlier request for access number at step 1802. At step 1809 R-1 sends an error message to the agent station as indicated by a broken arrow. The error message may be that at this time KW John in not available due to current load or duties. The fact that KW decided not to take the incoming call from the agent can be expressed in a variety of syntax. Perhaps the agent could elect to receive a call back from the KW at a more advantageous time or perhaps the agent can be prompted to place the call again at a latter time period.

It will be apparent to one with skill in the art that remote call control is possible and practical using the method of the present invention without a functioning CTI link provided between the center and the local switch closest to the KW center or other remote KWs. Incoming calls can be routed to any remote KW with a connection to the KW T-Server according to availability, skill level, and so on. In a preferred embodiment intelligent routing of events to remote KWs can be made at the premise of the communication center or at network level. In the case of network level routing, a network T Server must be provided to enhance the involved network level switch or switches.

If all KWs are, for some reason, unavailable at the time of a call attempt, then IVR functionality can be utilized to prompt the caller to leave a number for a return call. In this embodiment, premise T-Server function enables outbound dialing and connection when it is determined that a KW becomes available to take calls. In one embodiment ISCC protocol enables a center agent engaged in a call to transfer the connection to a remote KW with data attached to the event. XML-based data and XSLT transformation capability renders the attached data into the desired format for dissemination at the KWs end device whether it is a voice only device or a display-capable/voice capable device, or even a display only device.

In another embodiment, the service-provider infrastructure (center) can partially monitor independent interactions through network signaling such as D-channel pinging, OSIG, or call progress detection mechanisms.

The method and apparatus of the present invention should be afforded the broadest scope in view of the many possible applications, many of which have been detailed above. The spirit and scope of the present invention is limited only by the claims that follow.

What is claimed is:

1. A system for managing remote agents of a communication center comprising:

a primary server connected to a network, the primary server controlling at least one routing point used by the communication center;

at least one secondary server distributed on the network and accessible to the remote agents; [and]

*wherein* a software suite [executing] *is configured to execute* on at least one of the secondary servers and *is* capable of receiving state information from the remote agents;

characterized in that the remote agent states are monitored for activity by the software suite whereupon the software suite exchanges event related data with the primary server over the network, the primary server using this data for the purpose of intelligently routing events involving the remote agents,

*wherein the software suite is an extension of a computer-telephony integration (CTI) software used in the communication center,*

*wherein the event related data is for being exchanged using a communication protocol, and*

*wherein the switch is configured to receive a communication, and the primary server is configured to receive an agent state of the one of the remote agents from the software suite for routing the communication to the one of the remote agents.*

*2. The system of claim 1, wherein the secondary server is geographically remote from the primary server.*

*3. The system of claim 1, wherein the state information is information as to whether the remote agents are ready or not ready.*

*4. The system of claim 1, wherein the network is the Internet.*

*5. The system of claim 1, wherein the primary server is configured to host the CTI software, wherein the CTI software is for accessing call-related information.*

*6. A system for managing remote agents of a communication center comprising:*

*a primary server connected to a network, the primary server controlling at least one routing point used by the communication center;*

*a switch coupled to the primary server; and*

*at least one secondary server distributed on the network and accessible to the remote agents, wherein the at least one secondary server is configured to host a software suite for being executed on the at least one of the secondary servers and capable of receiving state information from agent devices accessible to the remote agents,*

*wherein the software suite is an extension of a computer-telephony integration (CTI) software used in the communication center,*

*wherein the software suite is configured to monitor states of the remote agents for activity and exchange event related data with the primary server over the network,*

*wherein the event related data is for being exchanged using a communication protocol,*

*wherein the primary server is configured to intelligently route events involving the remote agents based on the event related data,*

*wherein the switch is configured to receive a communication, and the primary server is configured to receive an agent state of the one of the remote agents from the software suite for routing the communication to the one of the remote agents.*

*7. The system of claim 6, wherein the secondary server is geographically remote from the primary server.*

*8. The system of claim 6, wherein the state information is information as to whether the remote agents are ready or not ready.*

*9. The system of claim 6, wherein the network is the Internet.*

*10. The system of claim 6, wherein the primary server is configured to host the CTI software, wherein the CTI software is for accessing call-related information.*

* * * * *